US011810069B2

(12) United States Patent
Farah

(10) Patent No.: US 11,810,069 B2
(45) Date of Patent: *Nov. 7, 2023

(54) CLOUD-BASED DESKTOP AND SUBSCRIPTION APPLICATION PLATFORM APPARATUSES, METHODS AND SYSTEMS

(71) Applicant: Infostreet, Inc., Encino, CA (US)

(72) Inventor: Siamak Farah, Encino, CA (US)

(73) Assignee: Infostreet, Inc., Tarzana, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 16/929,451

(22) Filed: Jul. 15, 2020

(65) Prior Publication Data

US 2020/0349513 A1 Nov. 5, 2020

Related U.S. Application Data

(63) Continuation of application No. 15/838,056, filed on Dec. 11, 2017, now Pat. No. 10,726,390, which is a
(Continued)

(51) Int. Cl.
*G06Q 30/00* (2023.01)
*G06Q 10/10* (2023.01)
(Continued)

(52) U.S. Cl.
CPC .......... *G06Q 10/10* (2013.01); *G06Q 30/04* (2013.01); *G06Q 30/0633* (2013.01); *G06Q 40/12* (2013.12); *H04W 4/60* (2018.02)

(58) Field of Classification Search
CPC ........ G06Q 10/10; G06Q 40/12; G06Q 30/04; G06Q 30/0633; H04W 4/60
See application file for complete search history.

(56) References Cited

U.S. PATENT DOCUMENTS 7,069,271 B1 * 6/2006 Fadel ............... G06Q 10/00
707/948
7,596,620 B1 9/2009 Colton et al.
(Continued)

FOREIGN PATENT DOCUMENTS

WO 2011116248 9/2011

OTHER PUBLICATIONS

O'Keefe, S. "Service Creation: Mixing Up the Right Blend" Telecommunications 34.1 (Jan. 2000): 29 (Year: 2000).*
(Continued)

*Primary Examiner* — Ethan D Civan
(74) *Attorney, Agent, or Firm* — Hanchuk Kheit LLP.; Walter G. Hanchuk

(57) ABSTRACT

The A CLOUD-BASED DESKTOP AND SUBSCRIPTION APPLICATION PLATFORM APPARATUSES, METHODS AND SYSTEMS ("CDSA Platform") transforms service sign up, site creation, application registration data inputs via CDSA Platform components into new site display and Subscription App Store registration confirmation outputs. In some embodiments the CDSA Platform may facilitate generation of cloud-based desktop representations within a web browser. In one implementation, the CDSA Platform may receive a first user input, including identifying user information and a web Site address. In response to the first input, the CDSA Platform may create a new web Site at the received web Site address. In one implementation, the new website may comprise a first desktop representation on a web browser at the web Site address and may present a plurality of application icons on the first desktop representation. In a further implementation, the CDSA Platform may receive a second user input which may include an action on one of the plurality of application icons. In one implementation, in response to the second input, the CDSA Platform
(Continued)

EXAMPLE OVERVIEW may present a second desktop representation on the web browser at the web Site address.

28 Claims, 36 Drawing Sheets

Related U.S. Application Data continuation of application No. 13/050,892, filed on Mar. 17, 2011, now Pat. No. 9,875,463.

(60) Provisional application No. 61/315,002, filed on Mar. 17, 2010.

(51) Int. Cl.
*H04W 4/60* (2018.01)
*G06Q 30/04* (2012.01)
*G06Q 30/0601* (2023.01)
*G06Q 40/12* (2023.01)

(56) References Cited

U.S. PATENT DOCUMENTS

| 9,875,463 B2* | 1/2018 | Farah .................... G06Q 40/12 |
| 10,726,390 B2* | 7/2020 | Farah ................. G06Q 30/0633 |
| 2002/0082988 A1 | 6/2002 | Ujiie et al. |
| 2003/0033539 A1 | 2/2003 | Cheng |
| 2004/0181459 A1 | 9/2004 | Wright |
| 2004/0234047 A1 | 11/2004 | Ciccarelli et al. |
| 2006/0224951 A1 | 10/2006 | Burke et al. |
| 2008/0307085 A1 | 12/2008 | Curran et al. |
| 2009/0144183 A1 | 6/2009 | Gatchell et al. |
| 2009/0300608 A1 | 12/2009 | Ferris et al. |
| 2011/0145094 A1* | 6/2011 | Dawson ................ G06Q 30/06 707/E17.014 |
| 2011/0231280 A1 | 9/2011 | Farah |

OTHER PUBLICATIONS

International Search Report issued for PCT/US2011/028907, filed on Mar. 17, 2011.

* cited by examiner

EXAMPLE OVERVIEW

EXAMPLE USER HIERARCHY

EXAMPLE OVERVIEW DIAGRAM

SITE CREATION COMPONENT

AUTHENTICATION COMPONENT

SITE MANAGEMENT COMPONENT

A/C CREATION COMPONENT

EXAMPLE ACCOUNT MANAGEMENT

EXAMPLE APPLICATIONS AND SERVICES

EXAMPLE SUBSCRIPTION APP STORE CONFIGURATION HIERARCHY

SUBSCRIPTION APP STORE CONFIGURATION COMPONENT

EXAMPLE DEVELOPER APP REGISTRATION

DEVELOPER APP REGISTRATION COMPONENT

EXAMPLE NODE-ADMIN SITE MANAGEMENT INTERFACE

EXAMPLE NODE-ADMIN DOMAIN CONNECTION

EXAMPLE NODE-ADMIN SUBSCRIPTION APP STORE MANAGEMENT

EXAMPLE NODE-ADMIN NEW BUNDLE CREATION

EXAMPLE NODE-ADMIN NEW BUNDLE CREATION

EXAMPLE ADMIN MANAGEMENT OF SUBSCRIPTION APP STORE

EXAMPLE ADMIN MANAGEMENT OF SUBSCRIPTION APP STORE

EXAMPLE ADMIN MANAGEMENT OF SUBSCRIPTION APPSTORE

EXAMPLE ADMIN PURCHASE MANAGEMENT

FIGURE 17F
EXAMPLE ADMIN MANAGEMENT OF USERS

EXAMPLE SITE CREATION

EXAMPLE SITE CREATION

EXAMPLE SITE CREATION

EXAMPLE END-USER CLOUD-BASED DESKTOP

EXAMPLE END-USER SUBSCRIPTION APP STORE

EXAMPLE END-USER SUBSCRIPTION APP STORE APP PURCHASE COMPONENT

EXAMPLE END-USER PORTAL

EXAMPLE WORKFLOW APPLICATION

EXAMPLE CALENDAR APPLICATION

EXAMPLE CALENDAR APPLICATION WITH IMPORTED CONTACTS

CLOUD-BASED DESKTOP AND SUBSCRIPTION APPLICATION PLATFORM APPARATUSES, METHODS AND SYSTEMS

PRIORITY CLAIM

This application is a continuation of and claims priority under 35 U.S.C. § 120 from U.S. application Ser. No. 15/838,056 titled "Cloud-Based Desktop And Subscription Application Platform Apparatuses, Methods And Systems," filed on Dec. 11, 2017, which claims priority under 35 U.S.C § 120 from U.S. application Ser. No. 13/050,892 titled "Cloud-Based Desktop And Subscription Application Platform Apparatuses, Methods And Systems," filed on Mar. 17, 2011, which claims priority under 35 USC § 119 from U.S. Provisional Application Ser. No. 61/315,002, filed Mar. 17, 2010, titled "Cloud-Based Desktop And Subscription Application Platform Apparatuses, Methods And Systems"

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present innovations are directed generally to cloud-based service provider and more particularly, to A CLOUD-BASED DESKTOP AND SUBSCRIPTION APPLICATION PLATFORM APPARATUSES, METHODS AND SYSTEMS. BACKGROUND Desktop interfaces are user interfaces employed by personal computer operating systems (OS) such as Microsoft® Windows OS and Apple Mac OS X. People can go to stores and purchase off-the-shelf software and install these OS specific programs on their desktop computers.

BRIEF DESCRIPTION OF THE DRAWINGS

The accompanying appendices and/or drawings illustrate various non-limiting, example, innovative aspects in accordance with the present descriptions:

FIGS. 17A-F show screenshots illustrating example admin facing interfaces and tools for managing accounts/ users, application settings, Site settings, and/or the like in one embodiment of the CDSA Platform;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Setting up a business, whether large or small, requires resources, planning and time. While companies such as Google, Amazon and Microsoft provide cloud-based infrastructure and platform services (Infrastructure-as-a-service and Platform-as-a-service) for hosting applications or websites without spending significant resources on purchasing, provisioning and maintaining hardware, there are no services currently available to businesses to instantly create, on-demand, information technology infrastructure. Aspects of the CDSA Platform provide businesses an on-demand information technology infrastructure that may be customized and private labeled. Other aspects of the CDSA Platform provide businesses a suite of business management software applications and services that may be accessed by users via the internet with a web browser, and tools for managing use of software applications and services.

CDSA Platform

Figure 1:
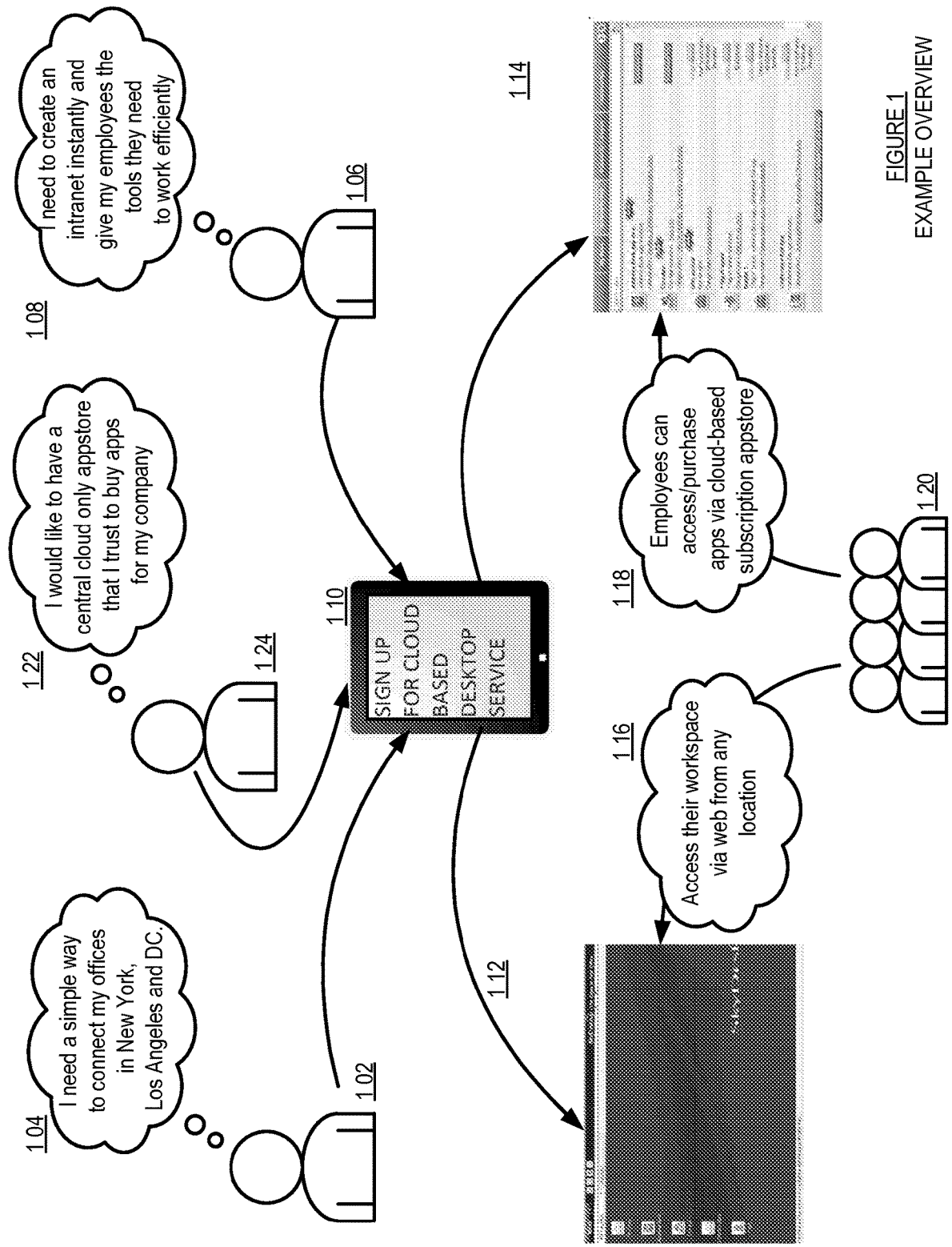
FIG. 1 shows a block diagram illustrating example aspects of the CDSA Platform in one embodiment.

FIG. 1 shows a block diagram illustrating example aspects of the CDSA Platform in one embodiment. For example, a business owner 102 may need a simple way to connect his or her offices in various geographical locations, for example in New York, Los Angeles and DC 104. As another example, a business owner 124 may like to have a central cloud only App Store that he or she trusts to buy apps for his or company 122. In yet another example, a business owner 106 may need to create an intranet instantly or deploy applications that may be accessed immediately by its employees, regardless of where they are located 108. The CDSA Platform may provide solutions to these and various other needs businesses today have in their efforts to start, manage and grow their business, while keeping their employees connected and provided with tools to work efficiently. In one implementation, businesses may sign up for cloud-based subscription service via an Internet-enabled client device 110. By signing up with the CDSA Platform, businesses may give their employees access to a mobile workspace 112 that may be accessed via web from any location 116. The CDSA Platform may also provide a central cloud only Subscription App Store 114, from where employees may access pre-purchased applications, services or bundles ("applications") and/or purchase applications 118, all on their own, without the need for any downloads or installations. In one implementation, the cloud-based desktop is a cloud-based Operating System as well as a desktop. Any cloud application may be compatible with and may run on the CDSA Platform.

Figure 2:
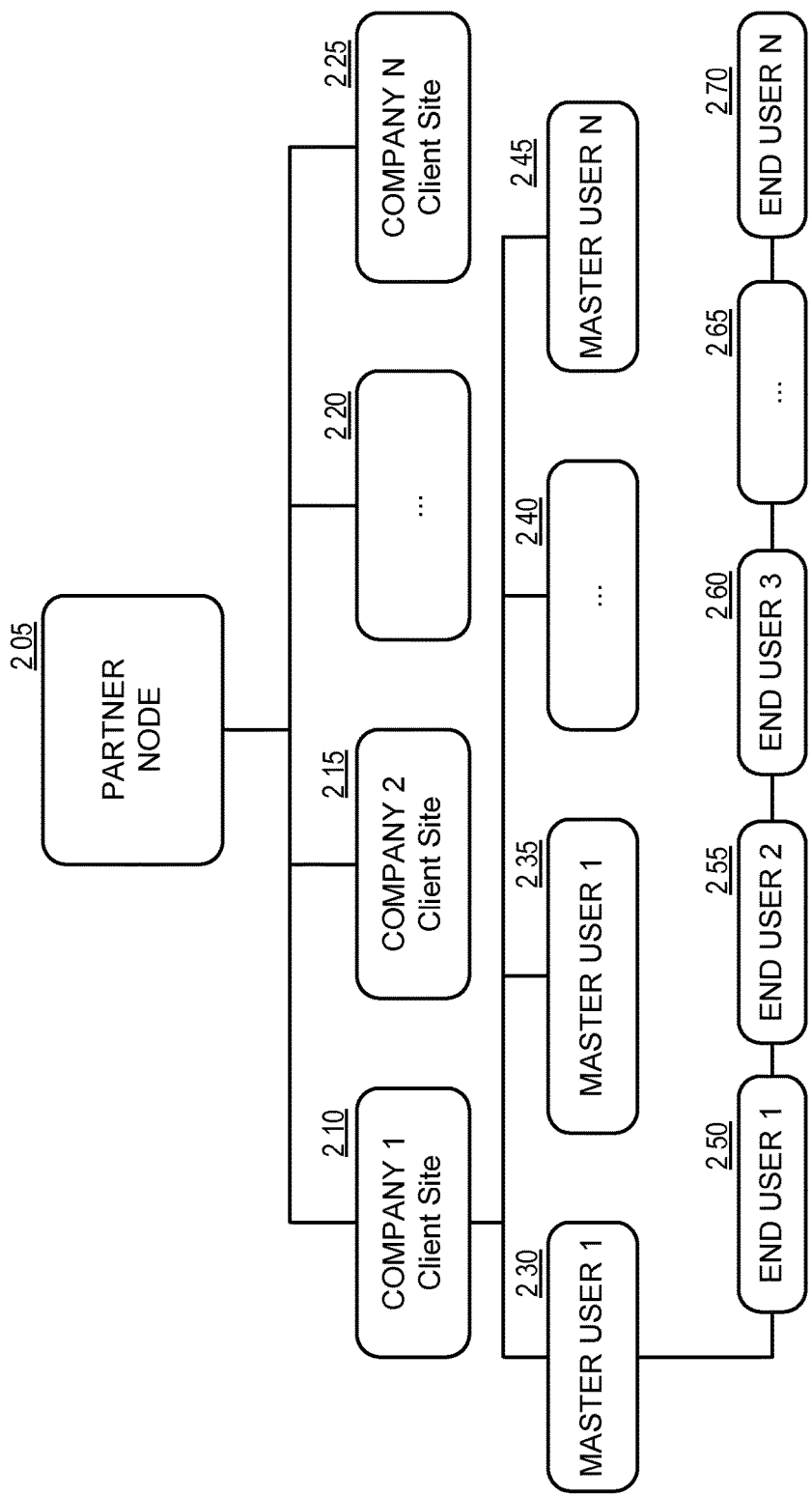
FIG. 2 shows a block diagram illustrating an example user hierarchy in one embodiment of the CDSA Platform.

FIG. 2 shows a block diagram illustrating an example user hierarchy in one embodiment of the CDSA Platform. In one implementation, a Node 205 may be a group of hardware and software dedicated to the deployment of services by the CDSA Platform. Each Node may be private labeled and may have multiple private labeled client sites, which in turn may have multiple users. Furthermore, each Node may have as many sites as required or desired and is only limited by the hardware allocated to the project. In one implementation, each Node may be managed by a Node administrator ("admin"). A Node admin may use a web-based interface to define the default look and feel of the Site, the billing plans and offer or not offer features and/or applications.

A client Site ("Site") may represent a single client (e.g., company, entity, organization, etc.) which may have several users. A Site may also represent a group of users and/or clients. A Site may be private labeled and may be used by Resellers. Sites may be created via a number of ways, including for example, via API, by an admin using a web-based interface and by customers, via web-signup, which may be turned off. Regardless of the method of creation, each Site may have an admin interface for configuration, private labeling, and user management. In one implementation, each Site may be associated with one billing plan defined by the Node admin and may control Site attributes such as the number of users each master account may create, an amount of allocated disk space each account may receive by default, and/or the like. In another implementation, sites may be activated or enabled, deactivated or disabled or frozen, deleted or purged (a permanent and non-recoverable action).

Each Site may have one or more master users 1-N 230-245 and may be created via API, by Site admin or via web sign up (may be turned off). Each master user may have provisioning rights, and depending on the Site service/billing plan may make additional accounts for end-users 1-N 250-270. The master user may also create guest and group accounts. In one implementation, the Site billing plan may control attributes such as number of users a master account may make, amount of disk space each account may receive by default, and/or the like. The features and/or functionalities each master account may receive may be activated/enabled, deactivated/disabled/frozen, deleted or purged.

Accounts for end-users may be created by master users via a web interface. Similar to master users, end-users may have their attributes (e.g., default disk quota) controlled by Site billing plan. However, the master user may adjust the quota of the end user accounts. Like master accounts, end-user accounts may be activated/enabled, deactivated/disabled/frozen, deleted or purged.

In one embodiment, the Subscription App Store 114 may have two levels of management—the Node level and the Site level, each level having an associated interface which the admin may use to configure the Subscription App Store for CDSA Platform users. In one embodiment, a Node may be the point at which all information for each application is centralized and each Node may be configured to receive system wide releases of applications and application categories. The Site, in one embodiment, may be the actual URL of the cloud-based desktop. In one embodiment, each Node may be administered by one or more Node administrators (also Node admin) and each Site, by one or more Site administrators (also Site manager, Site admin, admin or master user).

In one embodiment, the Node admin using the associated Node administrator interface may disable or enable (offer or not offer) any item, including applications and categories, in the Subscription App Store. In a further embodiment, the applications and categories disabled by the Node administrator may not be visible to individual sites and users (or accounts) within each Site. In another embodiment, the Node administrator may set the "on/off" status of an application to be "on" or "off" by default. In yet another embodiment, the Node-level AppGallery may include all enabled and disabled applications and categories. In one embodiment, the Node-level AppGallery may include statistics related to the number of activations for each application and/or aggregate number of activation according to one or more criteria (e.g., category).

In one embodiment, the Site admin using the associated Site administrator interface may disable or enable (offer or not offer) any item, including applications and categories, in the Subscription App Store. In a further embodiment, the applications and categories disabled by the Site administrator may not be visible to users (or accounts) within the Site. In another embodiment, the Site administrator may set the "on/off" status of an application to be "on" or "off" by default. In yet another embodiment, the Site-level AppGallery may include all Site-level enabled and disabled applications and categories. In one embodiment, the Site-level AppGallery may include statistics related to the number of activations for each application and/or aggregate number of activation according to one or more criteria (e.g., category).

Figure 3:
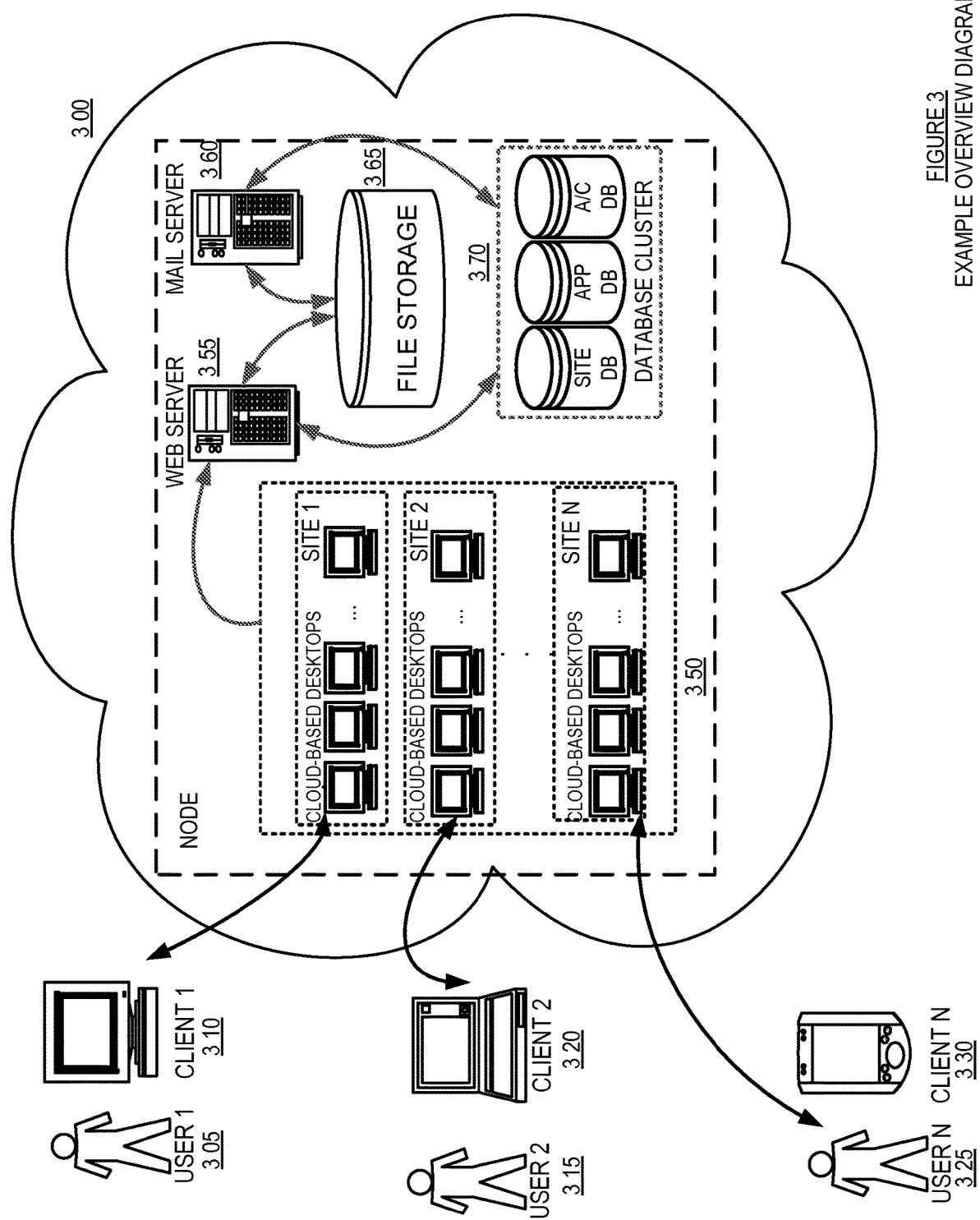
FIG. 3 shows a block diagram illustrating various entities in one embodiment of the CDSA Platform.

FIG. 3 shows a block diagram illustrating various entities in one embodiment of the CDSA Platform. For example, the Node 300 may include, in one implementation, a web server 355 and a mail server 360. The web server 355 and the mail server 360 may be coupled to file storage 365, and a database cluster 370. A plurality of users 305, 315 and 325 may invoke web browsers on their clients 310, 320 and 330 to request their cloud based desktops 350. The browser executing on the client may package user request as a secure Hypertext Transfer Protocol ("HTP(S)") POST message, and may send it over the Node servers 355 and 360 through a communication network (e.g., the Internet). The web server 355 receiving the HTTP(S) request may communicate with file storage 365 to retrieve the requesting user's cloud-based desktop 350. Further, the mail server 360 may also communicate with the file storage 365 and the database cluster 370 to provide email services to the cloud-based desktop users 305, 315 and 325.

Figure 4:
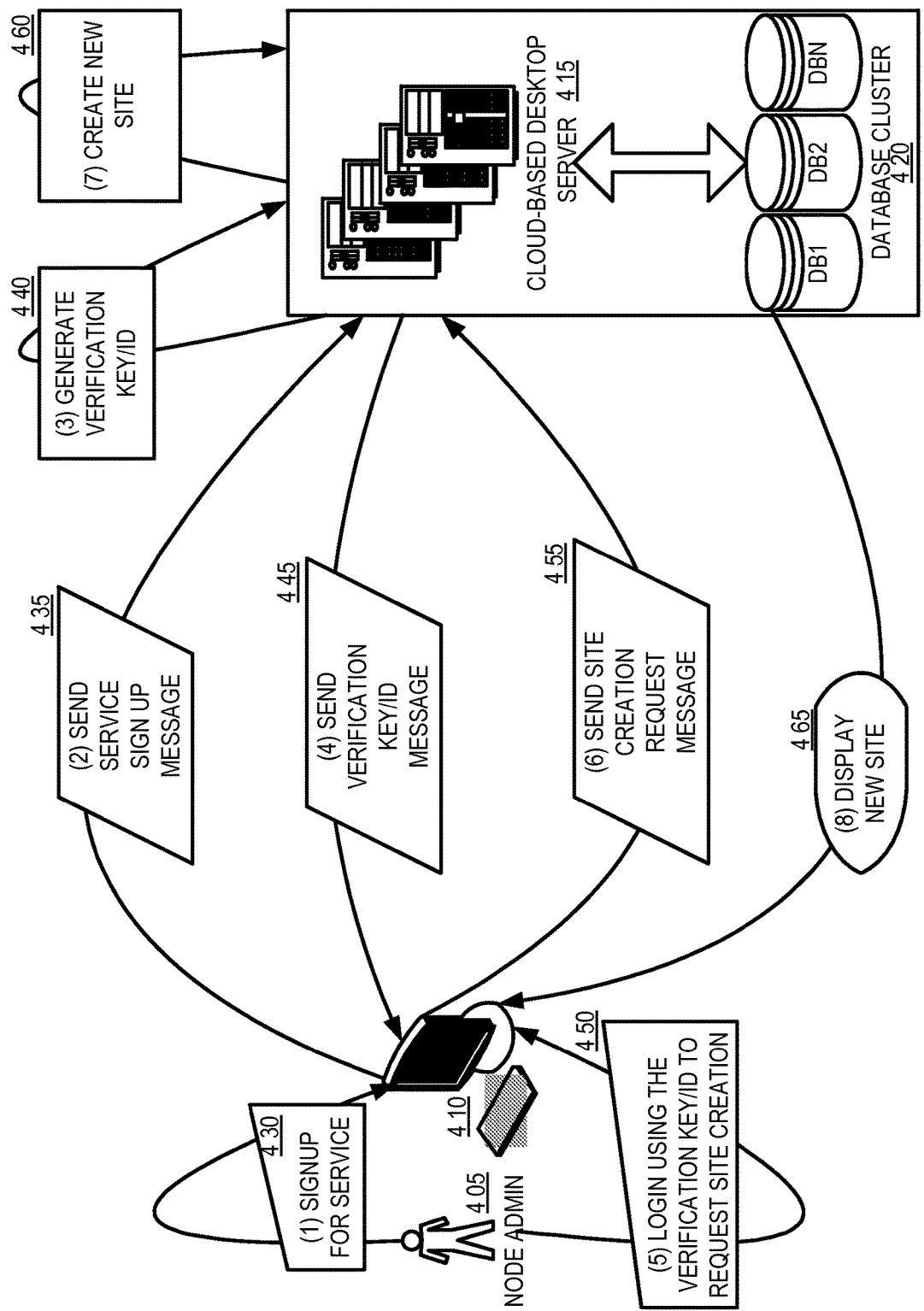
FIG. 4 shows a block diagram illustrating example procedure for Site creation in one embodiment of the CDSA Platform.

FIG. 4 shows a block diagram illustrating example procedure for Site creation in one embodiment of the CDSA Platform. In one implementation, a Node admin 405 may initiate the process of creating a Site. At 430, the Node admin may sign up for the services of the CDSA Platform via, for example, a web page. The Node admin 405 may launch a web browser on a client 410, such as, but not limited to: a personal computer, mobile device, and/or the like. During the sign up (e.g., see FIGS. 17G-K), the Node admin 405 may input to CDSA Platform sign up web page running on the client 410, information including, but not limited to: first name, last name, email address, phone number, a Site address (e.g., http://myonlineworld.SkyDesktop.com), login information (e.g., username, password), terms of service agreement, and/or the like. In one implementation, the client 410 may generate and send a service sign up message 435 to the cloud-based desktop servers 415. For example, a browser application executing on the client may provide, on behalf of the user, a (Secure) Hypertext Transfer Protocol ("HTTP(S)") POST message including the sign up information for the cloud-based desktop servers in the form of data formatted according to the eXtensible Markup Language ("XML"). An example HTTP(S) POST message including an XML-formatted service sign up message for the cloud-based desktop servers may take the following form:

```
POST /signup.php HTTP/1.1
Host: http://SkyDesktop.com/affiliate/signup.pyt
Content-Type: Application/XML
Content-Length: 1306
<?XML version = "1.0" encoding = "UTF-8"?>
<signup_info>
    <signup_ID>4NFU4RG94</signup_ID>
    <timestamp>2011-02-22 15:22:43</timestamp>
    <client_details>
        <client_IP>192.168.23.126</client_IP>
        <client_type>smartphone</client_type>
        <client_model>HTC Hero</client_model>
        <OS>Android 2.2</OS>
    </client_details>
    <login_details>
        <username >SMarinkovic</username>
        <password>Susmita123</password>
    </login_details>
```

-continued

```
    <contact_details>
        <account_firstname>Susmita</account_firstname>
        <account_lastname>Marinkovic</account_lastname>
        <phone>123-456-7890</phone>
        <confirm_type>email</confirm_type>
        <contact_info>s.marinkovic@gmail.com</contact_info>
    </contact_details>
    <site_details>
        <site_address>myonlineworld</site_address>
    </site_details>
</signup_info>
```

In one implementation, the cloud-based desktop servers 415 may receive the service sign up message 435 from the client 410, and may parse the received message to extract the details of the message. The cloud-based desktop servers 415 may, in one implementation, generate a verification ID and/or verification key at 440. The generated verification ID and/or key may then be sent to the user via an email, text, HTTP POST message, web page, and/or the like. The user 405 may then access, for example, his or her email on the client 410. In one implementation, the user 405 may click a link on his or her email to launch a web page for submitting the verification ID and/or key. An example link may be of the following form:

```
http://my.SkyDesktop.com/affiliate/verify.pyt?cartID=
R_Lt14HP1yNAkTEquwU0ug&key=187862330359
```

The example link may embed the verification ID and key generated. In another implementation, the user 405 may paste the verification ID and/or key received in the email in the verification boxes in the web page. In one implementation, an example verification ID and/or key may be as follows:

```
ID == R_Lt14HP1yNAkTEquwU0ug
KEY == 187862330359
```

Upon entering the verification ID and/or key, the user may submit a Site creation request. The client 410 browser may then generate a HTP(S) POST message including Site creation request message 455 along with the verification ID and/or key in an XML format to the could-based desktop servers 415. The servers 415, in response to receiving and validating the verification key and/or ID, may create a new Site 460. The creation of the new Site 460 is discussed in further detail in FIGS. 5a-b. Upon creation of the new Site, the servers 415 may send to the client 410 a link for the new Site 465. The user may click on the link provided by the servers 415 to access the new Site. The user may then log in using the username and password for the Site.

Figure 5:
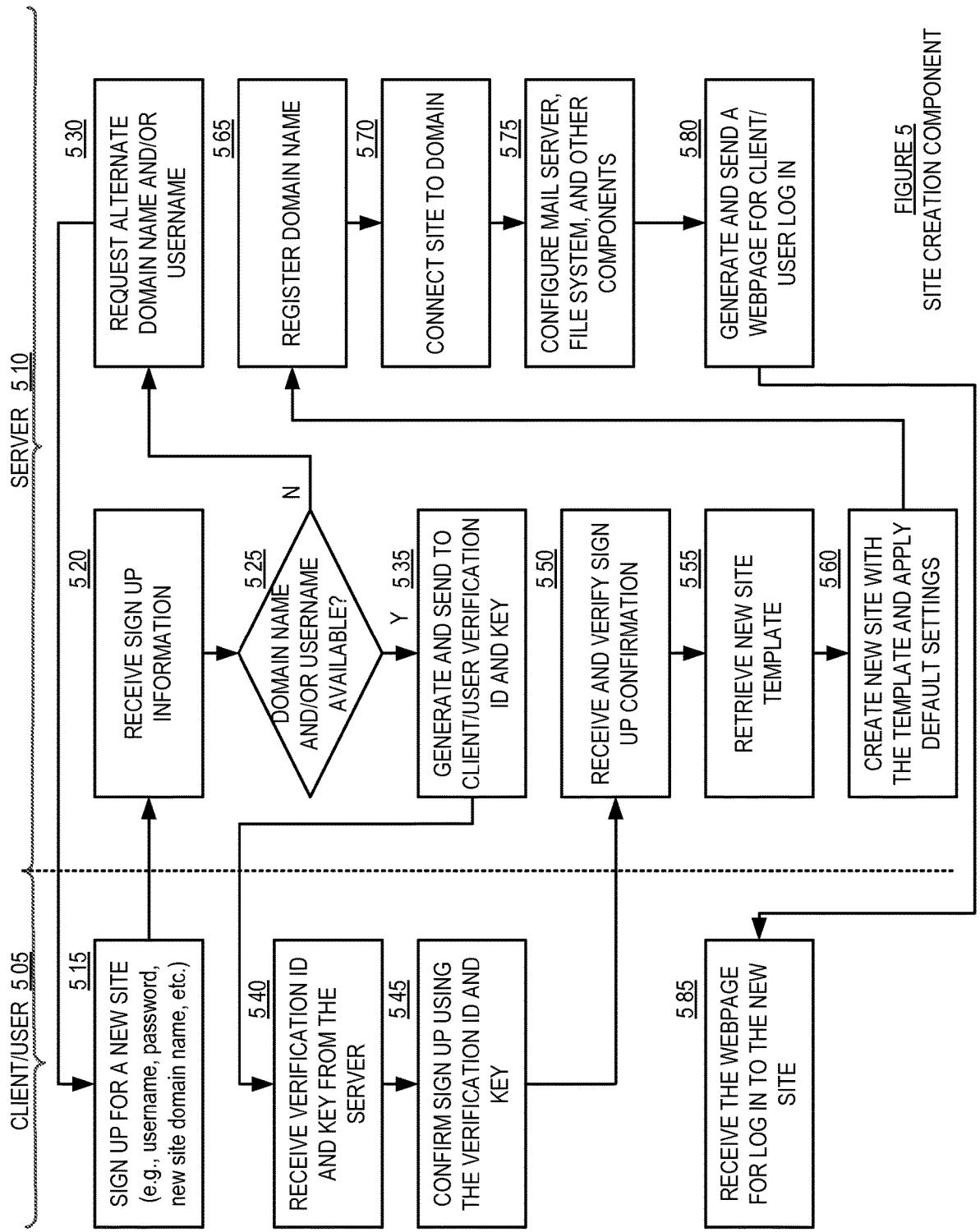
FIG. 5 shows a logic flow diagram illustrating example procedure for Site creation in one embodiment of the CDSA Platform, e.g., Site Creation Component (SCC)

FIG. 5 shows a logic flow diagram illustrating example procedure for Site creation in one embodiment of the CDSA Platform, e.g., Site Creation Component (SCC). In one implementation, the client/user may sign up for a new Site at 515. For example, the user may go to the CDSA Platform service sign up web page, and may enter information such as username, password, new Site domain name, email address, name, phone number, and/or the like. The user-provided information may then be sent to the server 510 as a HTTP(S) POST message in XML format. The server 510 may receive the sign up information from the user, and extract message details. At 525, the server 510 may determine whether the username and/or domain name chosen by the user are available for use. If the domain name and/or username are both available, the server 510 may generate and send to the user verification ID and/or key at 535. On the other hand, if the domain name or the username is already taken, the server may send a request to the user to enter an alternate domain name or username at 530. In one implementation, the username and domain name uniqueness may be determined by querying one or more tables and/or databases or domain registrars. The user, upon receiving the verification ID and/or key from the server 510 at 540, may confirm sign up using the received verification ID and/or key at 545, The confirmation may be received and verified by the server at 550. At 555, the server 530 may retrieve a new Site template. At 560, the server may create a new Site with the retrieved template, and apply default settings.

In one implementation, at 565, the server may register the domain name provided by the user and then at 570, connect the Site to the domain, before configuring mail server, file system, and other components at 575. In an alternate implementation, the server may consider 565 and 570 optional and directly configure mail server, file system, and other components at 575. The server may then generate and send a webpage for client/user login at 580. The client/user may receive the webpage for login to the new Site at 585.

In one implementation, the connection of the Site to the domain at 570 may include adding an entry to one or more databases, e.g., Site database. Further, the configuration files for mail and file system, among other components, may be updated to allow email and file storage for the domain. In a further implementation, the configuration files on the web server (e.g., apache) may also be updated such that the web server may know that domain is related to the particular Site. In this way, the CDSA Platform may, in one embodiment, facilitate on demand infrastructure creation, complete with domain, email and file system configuration, with a single action. For example, as discussed once the user confirms sign up for a new Site creation, e.g., using a single click of a button, the CDSA Platform handles all the backend hardware provisioning, creation of a new Site with default settings, domain name registration and connection and webmail and file system configuration, to provide the user with a full functionality cloud-based desktop that can be accessed using any client device browser and Internet. Exemplary method calls written substantially in the form of Python are provided below:

```
def setup (self):
    #Add all data needed to the database
    self.createDBEntries( )
    # set the parentID so we can tell who the owner is
    if self.parent:
        self.site.parentID = self.parent.ID
    # Create folders for the site on the system
    self.createDocRoot( )
    # Configure webmail and apache for the new domain
    self.configureWebServers( )
    #Add the sites contact information
    self.addsiteAccountProfile( )
    #Add the default user types
        #Initialize the Account Types
        hosting.AccountTypes.initializeSite( self.site.ID )
        # create system users admin, www, help, etc...
        self.createMainUsers( )
    # create the menu
    self.createMenu( )
    # Initialize all features for the site
    self.initializeSite( )
    # Create access rules for default users
    self.createAccess( )
    self.createAccess(username = "default")
    # Set automated emails for the site (reminders, introduction, etc..
    self.configureAutomatedEmails( )
    return self.site
```

Figure 6:
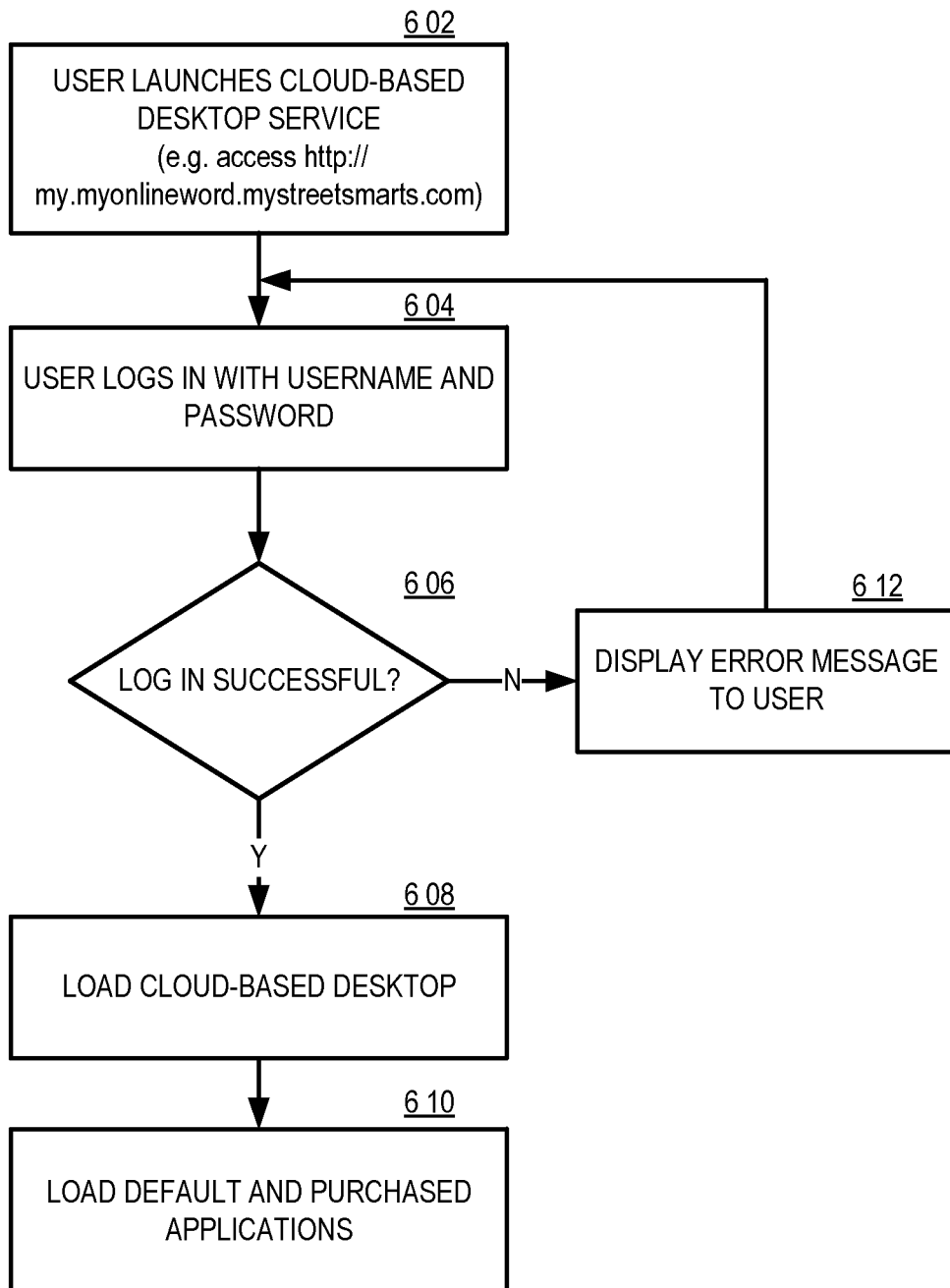
FIG. 6 shows a logic flow diagram illustrating example authentication procedure in one embodiment of the CDSA Platform.

FIG. 6 shows a logic flow diagram illustrating example authentication procedure in one embodiment of the CDSA Platform. In some implementations of the CDSA Platform, an example authentication/instantiation process may begin with a user launching his or her cloud-based desktop service at 602. For example, the user may access a web page at http://my.myonlineworld.SkyDesktops.com for login. The user may enter his or her username and password to get access to the cloud-based desktop at 604. At 606, if the log in is successful, the server may load a cloud-based desktop at 608. The server may further load default and purchased applications on the user's cloud-based desktop at 610. If the log in is not successful at 606, the server may display an error message to the user at 612. The user may then make another attempt at log in at 604.

Figure 7:
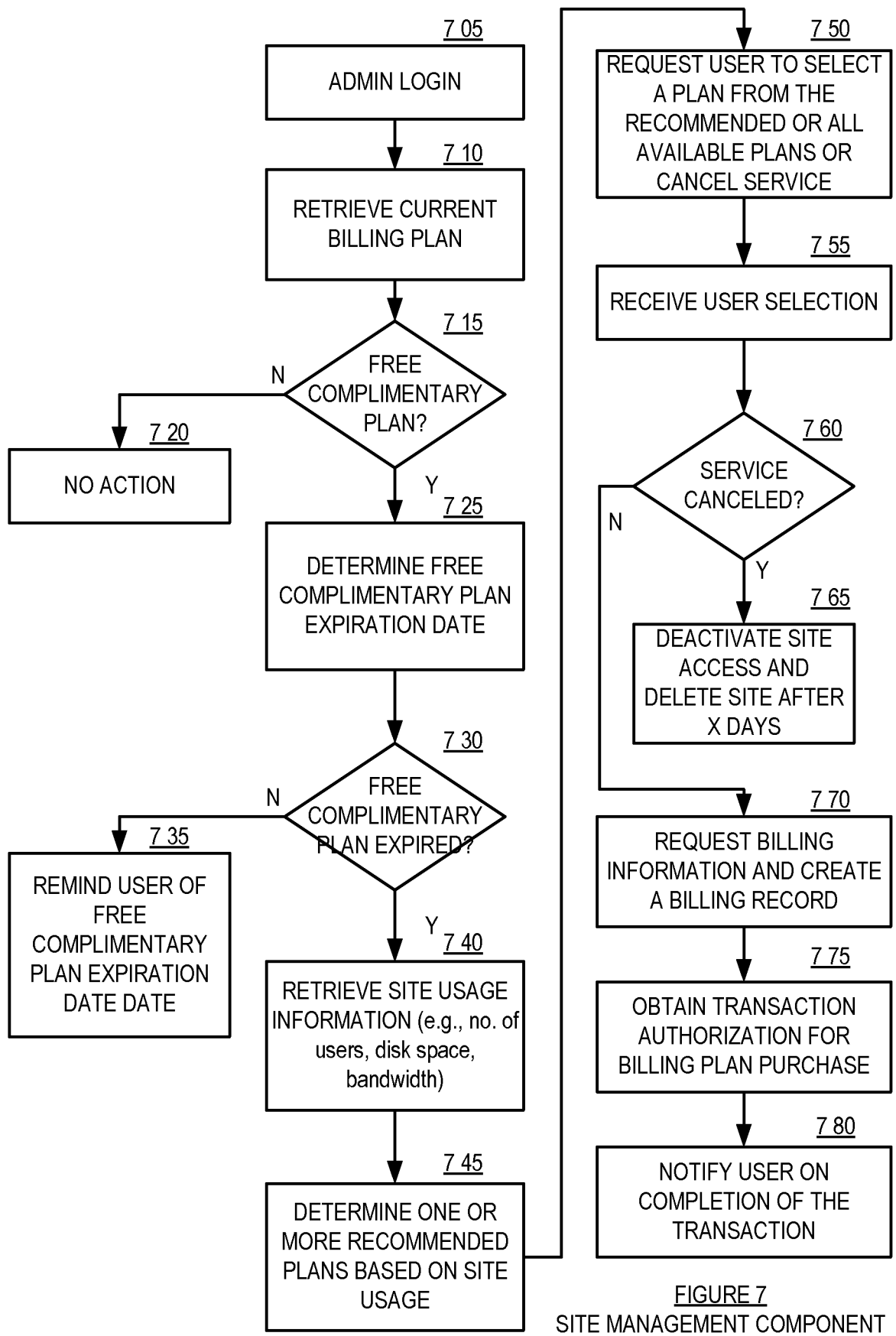
FIG. 7 shows a logic flow diagram illustrating example procedure for Site management in one embodiment of the CDSA Platform.

FIG. 7 shows a logic flow diagram illustrating example procedure for Site management in one embodiment of the CDSA Platform. In one implementation, the responsibilities for managing a Site may rest upon an admin. The admin may log in to his or her cloud-based desktop service using admin username and password at 705. Upon login, the server may retrieve the current billing plan for the Site at 710. In one implementation, examples of the billing plan may include, without limitation, a complimentary/free trial plan, plans with minimum, limited or unlimited number of users, plans with a combination of features such as automatic software upgrades, unlimited web based support, free domain with at least one paid month, $x per additional user per month, phone support for Site administrators, and/or the like. At 715, a determination as to whether the current billing plan is complimentary may be made. On one hand, if the current billing plan is not complimentary, a billing plan may already be associated with the Site, such that no further action may be needed, ending the process at 720. On the other hand, if a complimentary plan is the current billing plan, a check may be made to determine the expiration date of the complimentary plan at 725. For example, one or more databases and/or tables may be queried to determine if the plan start date and plan duration to determine whether the complimentary plan may have expired or not at 730. If the complimentary plan has expired at 730, the admin may be sent a reminder message at 735 (e.g., via a pop up message window or email) indicating the expiration date of the complimentary plan. If the complimentary plan is determined to be expired at 730, relevant Site usage information may be retrieved and aggregated at 740. Examples of Site usage information may include, without limitation, number of users, disk space per user, disk space per Site, bandwidth, number of applications and/or the like. Based on the retrieved and aggregated usage information, one or more recommended plans may identified at 745 and suggested to the admin for selection at 750. In addition to having the option of selecting a plan from the recommended plans, in one implementation, the admin may have the option to select a plan from all available plans or have the option to cancel the Site. At 755, at least one service plan selection may be received (e.g., a plan selection or service cancellation). If the admin cancels the service at 760, the Site may be immediately deactivated at 765. In one implementation, the Site may be reactivated if the admin requests reactivation and selects a billing plan. In a further implementation, if the reactivation request is not received within a defined period of time after canceling the service, the Site may be purged. If the admin does not cancel the service and selects a billing plan at 760, the admin may be requested to provide billing information at 770. In one implementation, the billing information may include, for example, first and last names, address, phone number, email, payment identifier (e.g., credit, debit, prepaid cards or bank account numbers), and/or the like. A corresponding billing record may also be created in response to the receiving billing information. At 775, the billing information may be forwarded to payment processing institutions for transaction authorization. At 780, if the transaction is authorized, the admin may be notified of the successful completion of the transaction. In one implementation, the billing record created may be updated to reflect the successful purchase transaction. Further, other records in one or more associated databases and/or tables may also be updated to indicate start of bill pay plan for the Site.

In another implementation, the cloud-based desktop service may be complimentary with the fulfillment of one or more criteria or conditions. For example, the cloud-based desktop service may be complimentary (or have a reduced price) if a user purchases at least an application. The purchase requirement (e.g., at least an x number of applications) may be per month, every three months, or any time period set by the super node, Node admin or admin. In another implementation, the cloud-based desktop service may also be complimentary or may be offered at a reduced or discounted price if a user logs in at least once every week, month, 60 days, or any other period of time defined. Similarly, purchase of the cloud-based service may allow one or more users access to one or more applications (including applications that may not be pre-purchased by Node admin or admin) free of charge. Such offering may depend on usage data, for example.

Figure 8:
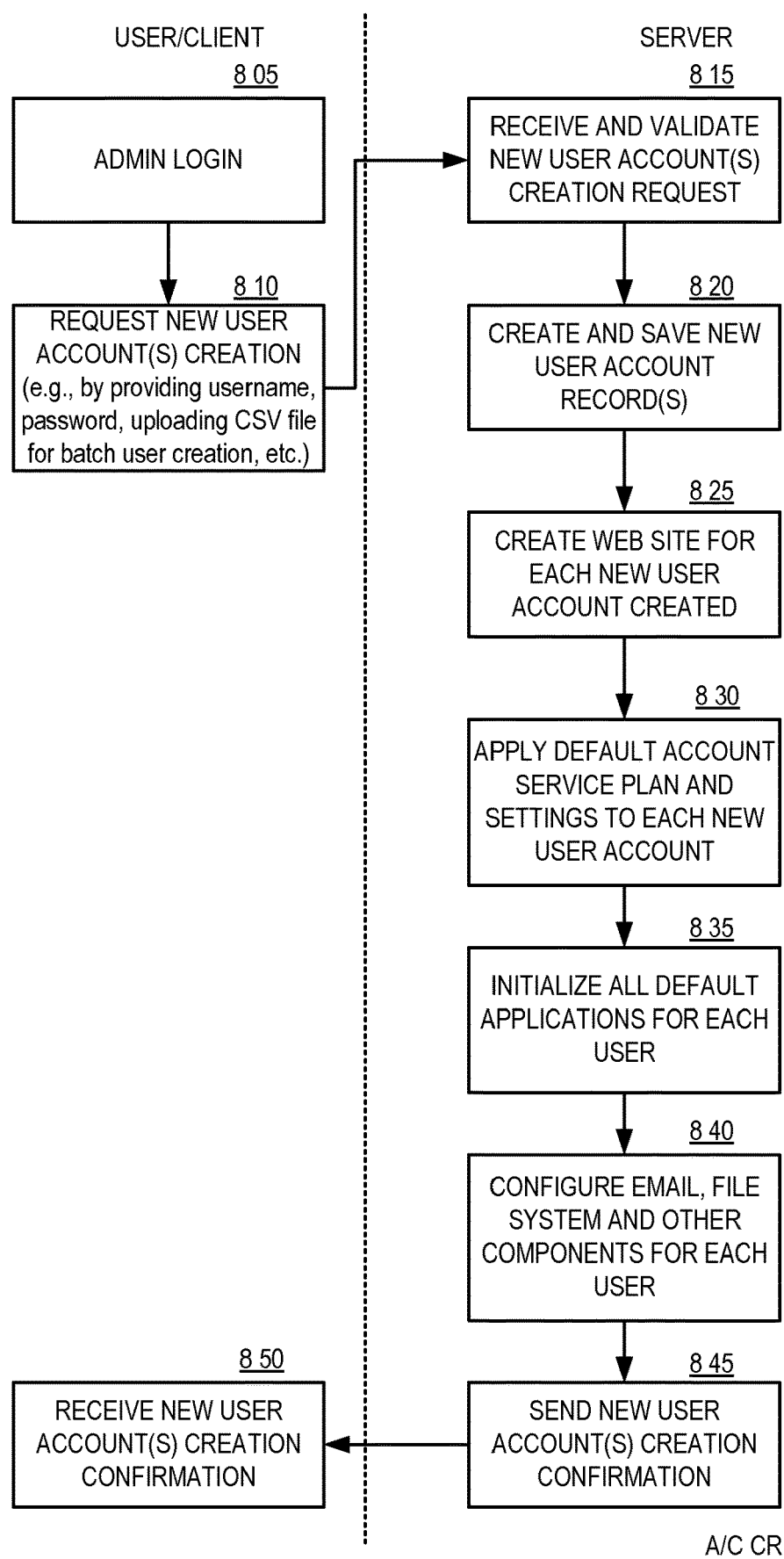
FIG. 8 shows a logic flow diagram illustrating example procedure for account creation in one embodiment of the CDSA Platform.

FIG. 8 shows a logic flow diagram illustrating example procedure for account creation in one embodiment of the CDSA Platform. In one implementation, an admin for a Site may create one or more end-user accounts. An admin may log in at 805 and request a new user account creation at 810. In one implementation, the request may include, for example, username and password for the new user. In another implementation, an admin may create multiple user accounts in one batch by uploading a .CSV file or a .TXT file. The request, which may be formatted as an XML request in one implementation, may be sent to the server. The server may receive and validate the request at 815. An example validation process may include verifying that the admin has appropriate rights for account creation. For example, an admin may have no admin creation rights in one implementation, while in another implementation, the admin may be allowed a limited number of account creations. The validation process may also include, in a further implementation, verifying that usernames provided are unique.

At 820, if the validation is successful, one or more new user accounts may be created per the request. The records for the new user accounts may be saved in one or more databases and/or tables in one implementation. At 825, a web Site for each new user account may be created. In a further implementation, the website may be activated upon log in by the new user. At 830, upon creation of the cloud-based desktop for each new user account, a default account service plan and settings may be applied at 830. In one implementation, the default applications for the new user may be initialized at 835. At 840, the email, file system and other components may be configured for each new user. Upon completion of the configuration of email, file system and other components, a Site creation confirmation may be sent to the admin at 845. At 850, the admin may receive the new user account creation confirmation.

Figure 9:
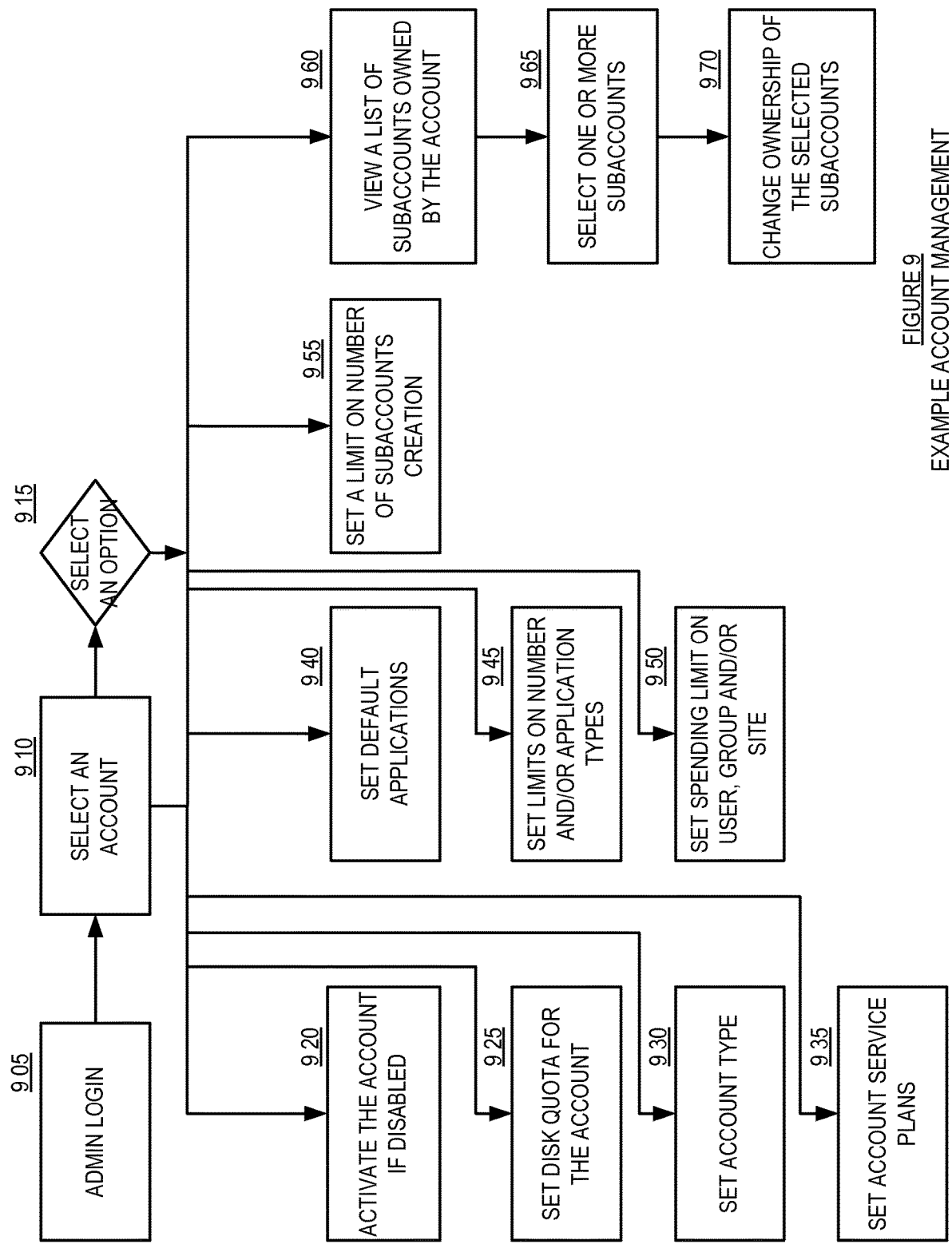
FIG. 9 shows a logic flow diagram illustrating example procedure for account management in one embodiment of the CDSA Platform.

FIG. 9 shows a logic flow diagram illustrating example procedure for account management in one embodiment of the CDSA Platform. In one implementation, an admin may be responsible for managing all accounts, or managing those accounts that are owned by the admin. In one implementation, the admin may log in at 905 and select one or more accounts at 910. A plurality of actions may be performed by the admin on the selected one or more accounts. For example, the admin may select an option at 915 to activate the selected accounts that have been disabled at 920. In another option, the admin may set a disk quota for a selected account at 925. For example, if an account receives by default 100 MB of disk space, the admin may increase the disk quota to, for example, 1 GB. In one implementation, the admin may need prior authorization by the Node admin to allocate extra disk space to one or more user accounts. In another implementation, the admin may set an account type to a selected account at 930. Examples of an account type may include, group, person, project, resource, system, and/or the like. At 935, the admin may associate an account service plan to one or more selected accounts. Examples of an account service plan may include full provisioning (e.g., full provisioning rights to create groups, users and guests), guest provisioning (e.g., provisioning rights to create guests), standard plan (e.g., 100 MB of Storage per user, unless changed by the Site admin), user provisioning (e.g., provisioning rights to create users and guests), and/or the like. At 940, the admin may configure one or more applications as default applications for one or more accounts. At 945, the admin may set a limit on the number and/or type of applications that may be available to an account. At 950, the admin may set a spending limit on a user, a group and/or a Site. In another implementation, the admin may set a limit on the number of sub-accounts creation at 955. In yet another implementation, the admin may view a list of subaccounts owned by an account at 960. In a further implementation, the admin may select one or more sub-accounts at 965 and change their ownership at 970.

Figure 10:
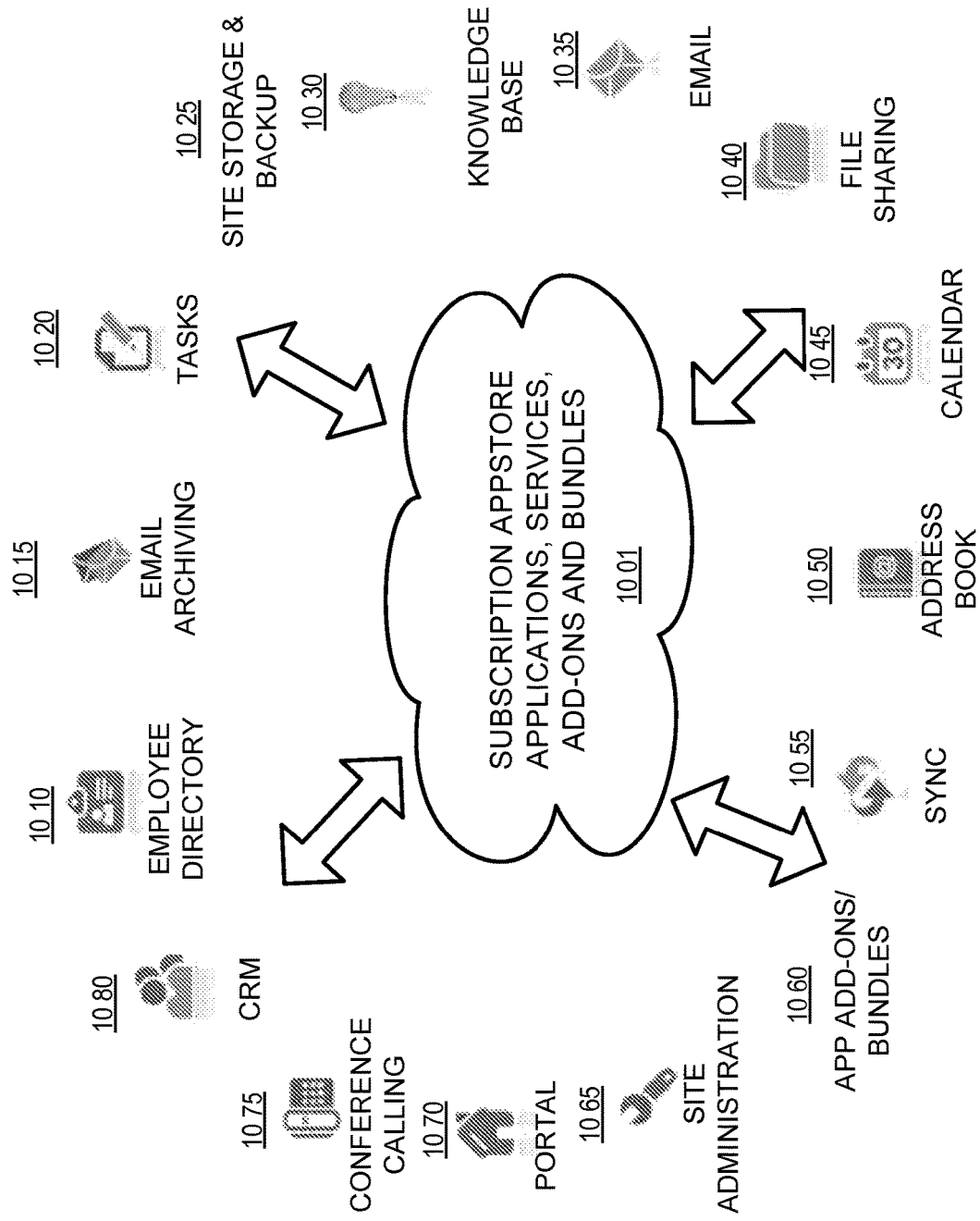
FIG. 10 shows example applications in an example Subscription App Store for Applications, Services, Add-ons and Bundles in one embodiment of the CDSA Platform.

FIG. 10 shows example applications in an example Subscription App Store for Applications, Services, Add-ons and Bundles in one embodiment of the CDSA Platform. While the applications and services shown in FIG. 10 are cloud-based with no need for download or installation, in one implementation, services such as laptop/local computer cloud-based backups (download and install), anti-virus software (download), Search Engine Optimization (SEO) services through partners, Virtual PBX services (e.g., service is cloud but may involve the sale of Internet Protocol phones), and/or the like may also be offered via the CDSA Platform.

Figure 11:
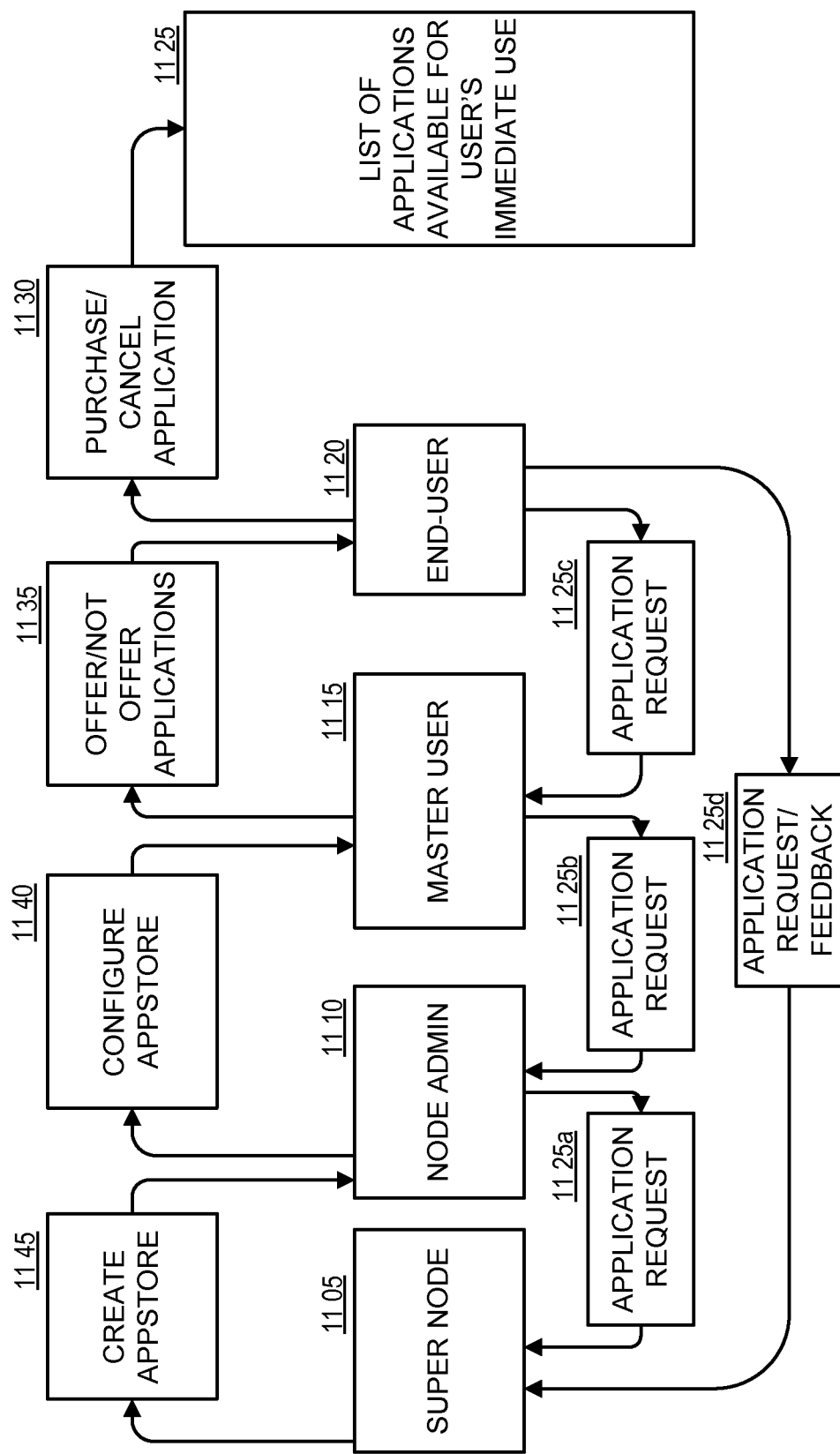
FIG. 11 shows a data flow diagram illustrating example configuration hierarchy for an example Subscription App Store in one embodiment of the CDSA Platform.

FIG. 11 shows a data flow diagram illustrating example hierarchy for an example Subscription App Store in one embodiment of the CDSA Platform. In one implementation, for example, a super Node 1105 may create applications, add-ons, bundles, categories, and/or the like for a Subscription App Store at 1145. In a further implementation, a Node admin 1110 may configure the Subscription App Store by, for example, determining which applications to offer as default to sites, and may create bundles at 1140. In yet another implementation, the master user (or admin) 1115 may determine which applications to offer or not offer in his or her Site at 1135. In one implementation, the end-user 1120 may purchase or cancel (turn on or turn off) one or more applications at 1130 such that the end-user may have for his or her disposal a list of applications 1125. In one implementation, the ender-user, the admin, and the Node-admin may each request applications from a higher level user/admin via application requests 1125*a-c*. In another implementation, the end user may also directly contact the super Node 1105 for application request and/or feedback at 1125*d*.

Figure 12:
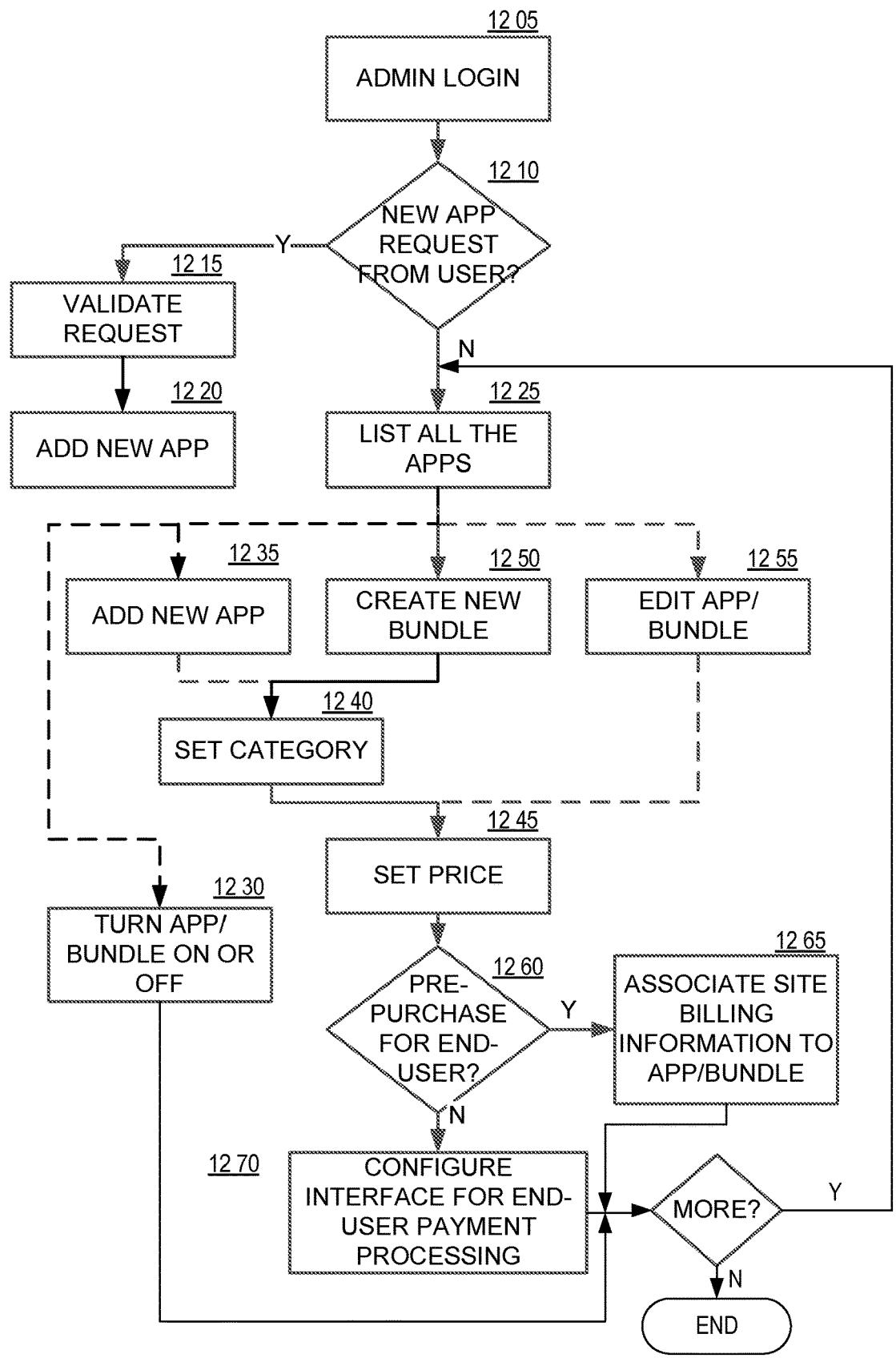
FIG. 12 shows a logic flow diagram illustrating example procedure for Subscription App Store Configuration in one embodiment of the CDSA Platform.

FIG. 12 shows a logic flow diagram illustrating example procedure for Subscription App Store Configuration in one embodiment of the CDSA Platform. In one implementation, an admin may log in to his or her cloud-based desktop at 1205. After successful login, if a new application has been requested by a user at 1210, the admin may validate the request at 1215. In one implementation, validating the request may include verifying the need for the requested application. In another implementation, validating may include checking the user privileges and authorizations. After validating the request, and if the request is fulfilled, the requested new application may be added to the Subscription App Store at 1220. In one implementation, adding the requested application may entail searching for the application, and changing the status of the application from Not Offered to Offered. The status change may be made for the requesting user only, a subset of users or all users in a Site. When the status of the application is changed from Not Offered to Offered via the admin facing Subscription App Store, or via the admin control panel interface, the application in question may be instantly added to the user's Subscription App Store, or pre-purchased for the user, which will place the application or bundle on the user's desktop and allow immediate usage If there are no application requests from any users at 1210, a listing of all applications available may be generated at 1225. In one implementation, the admin may choose to offer new applications without any user requests. At 1250, the admin may create a new bundle for addition to the Subscription App Store. In one implementation, a bundle may be a combination of one or more application, services and/or add-ons. In another implementation, a bundle may be similar to a suite of software and services. (e.g., Management software suite). At 1240, the admin may define or select a category for the new bundle (e.g., communications, management, etc.). In addition to setting a category for the application, the admin, in some implementations, may set a price for the new bundle at 1245. In one implementation, if the bundle is to be pre-purchased for end-user at 1260, corresponding Site billing information may be associated with the new bundle at 1265. In a further implementation, the pre-purchased bundle may be configured to appear on the Subscription App Store with Included in Site information, instead of pricing and/or trial details. If the bundle is for end-user purchasing, pricing details may be associated with the bundle. Further end-user payment processing interface may be configured at 1270 to facilitate and process end-user purchase transaction. At 1275, if more configurations may be necessary, the admin may return to the listing of all applications at 1225, otherwise, the process may end at 1280.

In one implementation, at 1235, the admin may add a new application to the Subscription App Store. The admin has provisioning rights, and may therefore, in one implementation, add an application by changing the application status from Not Offer/Don't Offer to Offer. In another implementation, the admin may request the Super-Node and/or the Node to add an application for the Site. In one implementation, the admin may set attributes such as category and price to an application and determine if the application may be pre-purchased or configured for end-user purchasing.

In another implementation, at 1255, the admin may edit attributes for an application and/or bundle. For example, the admin may change the price or pre-purchase the application. In one implementation, the admin may purchase or discontinue one or more applications for a user, a group of users or all users. In yet another implementation, at 1230, the admin may turn an application on or off (e.g., offer or don't offer).

Figure 13:
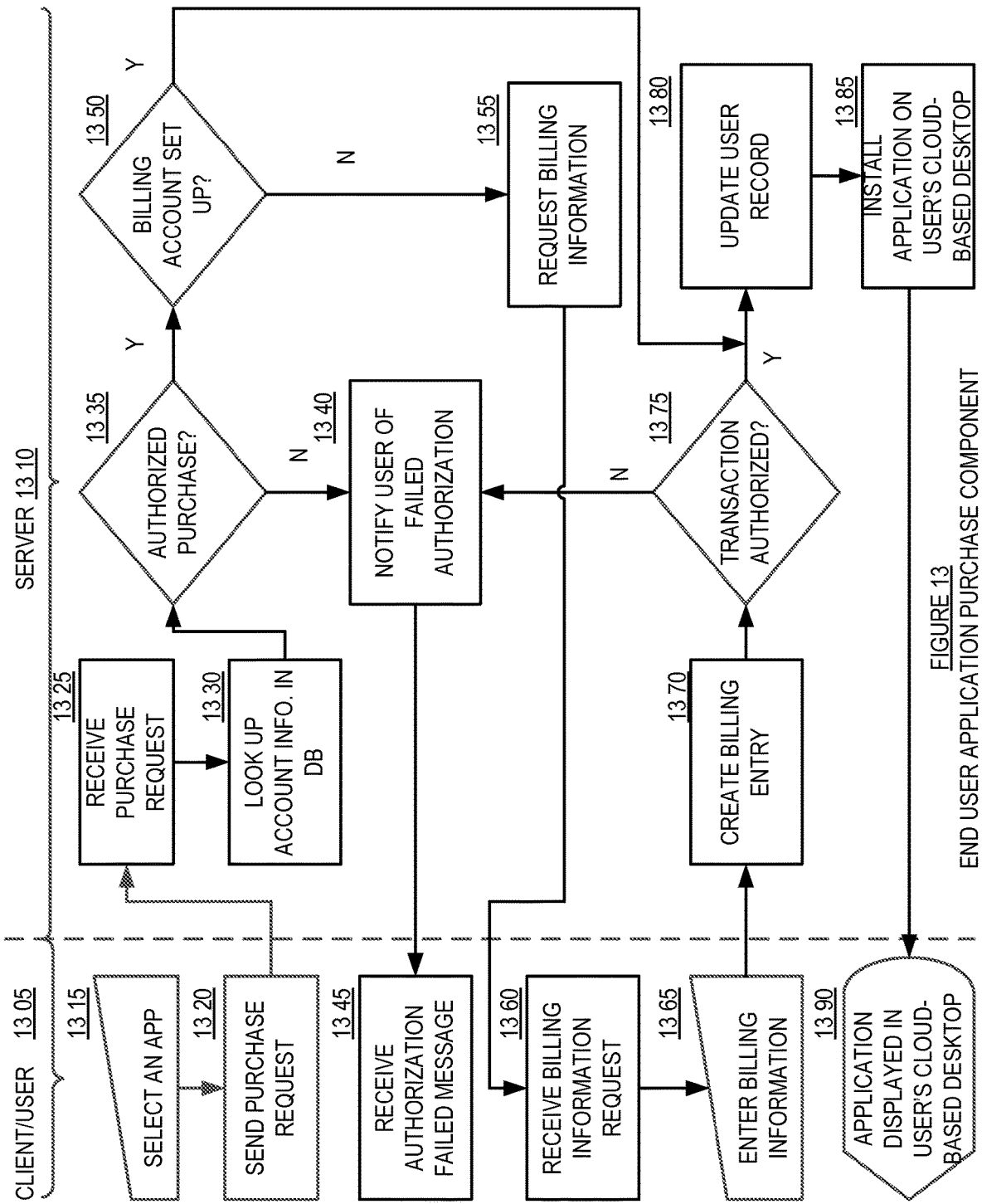
FIG. 13 shows a logic flow diagram illustrating example procedure for end-user application purchase from an example Subscription App Store in one embodiment of the CDSA Platform.

FIG. 13 shows a logic flow diagram illustrating example procedure for end-user application purchase from an example Subscription App Store in one embodiment of the CDSA Platform. In a Subscription App Store, a variety of applications, including bundles, add-ons, and services, may be available. Some of these applications may be pre-purchased for the end-user. In one implementation, the Node admin may set some applications as default applications for a Site. In a further implementation, the Site admin may provision additional applications for one or more end-users. The provisioned applications may be free or complimentary, or may have an associated price. In one implementation, an end-user 1305 may initiate an application purchase transaction from the Subscription App Store by selecting an application at 1315 and clicking it ON (or dragging the application from the Subscription Application window to his or her cloud-based desktop). In response to the ON click or drag and drop action, the client may create and send a purchase request at 1320 to the server 1310.

In one implementation, the purchase request may be an HTP(S) POST message including the purchase information for the cloud-based desktop server in the form of data formatted according to the XML, as shown below.

```
POST /purchase.php HTTP/1.1
Host: http://my.onlineworld.SkyDesktop.com
Content-Type: Application/XML
Content-Length: 1306
<?XML version = "1.0" encoding = "UTF-8"?>
<purchase_info>
    <signup_ID>4NFU4RG94</signup_ID>
    <timestamp>2011-02-22 15:22:43</timestamp>
    <client_details>
        <client_IP>192.168.23.126</client_IP>
        <client_type>smartphone</client_type>
        <client_model>HTC Hero</client_model>
        <OS>Android 2.2</OS>
    </client_details>
    <account_info>
        <username>SMarinkovic</username>
        <sitename>myonlineworld</sitename>
    <account_info>
    <purchase_details>
        <num_products>1</num_products>
        <product>
            <product_type>bundle</product_type>
            <product_params>
                <product_title>Bundle1</product_title>
            </product_params>
            <quantity>1</quantity>
        </product>
    </purchase_details>
</purchase_info>
```

The purchase request may be received by the server at 1325. In one implementation, the server may parse the received purchase request message to extract purchase details. The server may then query a database, e.g., User DB, for user account information at 1330. An exemplary query, written substantially in the form of Python/PHP/SQL commands, to identify user account information, is provided below:

```
<?PHP
header('Content-Type: text/plain');
mysql_connect("254.93.179.112",$DBserver,$password);
// access database server
mysql_select_db("USER.SQL"); // select database table to search
//create query for user data
$query = "SELECT user_restriction user_spendlimit user_currentspend
FROM
AccountTable WHERE username LIKE '%' $username";
$result = mysql_query($query); // perform the search
querymysql_close("USER.SQL"); // close database access
```

In another implementation, an Application database table may be selected to perform a similar query for the requested application to determine whether there are any restrictions on the purchase of the application. At 1335, based on the query results, a determination may be made as to whether the user may be authorized for the purchase transaction. For example, if the application has purchase restrictions, or if the user has purchase restrictions (e.g., user may be allowed a limited number of purchases per period of time or user has reached his or her spending limit, or the user is not allowed to purchase the requested application), the user may fail the purchase authorization. If the user's purchase request is authorized, a determination may be made at 1350 as to whether a billing account has been set up. For example, in one implementation, if the user is purchasing an application for the first time, a billing account may not be set up. In an alternate implementation, the user, as a part of the sign up process or profile creation/update process, may have provided billing information to the server. Such information may be stored in one or more databases and/or tables, e.g., Billing database. If the billing account has not been set up, the server may request billing information from the user at 1355. The client, upon receiving the request from the server, may load a credit card information form as a pop up window at 1360. The user may then enter billing information as requested at 1365. The entered billing information may be packaged as an HTTP(S) POST message, having the following XML data format in one implementation:

```
POST /purchase.php HTTP/1.1
Host: http://my.onlineworld.SkyDesktop.com
Content-Type: Application/XML
Content-Length: 1306
<?XML version = "1.0" encoding = "UTF-8"?>
<billing_info>
    <card_params>
        <card_firstname>Susmita</card_firstname>
        <card_lastname>Marinkovic</card_lastname>
        <card_type>AmEx</card_type>
        <card_num>123456789012345</card_num>
        <card_exp>012011</card_exp>
        <billing_address>123 Green St., Norman, OK 98765</billing_address>
        <phone>123-456-7809</phone>
    </card_params>
<billing_info>
```

Upon receiving the billing information message sent by the client/user, the server may, at 1370, create a billing entry in one or more databases and/or tables, e.g., Billing database. An exemplary query, written substantially in the form of Python/PHP/SQL commands, to store account information in the Billings database, is provided below:

```
<?PHP
header('Content-Type: text/plain');
mysql_connect("254.92.185.103",$DBserver,$password);
// access database server
mysql_select("BILLING.SQL"); // select database to append
mysql_query("INSERT INTO BillingTable (timestamp, card_firstname,
card_lastname, card_type, card_num, card_exp, billing_addres, zipcode,
phone)
VALUES (time( ),$card_firstname, $card_lastname, $card_type,
$card_num, $card_exp, $billing_addres, $zipcode, $phone);
// add data to table in database
mysql_close ("BILLINGS.SQL"); // close connection to database
```

At 1375, the server may send the billing information for payment processing to a payment processing network. If the transaction is authorized, at 1380, the server may update the user record in one or more databases and/or tables, e.g., User database. For example, fields that may need to be updated after the purchase include purchased application list, number of applications, type of applications purchased, tracked spending, and/or the like. The updated record may be necessary, in one implementation, for future purchase authorizations e.g., 1335. In a further implementation, at 1385, the server may send to the client device the necessary scripts, settings and/or configurations to display the application in the user's cloud-based desktop and the Subscription App Store. The user may then, at 1390, access the purchased application from his or her cloud-based desktop or Subscription App Store.

In the event of failed purchase authorization at 1335 or failed transaction authorization at 1375, the server may notify the user of such failed purchase or transaction authorization at 1340. The user may, in response to receiving the notification at 1345, take necessary actions to remedy the reasons for failed authorization. For example, the user may select another application that is not restricted, or may wait or obtain authorization from the Node admin. Additionally, if the transaction authorization failed, the user may reenter billing information or another payment identifier for authorization.

Once the billing information has been provided and saved in the server, the process of buying an application from a Subscription App Store, from the user perspective, may involve a single action. For example, the user may click On the On/Off control element next to the application. The server may carry out all the authorizations, and present to the user the purchased application on his or her cloud-based desktop and/or Subscription App Store (e.g., under MyApps) for immediate use. There is no need for downloading, entering verification keys, and performing manual installation.

The process of "uninstalling" or unsubscribing from an application via the cloud-based desktop service may be equally efficient and simple for an end-user. The user may simply click Off the On/Off control element next to the application that the user may desire to unsubscribe from. The server may immediately update billing and other account records and may load updated application and desktop setting such that the end-user may instantly see that the requested application has been turned off or unsubscribed. In one implementation, there may be provisions for refund for unsubscribed applications under certain conditions. For example, if an application is unsubscribed within x days of purchase, a refund may be determined. In a further implementation, the refund may be determined based on tracked usage history (e.g., the server may track user usage of various applications). Types of example refunds may include store credit, refund on the original form of tender, and/or the like.

Figure 14:
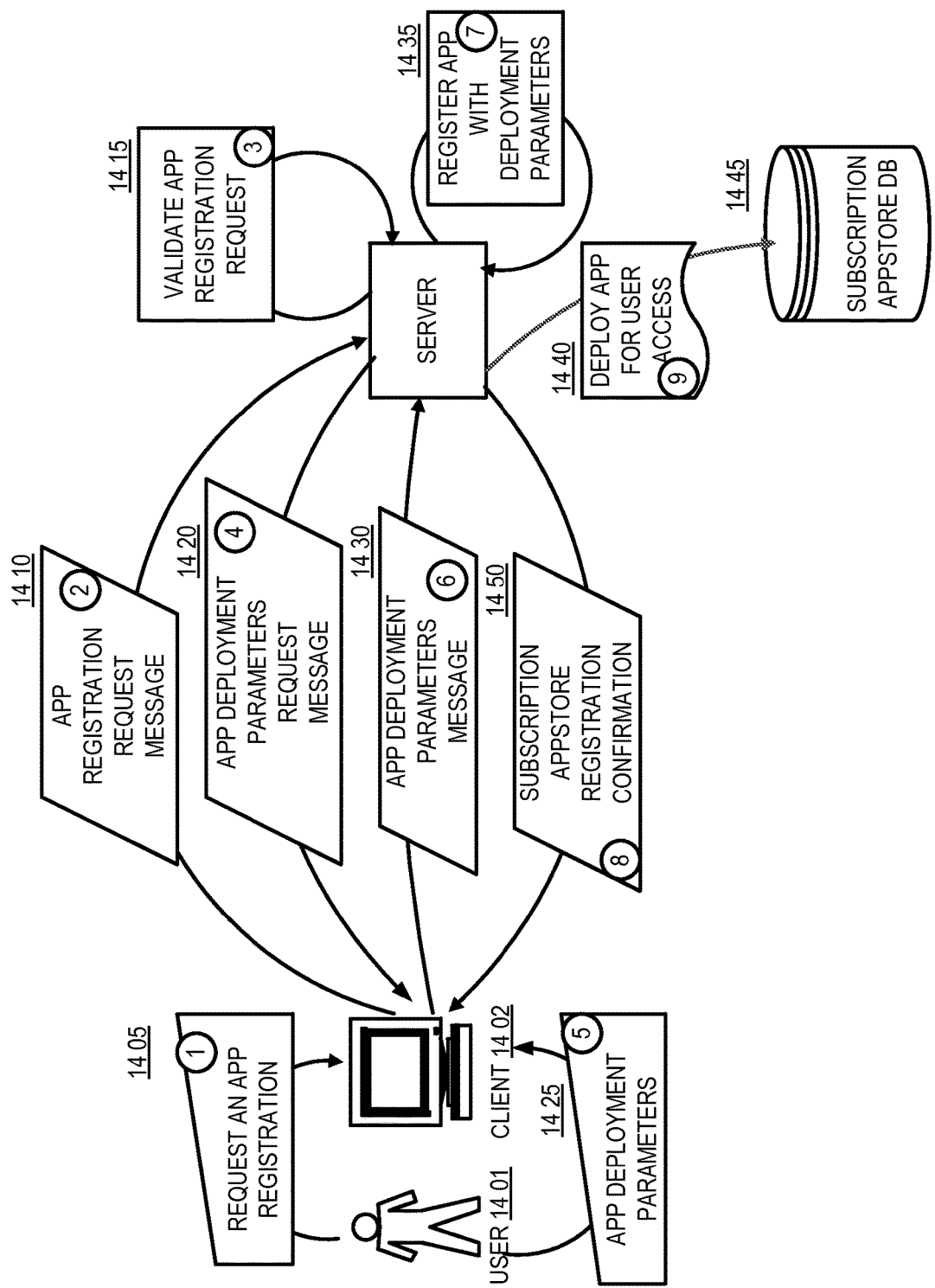
FIG. 14 shows a data flow diagram illustrating example procedure for developer application registration for deployment in an example Subscription App Store in one embodiment of the CDSA Platform.

FIG. 14 shows a data flow diagram illustrating example procedure for developer application registration for deployment in an example Subscription App Store in one embodiment of the CDSA Platform. In one implementation, a user 1401 (e.g., a developer, vendor, etc.), through a client 1402, may request registration of an application, such that the application may be available in Subscription Application Stores for end-users' consumption or use. The registration request may include information such as username, application link, application data file of application code (e.g., zip file), application description, price range, and/or the like. In one implementation, the registration request may be packaged as a registration request message 1410 and sent to the server 1406. An example registration request message formatted in XML may take the following form:

```
POST /registration.php HTTP/1.1
Host: http://my.SkyDesktop.com/dev_affiliate/signup.pyt
Content-Type: Application/XML
Content-Length: 1306
<?XML version = "1.0" encoding = "UTF-8"?>
<reg_info>
    <signup_ID>4NFU4RG96</signup_ID>
    <timestamp>2011-02-22 15:22:43</timestamp>
    <client_details>
    :
    :
    </client_details>
    <login_details>
        <username>BMarinkovic</username>
        <password>Boza123</password>
    </login_details>
    <contact_details>
        <account_firstname>Boza</account_firstname>
        <account_lastname>Marinkovic</account_lastname>
        <phone>123-456-7899</phone>
        <confirm_type>email</confirm_type>
        <contact_info>b.marinkovic@gmail.com</contact_info>
    </contact_details>
    <app_details>
        <app_link>http://myappworld.com/servicelogin</app_link> //if app is hosted externally
        <app_link_key>infostreet123</app_link_key> //if app is hosted externally
        <download_link> http://myappworld.com/proj1/smarttimer.zip </download_link> //if app is hosted internally
        <data_file>ghg47hk6!klj</data_file> //if app is hosted internally
        <format>tar.zip</format> //if app is hosted internally
        <icon_link>http://myappworld.com/smarttimer.png</icon_link>
        <moreinfo_link>http://myappworld.com/smarttimer</moreinfo_link>
        <desc>smart timer</desc>
        <company_name>My AppWorld, Inc.</company_name>
        <category>productivity</category>
        <type>addon</type>
        <keyword1>productivity</keyword1>
        <keyword2>timer</keyword2>
        <cost_per_month>50</cost_per_month>
        <cost_per_year>550</cost_per_year>
        <retail_per_month>60</retail_per_month>
        <retail_per_year>680<retail_per_year>
        <trial>no trial</trial>
    </app_details>
</reg_info>
```

The server may receive the registration request message and may parse the message to extract login, contact and/or app details. In one implementation, at 1415, the server may validate the registration request. In a further implementation, the validation may include verifying the contact detail information, the application product, and/or the like. The server may, upon validation, send an app deployment parameters request message 1420 to the applying developer or development company. In one implementation, the app deployment parameters may include, for example, a negotiated contract (e.g., developer may be offered 30%-50% or other negotiated percent of the retail price of an application), terms and conditions, billing/deposit account information, trial/no trial information, and/or the like. In a further implementation, the deployment parameters request message may take the form of a web page form, with text box field entries and check boxes for agreeing or accepting revenue sharing, terms and conditions, and/or the like. The user may input the requested deployment parameters at 1425. The entered parameters may then be packaged and sent as a message 1430, e.g., in XML format, to the server. In one implementation, the server may initiate registration of the application with the provided deployment parameters at 1435. In a further implementation, the registration may include parsing the received message to extract information for database fields, e.g., fields in a Subscription App Store database and/or Developer database. In another implementation, the registration includes creation of a database record. Details of the 1415 and 1435 processes are discussed in further detail with respect to FIG. 15. In one implementation, after the application has been registered, the server may send a registration confirmation message 1450 (e.g., confirming web page, email, text, HTTP POST message, etc.) to the user/client.

At 1440, the server may deploy the application for user access. In one implementation, the deployment of the application may include storing the application execution file (e.g., when the application is being hosted by the server) or storing a link to the application (e.g., when the application is being hosted elsewhere) in the Subscription App Store database 1445. An exemplary listing, written substantially in the form of Python/PHP/SQL commands, to store at least some of the application deployment parameters in the Subscription App Store database, is provided below:

```
<?PHP
header('Content-Type: text/plain');
mysql_connect("254.92.185.103",$DBserver,$password);
// access database server
mysql_select("APPSTORE.SQL"); // select database to append
mysql_query("INSERT INTO APPSTORETable (timestamp, desc,
company, moreinfo_link, category, type, keyword1, keyword2,
cost_per_month, cost_per_year, retail_per_month, retail_per_year,
trial)
VALUES (time( ),$desc, $company, $moreinfo_link, $category, $type,
$keyword1, $keyword2, $cost_per_month, $cost_per_year,
$retail_per_month, $retail_per_year, $trial); // add data to table in database
mysql_close("APPSTORE.SQL"); // close connection to database
```

Similarly, an exemplary listing, written substantially in the form of Python/PHP/SQL commands, to store at least some of the application deployment parameters in the App database, is provided below:

```
<?PHP
header('Content-Type: text/plain');
mysql_connect ("254.92.185.103",$DBserver,$password);
// access database server
mysql_select("APP.SQL"); // select database to append
mysql_query("INSERT INTO APPSTORETable (timestamp, app_link,
app_link_key, download_link, data_file, format, icon_link)
VALUES (time( ),$app_link, $app_link_key, $download_link, $data_file,
$format, $icon_link); // add data to table in database
mysql_close("APP.SQL"); // close connection to database
```

Once deployed, the server may facilitate any user request for the application service instantly by running the application on the server hardware, or routing the request to the developer's server. In one implementation, after the application has been deployed for access by users, the server may send a deployment confirmation message (e.g., confirming web page, email, text, HTTP POST message, etc.) to the user/client.

Figure 15:
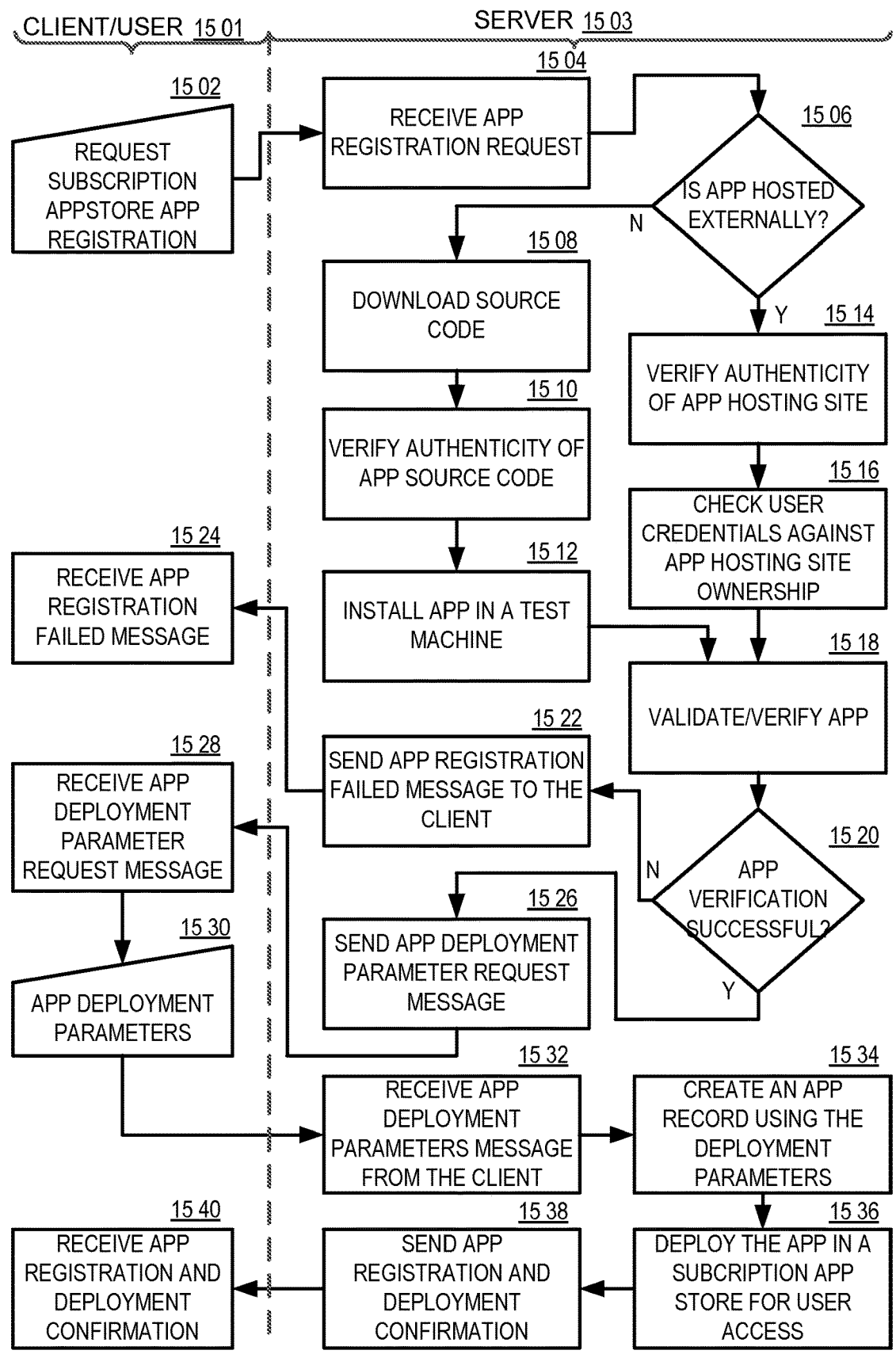
FIG. 15 shows a logic flow diagram illustrating example procedure for developer application registration for deployment in an example Subscription App Store in one embodiment of the CDSA Platform, e.g., a Developer Application Registration Component (DARC)

FIG. 15 shows a logic flow diagram illustrating example procedure for developer application registration for deployment in an example Subscription App Store in one embodiment of the CDSA Platform, e.g., a Developer Application Registration Component (DARC). In one implementation, a client/user/developer 1501 may initiate a request for application registration at 1502. The server may receive the registration request message at 1504 and make a determination at 1506 based on information extracted from the message whether the application is hosted externally. In one implementation, the registration procedure for applications hosted externally or hosted by the server internally may be different, and may invoke different revenue sharing models and/or packaging for presentation and marketing. In one implementation, if the application is to be run on the CDSA Provider Node, at 1508, the source code for the application may be obtained (e.g., developer may upload a zip file, may provide a download link, etc). At 1510, the authenticity of the app source code may be verified, for example, to prevent developers from submitting apps developed by others. At 1512, the application may be tested, for example, by installation in a test machine or client.

In another implementation, the application may be hosted externally (e.g., by the developer, or other cloud-based hosting services). In such a case, the authenticity of the application hosting Site may be verified at 1514 to ensure, for example, the hosting Site is a legitimate service provider. In a further implementation, the developer credential may be checked against the application hosting Site ownership to confirm, for example, that the developer has the rights of ownership to request registration of application with the Subscription App Store.

At 1518, the application may be verified or validated based on the results of testing or authenticity verification from 1512 or 1516. For example, the source code or application may be verified and/or validated for compatibility with CDSA Platform or other standard platforms, for virus or other embedded malware, and to make sure that the application is bug free and delivers on the features and functionalities claimed.

If the verification at 1520 is successful, the application may be approved and a deployment parameters request message may be sent to the client at 1526. As discussed in FIG. 14, the deployment parameters may include, for example, a negotiated contract (e.g., developer may be offered 30%-50% or other negotiated percent of the retail price of an application), terms and conditions, billing/deposit account information, trial/no trial information, cost, retail price, private/original label and/or the like. The developer may receive the request at 1528 and may enter the requested deployment parameters at 1530. The client may package the entered deployment parameters in a HTTP(S) POST message having for example XML data format as discussed with regard to FIG. 14, to the server.

The server may receive the message at 1532 and may then create an application record at 1534 using the developer provided deployment parameters. The application record created may be saved in one or more databases and/or tables, e.g., App Store database, Developer database, and/or the like.

At 1536, the server may deploy the application in, for example, the App Store database, for user access. In one implementation, the deployment of the application may include storing the application executable file or a link to the application in the Subscription App Store database 1445. In one implementation, after deploying the application, the server may send a registration and deployment confirmation message 1538 to the developer, which may be received by the developer at 1540.

Figure 16A:
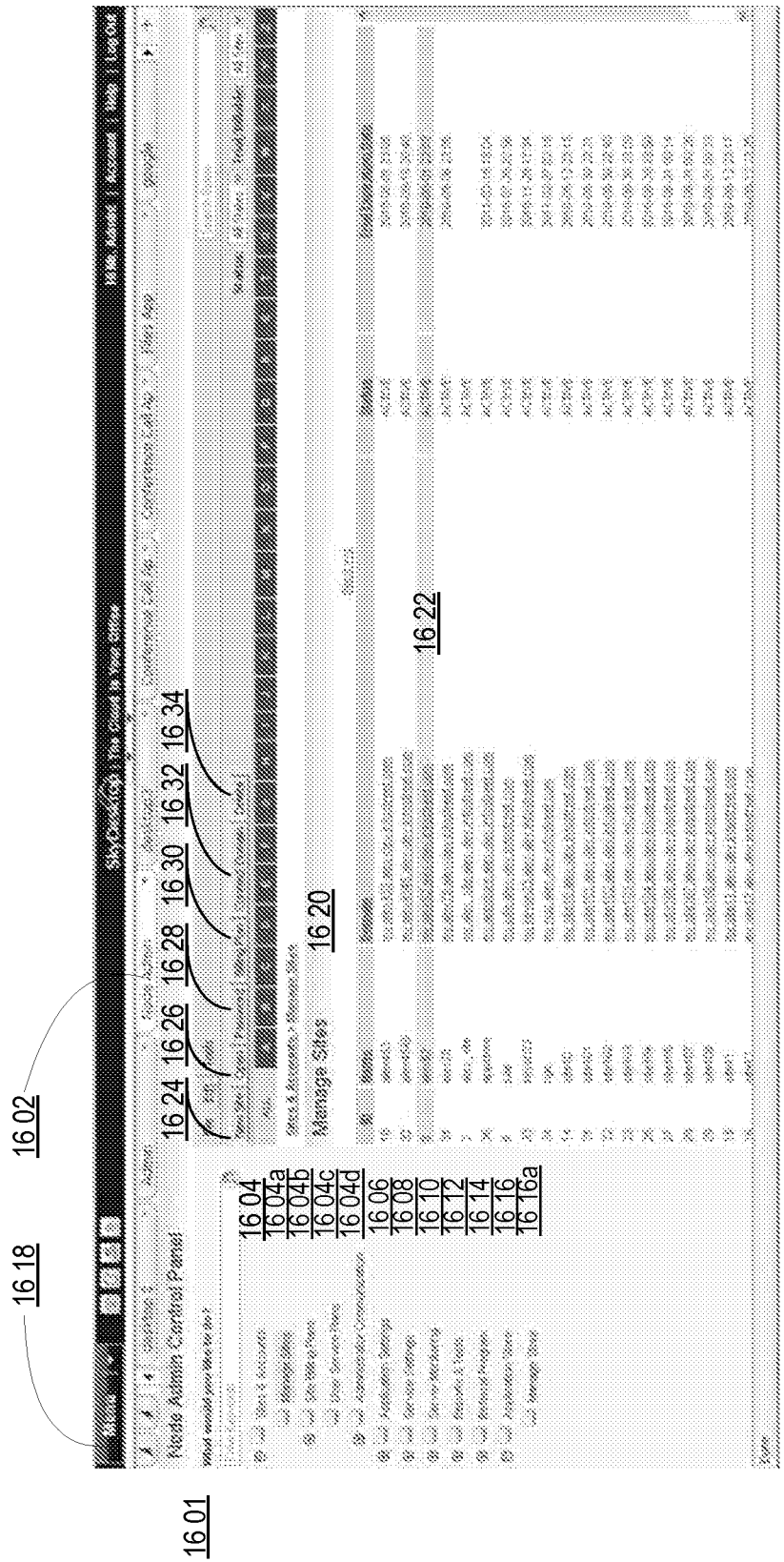
FIGS. 16A-B show screenshot diagrams illustrating example Node admin facing interfaces and tools in one embodiment of the CDSA Platform.
Figure 16B:
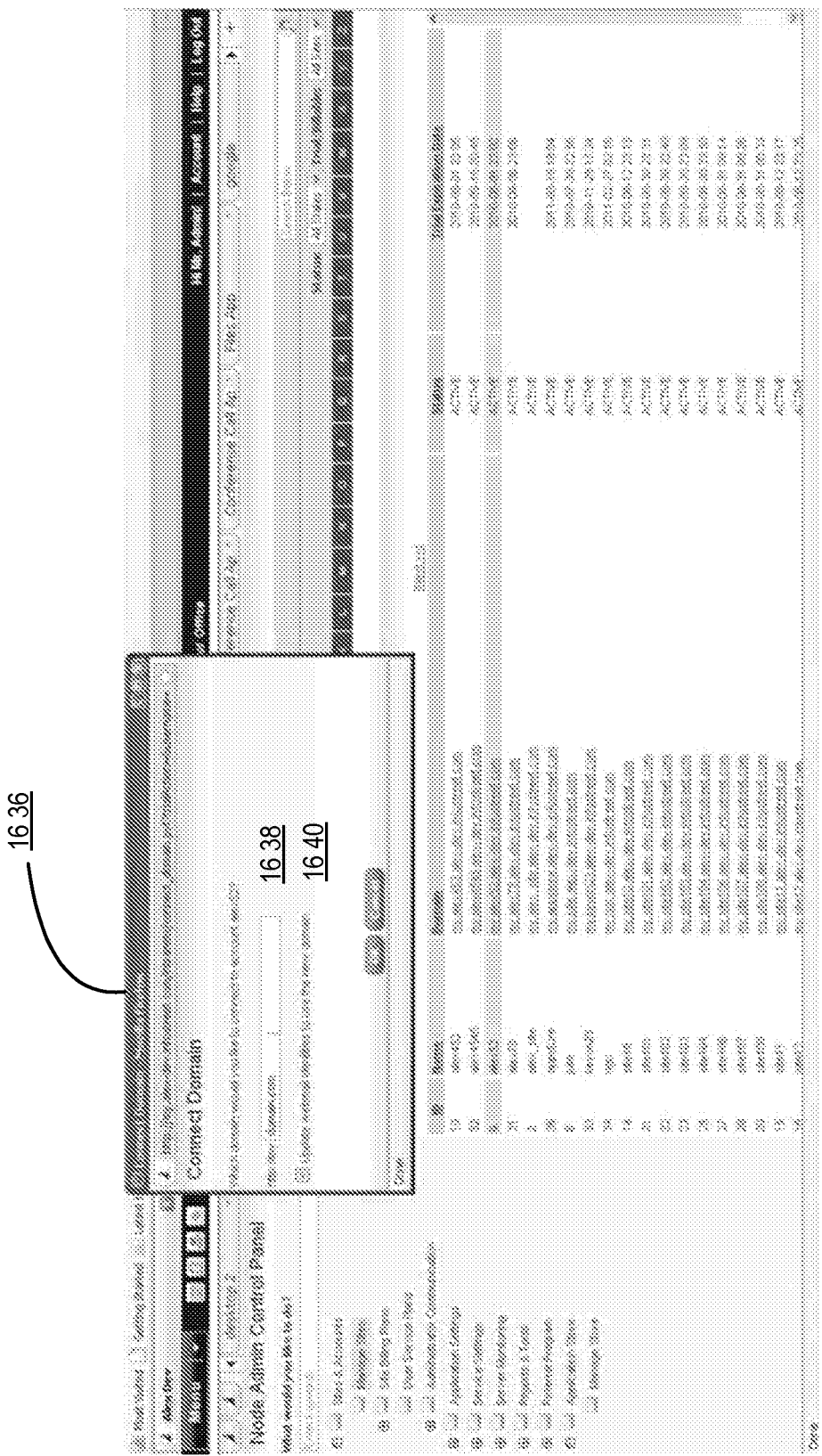
Figure 16C:
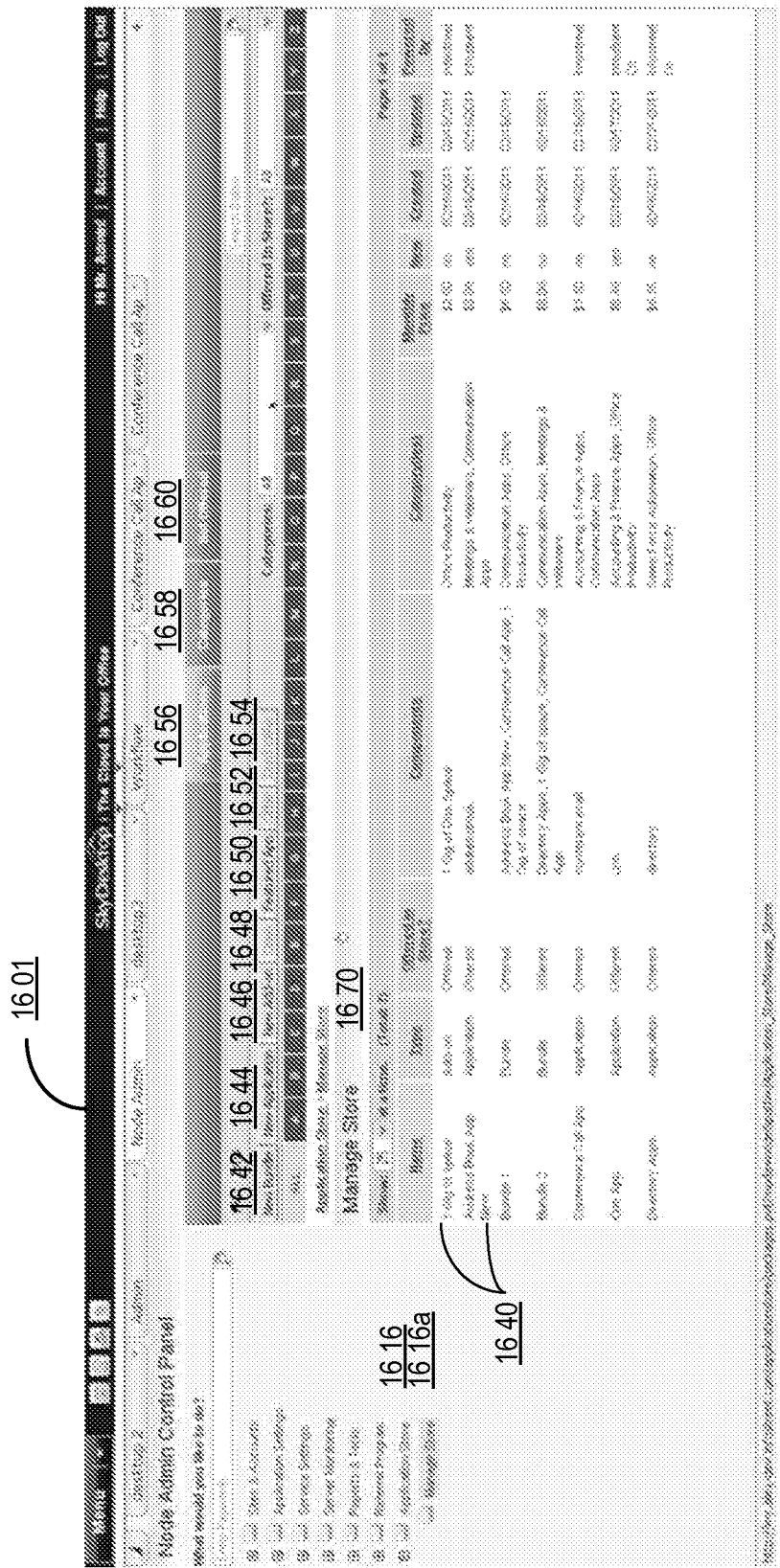
FIGS. 16C-E show screenshots illustrating example Node admin facing interfaces and tools for subscription App Store configuration and management in one embodiment of the CDSA Platform.

FIGS. 16A-B show screenshot diagrams illustrating example Node admin facing interfaces and tools in one embodiment of the CDSA Platform. In one implementation of the CDSA Platform, for example as shown in FIG. 16A, a Node admin may launch a Node admin control panel 1601 via a Node admin option on the menu 1618. When the Node admin option on the menu 1618 is selected, the Node admin control panel 1601 may appear on a Node admin tab 1602. On the left hand side of the Node admin control panel 1601, may be various tools for managing various Sites and Accounts 1604, Application Settings 1606, Service Settings 1608, Server Monitoring 1610, Reports and Tools 1612, Referral Program 1614, Application Store 1616, Manage Store 1616a, and/or the like. Under the Sites and Accounts tool 1604, may be further options for Manage Sites 1604a, Site Billing Plans 1604b, User Service Plans 1604c, Administrator Communication 1604d, and/or the like. In one implementation, the Node admin may select Manage Sites folder 1604a, which may load a frame Manage Sites 1620 on the right hand side of the Node admin interface 1601. In a further implementation, the Node admin may select a Site 1622, e.g., a Site having alex52 name and a domain my.alex52.alex-dev.infostreet.com from the Manage Sites frame 1620. The Node admin may then click on any one of the buttons 1624-1634 to change or manage and/or edit the Site alex52's attributes. For instance, by clicking on the New Site button 1624, the Node admin may instantly create a new Site (e.g., FIGS. 4 and 5), register and connect a domain to the new Site and configure file system, mail server and other components needed to make the Site fully operational. In another example, by clicking on the Open button 1626, the Node admin may open the Site and view the Site interface. The Password button 1628 may be clicked to set, change, and/or view passwords associated with the Site. The Billing Plan button 1630 may be associated with the Site billing plan and associated billing information. For example, the Node admin may set a billing plan for the Site or specify billing plan options for the Site such that the admin of the Site may select a billing plan from the options available. Examples of billing plans include free, Standard, Silver, Gold or Platinum. Billing plans may include all or some of the following example features: a minimum number of users/limited number of users/unlimited number of users, automatic software upgrades, unlimited web based support, free domain with at least one paid month, a specified cost per additional user per month, phone support for Site admin, and/or the like.

In one implementation of the CDSA Platform, for example, as shown in FIG. 16B, the Node admin may click on Connect Domain button 1632 to connect a new domain to the alex52 Site. Upon selecting the connect domain button 1632, a Connect Domain window 1636 may pop up asking the Node admin to enter a domain to connect the selected Site 1622 alex52. The Node admin may enter the domain name 1638 (e.g., myhelloworld.com) and check the box 1640 to request automatic update of webmail identities (e.g., web server backing stores, app sources, etc.) to use the new domain. By this action, Site Alex52 may now be accessed by going to, for example, http://myhelloworld.com instead of my.alex52.alex-dev.infostreet.com.

Figure 16D:
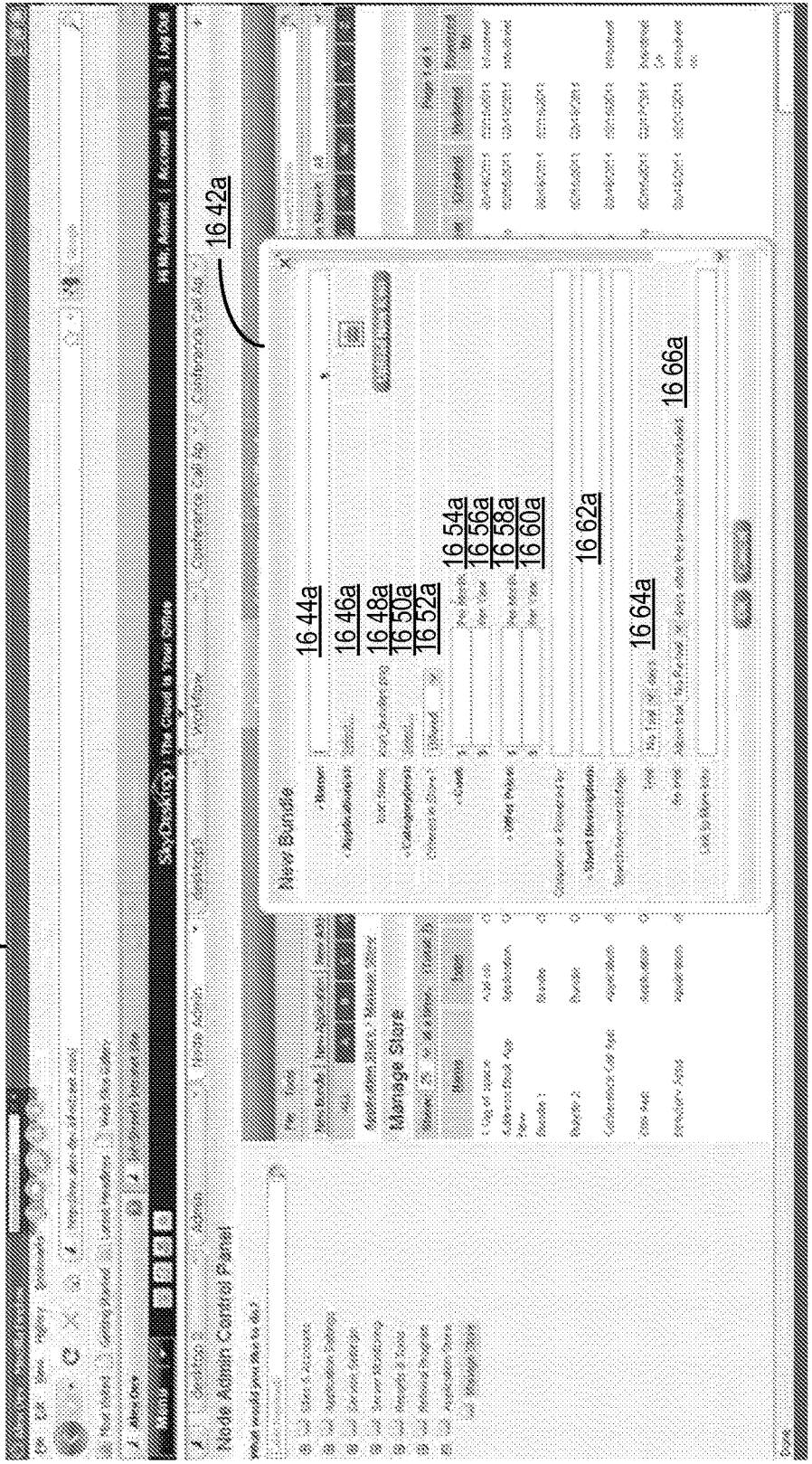
Figure 16E:
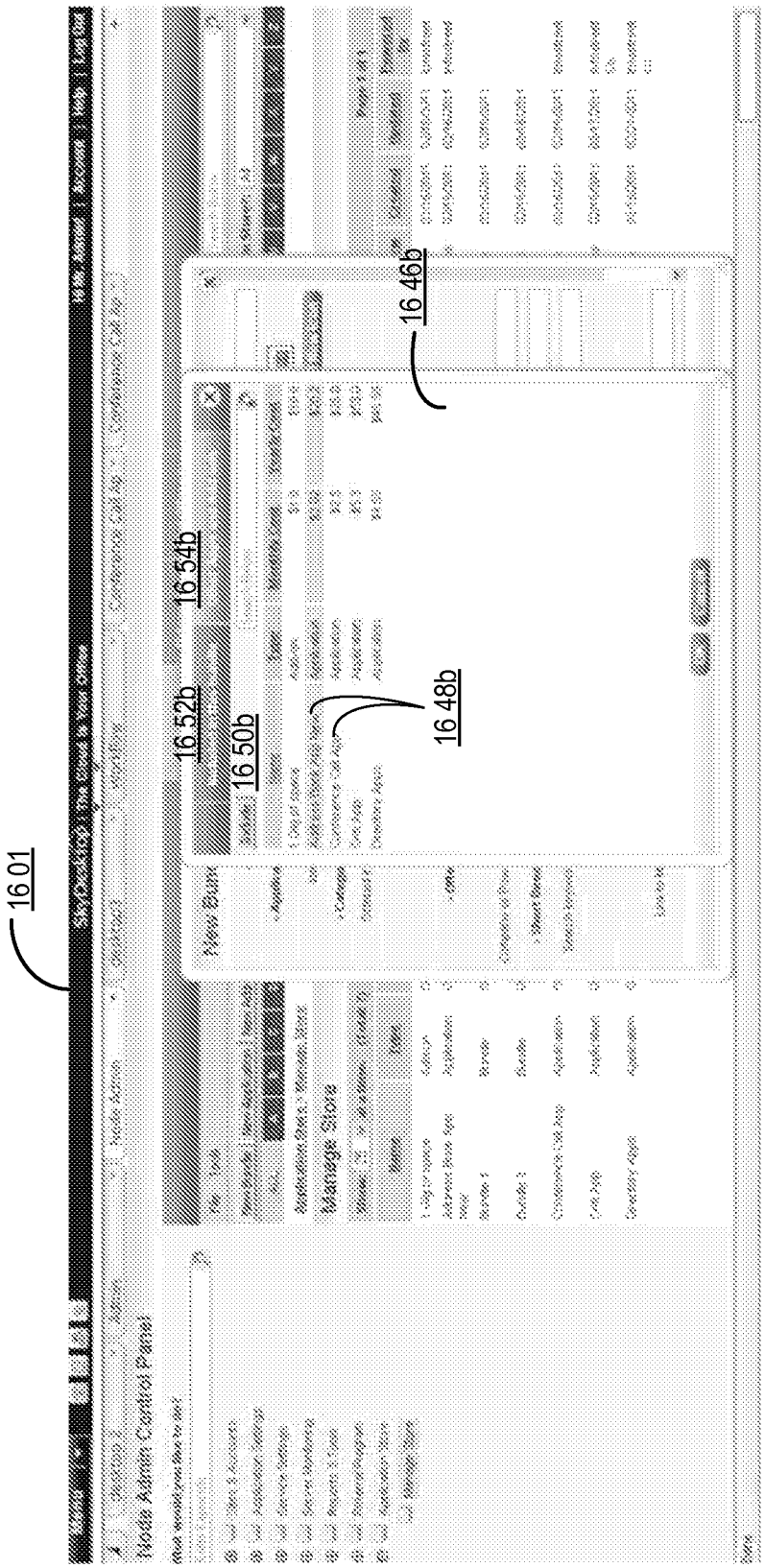

FIGS. 16C-F show screenshots illustrating example Node admin facing interfaces and tools for Subscription App Store configuration and management in one embodiment of the CDSA Platform (e.g., see FIGS. 7, 8 and 9). In one implementation, the Node admin may select the folder Application Store 1616 and drill down to select the folder Manage Store 1616a to begin management of application store. Upon selection of the Manage Store folder 1616a, a corresponding Manage Store frame 1670 and Manage Store tools 1641-1654 and view options 1656-1660 may be launched. The Manage Store frame 1670 may list the list of applications available at the Node-level. In one implementation, the Node admin may select the button New Bundle 1642 to create a new bundle, which may include a combination of apps, add-ons and/or services packaged into a single deal. For example, FIG. 16D shows the New Bundle window 1642a, where the Node admin may enter a bundle name (e.g., Bundle 3) 1644a and select one or more applications 1646a. When the select button 1646a is clicked, a window 1646b may pop up, as illustrated in FIG. 16E. The Node admin may select two or more of the applications 1648b and click on the Include button 1650b to add the selected applications into the new bundle 1644a. The Node admin may also click on the tab 1652b to view applications included in the new bundle 1644a and tab 1654b to view other applications and add-ons.

Referring back to FIG. 16D, the Node admin may select an icon 1648a, an application category 1650a (e.g., productivity, CRM, sales, etc.), and determine whether the bundle should be offered or not offered in store at 1652a. In addition, the Node admin may also input the cost of the bundle per month at 1654a, the cost per year being calculated automatically at 1656a. The cost 1654a may be the cost incurred in developing or purchasing any applications, add-ons or services included in the bundle. The Node admin may also set an offer price 1658a per month, the offer price per year 1660a being calculated automatically. The calculated price may be edited. The offer price 1658a, in one implementation, may be the price at which the bundle may be purchased by admin or end-users. The Node admin may also enter a short description of the bundle in text box 1662a. In addition to the bundle attributes discussed above, the Node admin may also define whether a trial period/no trial period is to be set at 1664a, and whether any retrials may be allowed at 1666a. Whether an application, bundle or add-on is new or not, it may be marked as "new," and highlighted in the Subscription App Store with an icon, different color, and/or the like to bring the application to the attention of users.

Referring back to FIG. 16C, the Node admin may also add a New Application 1644, a New Add-on 1646, Open one or more selected applications 1648, define one or more selected applications as Featured Applications 1650, Offer 1652 or Not Offer 1654 one or more selected applications, and/or the like. Further, the Node admin may utilize the Applications tab 1656 to view all applications, bundles and add-ons in the Subscription App Store, regardless of their offer/not offer status. The Categories tab 1658 may list all the categories of applications in the Subscription App Store and the Not Offered tab 1650 may list all the applications that are currently not offered in the Subscription App Store.

Figure 17A:
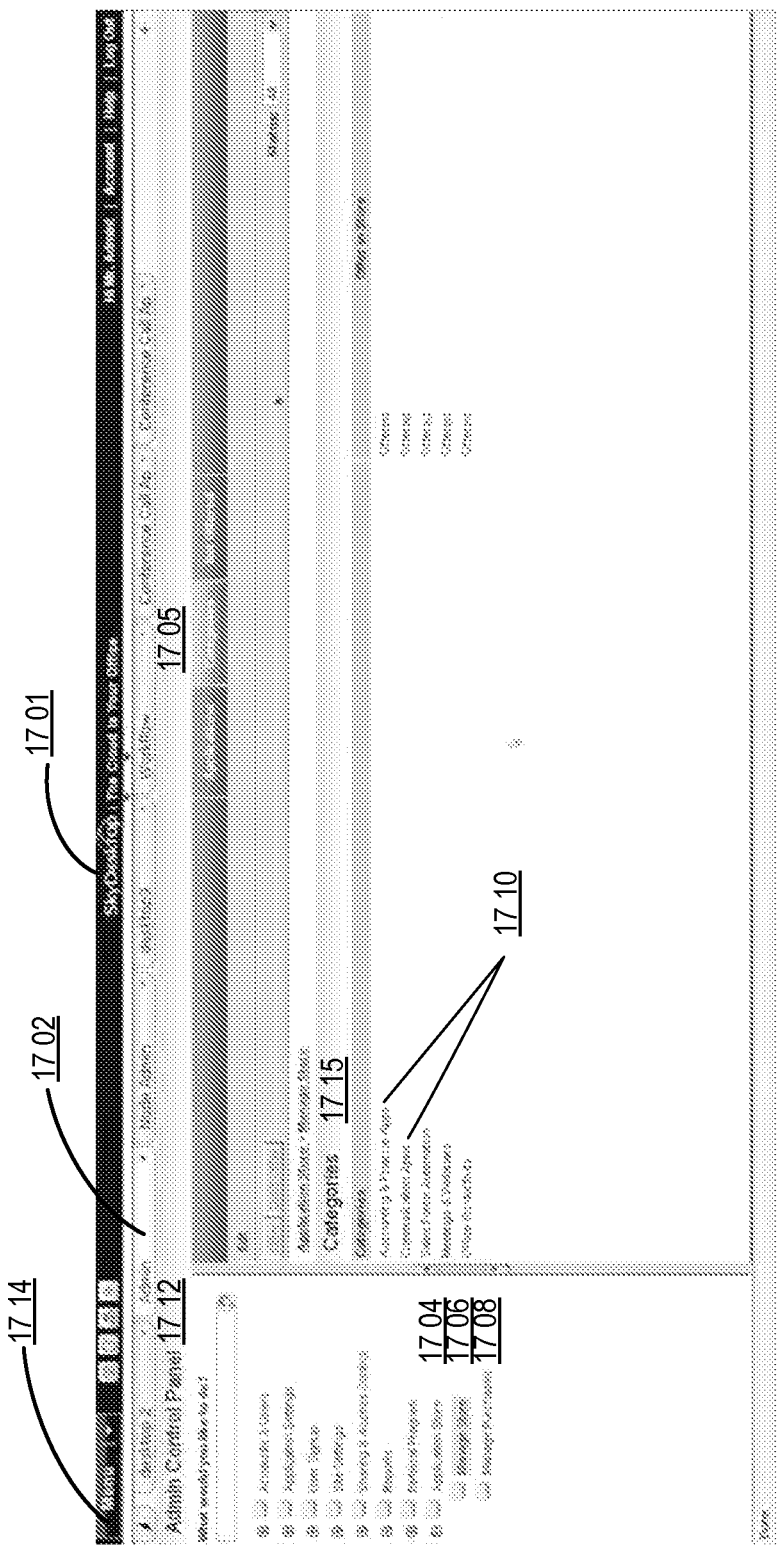

FIGS. 17A-F show screenshots illustrating example admin facing interfaces and tools for managing accounts/ users, application settings, Site settings, and/or the like in one embodiment of the CDSA Platform. In FIG. 17A, for example, Admin option may be selected from the menu 1714 to invoke the Admin Control Panel 1712, which may be loaded on a webpage on a browser 1701 under the tab Admin 1702. The Admin Control Panel 1712 may be similar in look and feel to the Node Admin Control Panel in FIGS. 16A-E. For example, an admin may manage Application Store 1704 for end-users. Further the admin may Manage Store 1706 and Manage Purchases 1708 via the Admin Control Panel 1712 web interface. In one implementation, when the folder Manage Store 1706 is selected from the Admin Control Panel 1712, a list of applications, categories of applications or not offered applications may be viewed. For example, when Categories 1705 is selected, a Categories frame 1715 is loaded on the webpage on the right. A list of categories of applications 1710 may then be displayed in the Categories frame. Example categories of applications 1710 may include, without limitation, Accounting & Finance Apps, Communication Apps, Sales Force Automation, Meetings & Webinars, Office Productivity, and/or the like.

Figure 17B:
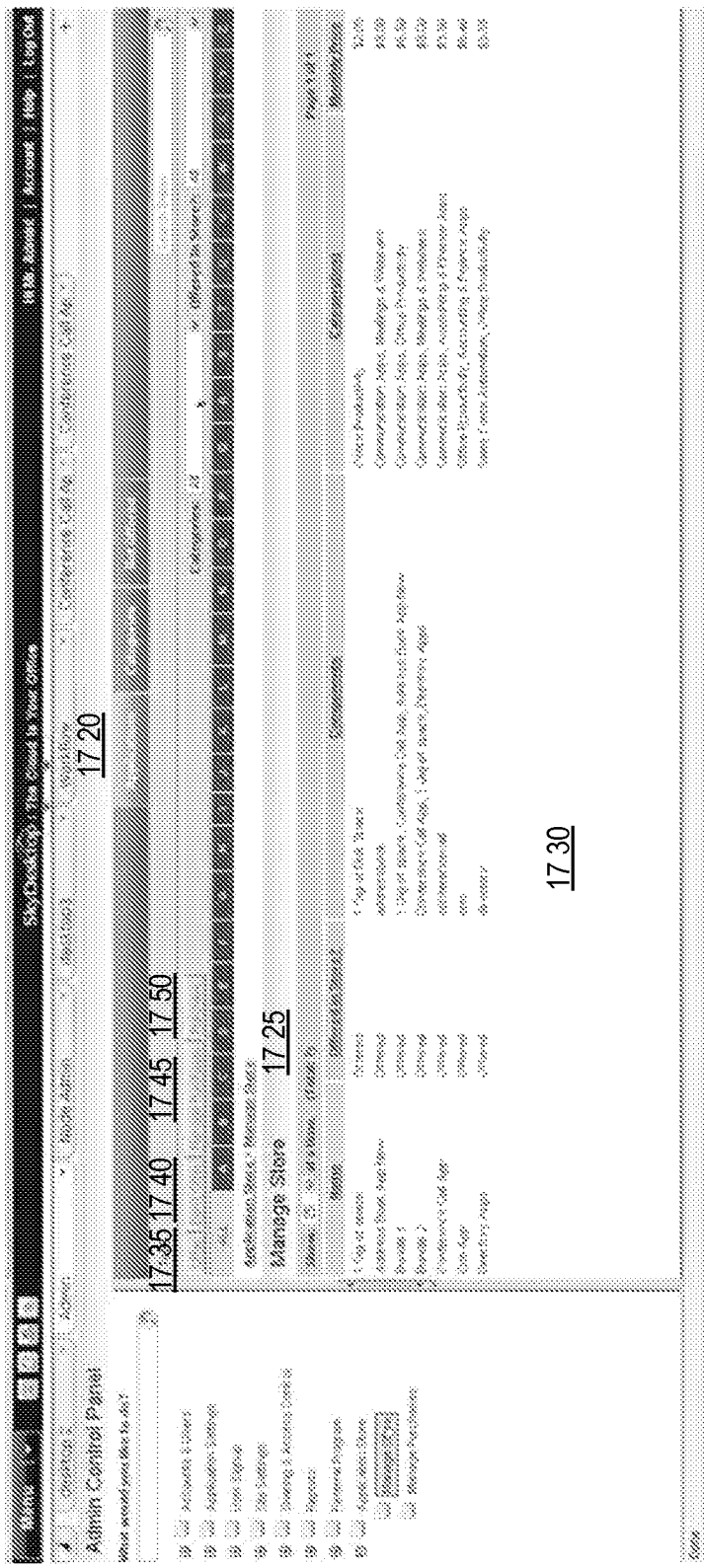
Figure 17C:
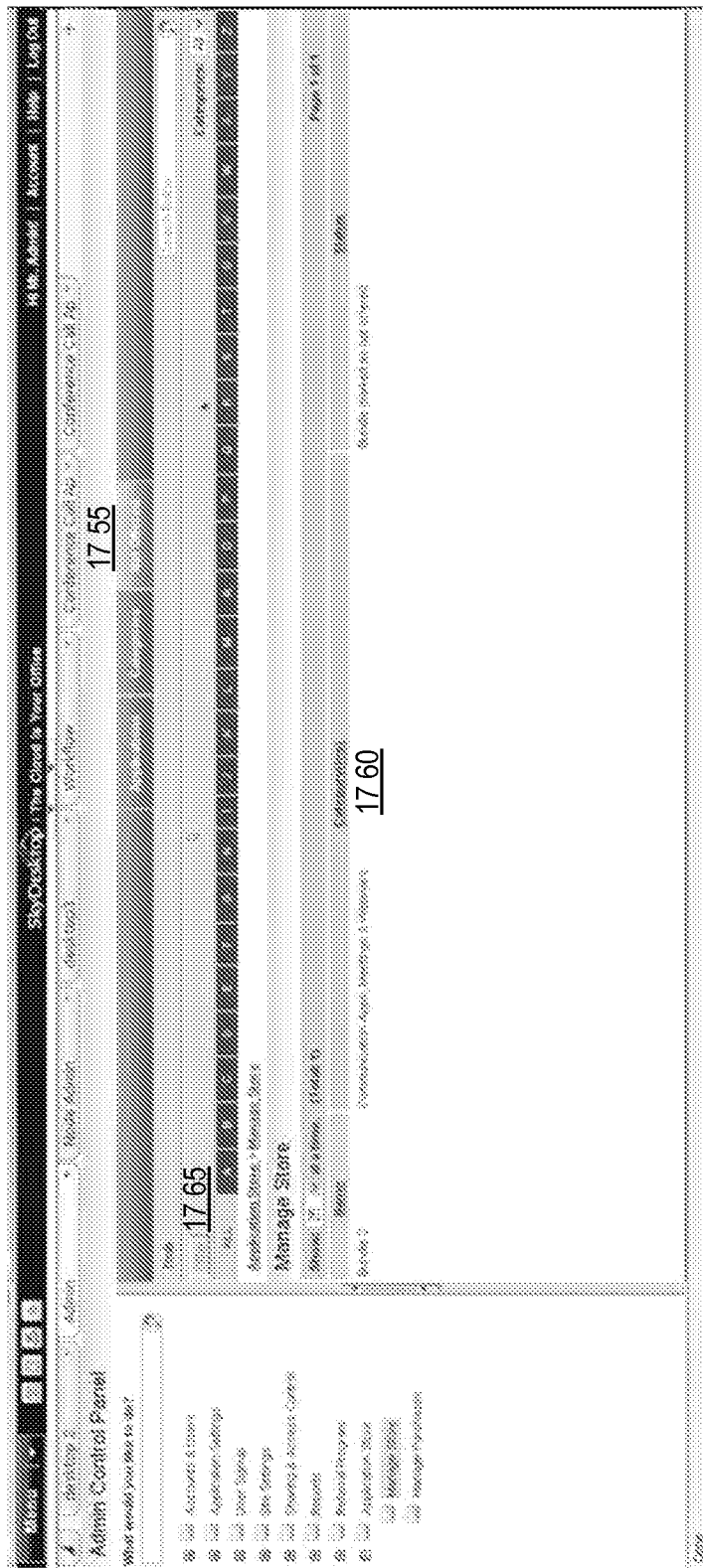

In another implementation, as shown in FIG. 17B, an admin may click on Applications button 1720 to view a list of applications 1730 that are offered by the Node admin for the Site being managed by the admin. The admin has provisioning rights and thus has the rights to manage the Subscription App Store for end-users. For example, the admin may select one or more applications 1730 listed under the Manage Store frame 1725 and apply one or more attributes 1735-1750. Using the Offer and Don't Offer buttons 1735 and 1740 respectively, the admin may add or remove one or more applications from one or more end-users' Subscription App Store. For example, a Node admin may offer a variety of gaming applications in the Subscription App Store at the Site level. However, the admin, looking to increase productivity of employees, may decide to not offer gaming applications in the employees' Subscription App Store. In another implementation, the admin may click on Purchase button 1750 to purchase an application. For example, an admin may pre-purchase an extra 1 GB of disk space for end-users. As a result, the end-users may obtain, in addition to their default disk space, the extra 1 GB of disk space. Similarly, the admin may pre-purchase for the end-users one or more applications and such pre-purchased applications may appear on the end-users' Subscription App Store and on the end-users' cloud-based desktop, ready for use. The end-users may simply turn on, open or drag and drop on their cloud-based desktop any authorized (e.g., a for-purchase application may be turned on after the purchase transaction is authorized) and pre-purchased applications to begin using the applications. In one implementation, as shown in FIG. 17C, the admin may also view not offered applications 1760 by clicking on the Not Offered tab 1755. The admin may additionally select the not offered application 1760 and click on Offer button 1765 to offer the application.

Figure 17E:
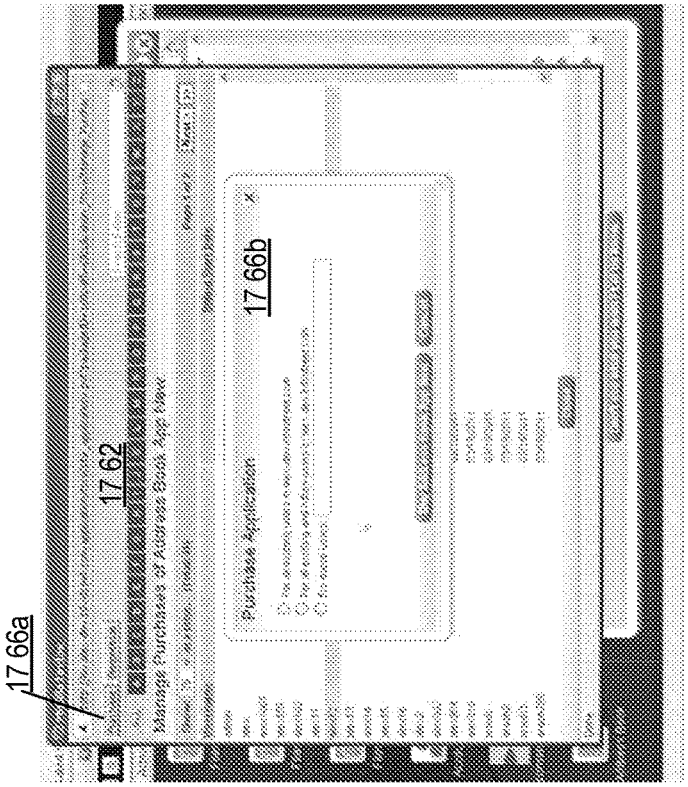
Figure 17D:
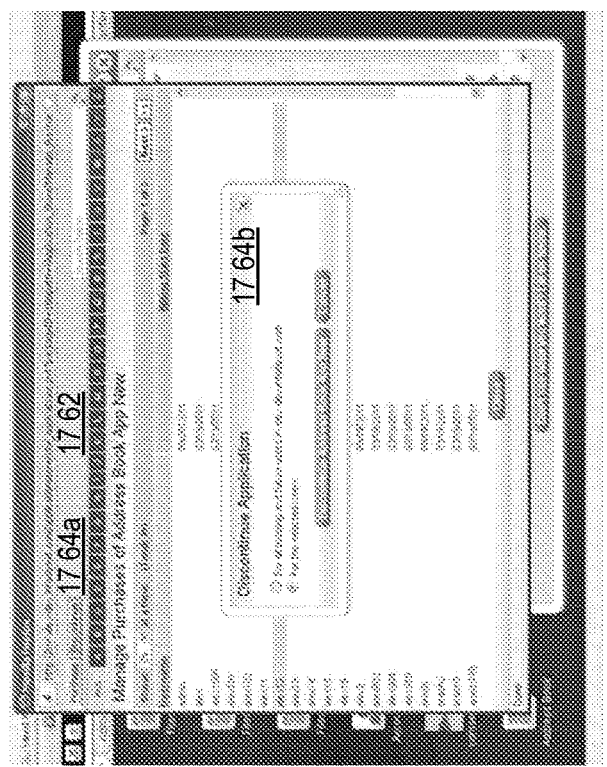

In one implementation, the admin may manage purchases of applications via the Manage Purchases button 1745. For example, the admin may select an application, e.g., Address Book App New and click on Manage Purchases button 1745. In another implementation, as illustrated in FIGS. 17D-E, the admin may access the Subscription App Store to view a list of applications, select an application, e.g., Address Book App New and click on the Manage Purchases button. In both of these implementations, a Manage Purchases window 1762 may pop up, as shown in FIGS. 17D-E. In one implementation, as shown in FIG. 17D, the admin may select a user (e.g., alex12) and click on Discontinue button 1764*a*. In response to the request, a Discontinue Application window 1764*b* may pop up, to obtain confirmation to discontinue application for the selected user (alex12), a group of users (e.g., by multiple selection) or all users. In another implementation, as shown in FIG. 17E, the admin may select the Purchase button 1766*a*, and in response, a Purchase Application window 1766*b* may pop up asking the admin to confirm whether the application is to be purchase for the selected user (alex12), a list of users, or all users.

Figure 17F:
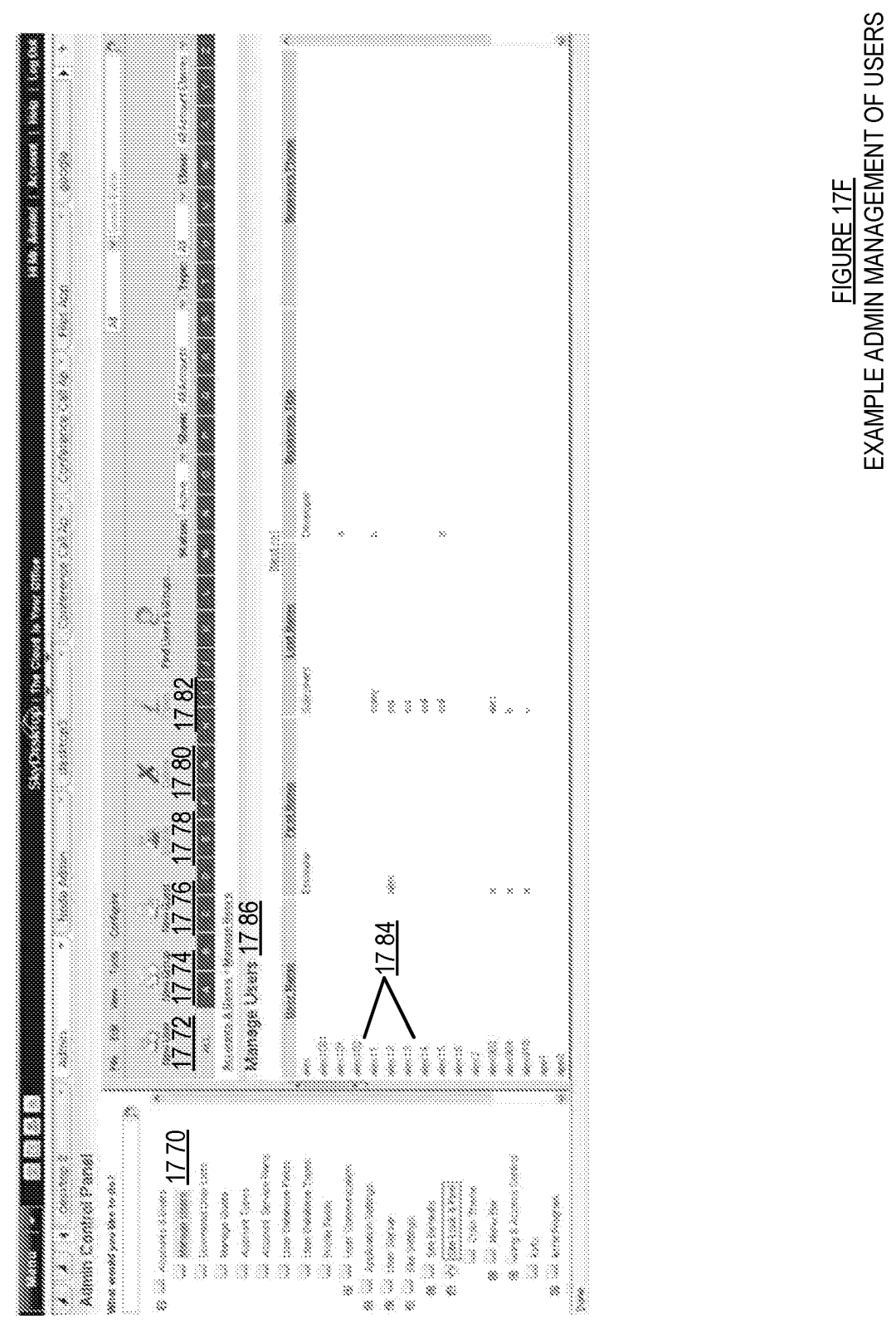

In one implementation, the admin facing web interface provided by the CDSA Platform may include user management tools. For example, as shown in FIG. 17F, the admin may select Manage Users folder 1770 under Accounts & Users folder listed in the Admin Control Panel. Upon selection of the Manage Users folder 1770, a Manage Users frame 1786 may be loaded into the webpage. In one implementation, the admin may wish to create one or more new users. To create a new user, the admin may click on the New User icon 1772. A New User window may pop up in response to the New User creation request. The admin may provide first name, last name, username and password to create a new user. In another implementation, the admin may upload a .CSV, .txt or other files for batch new user creation. Upon creation of the new user, the CDSA Platform may instantly create a new Site (e.g., a web page) for the new user, associate an account plan as defined by the Site settings, configure mail, disk space, and/or the like. Similarly, by clicking on the New Group icon 1774 or the New Guest icon 1776, the admin may create a new group account or a new guest account. In another implementation, one or more users 1784 listed under Manage Users 1786 may be enabled using the Enable icon 1778 or deleted using the Delete 1780 icon. In yet another implementation, the admin may select one or more users 1784 and may open their account profiles, such as the web page shown in FIG. 21, by clicking on the Open icon 1782.

Figure 17H:
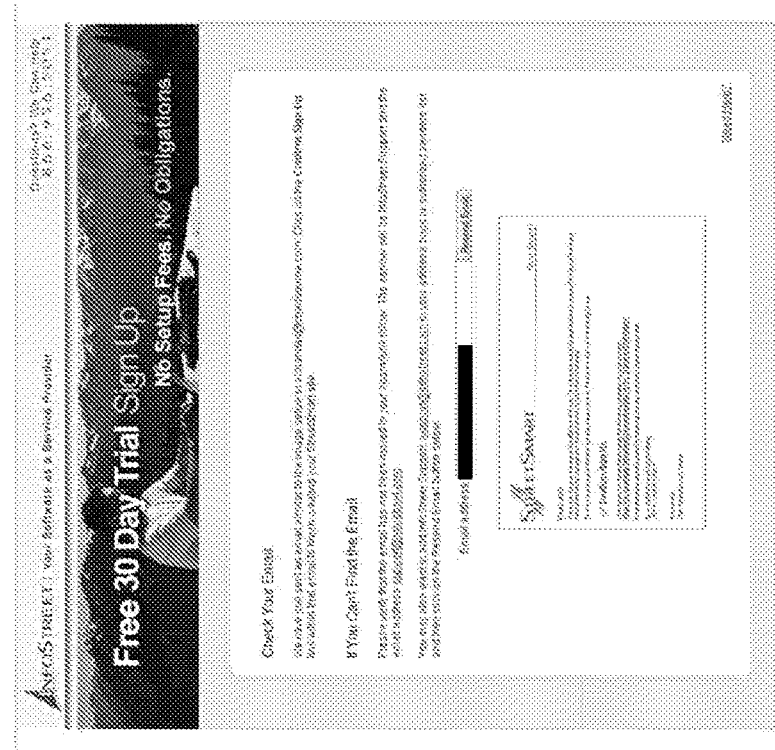
FIGS. 17G-K show screenshots illustrating example interfaces for Site sign up in one embodiment of the CDSA Platform.
Figure 17G:
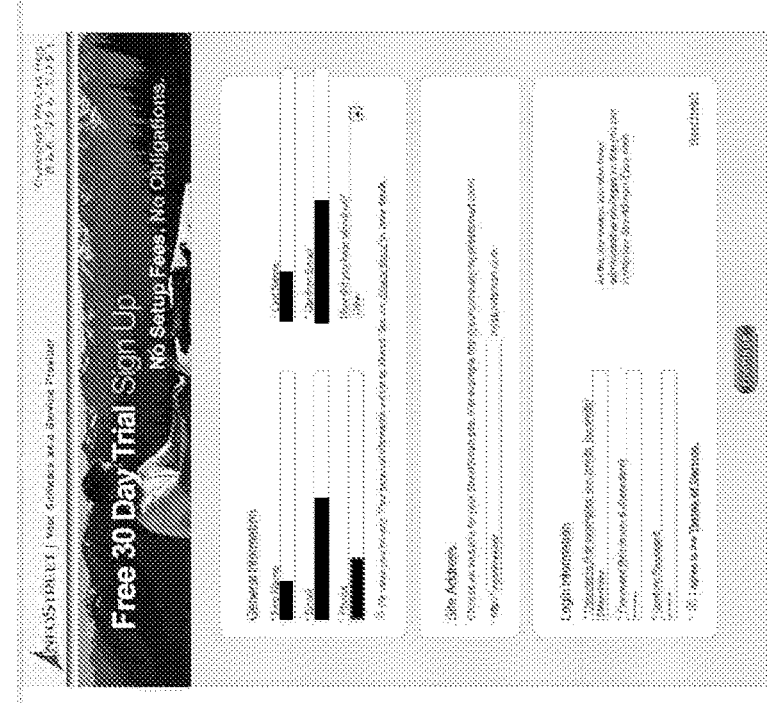
Figure 17J:
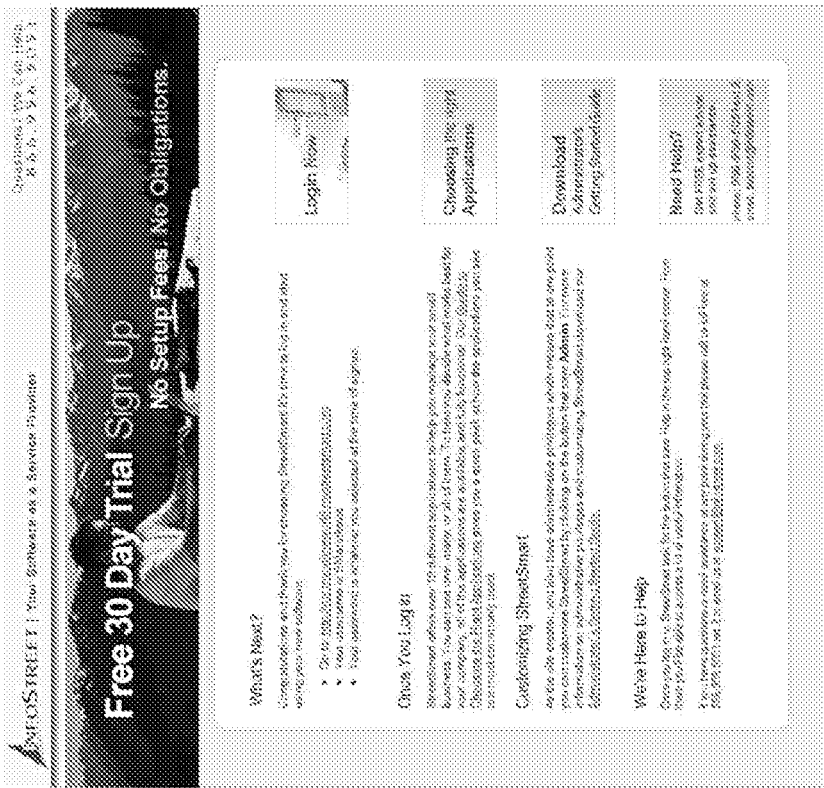
Figure 17I:
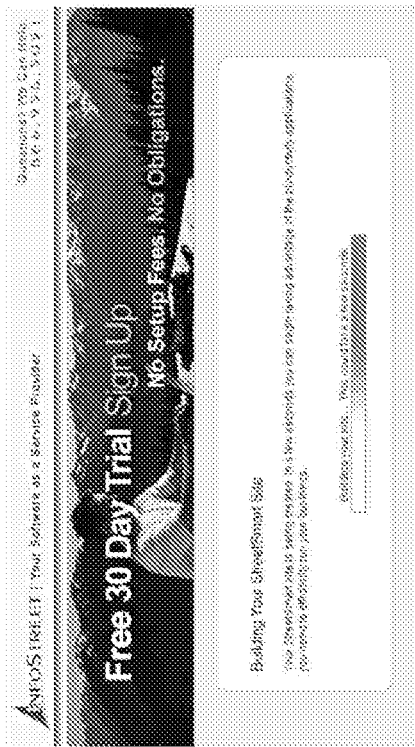
Figure 17K:
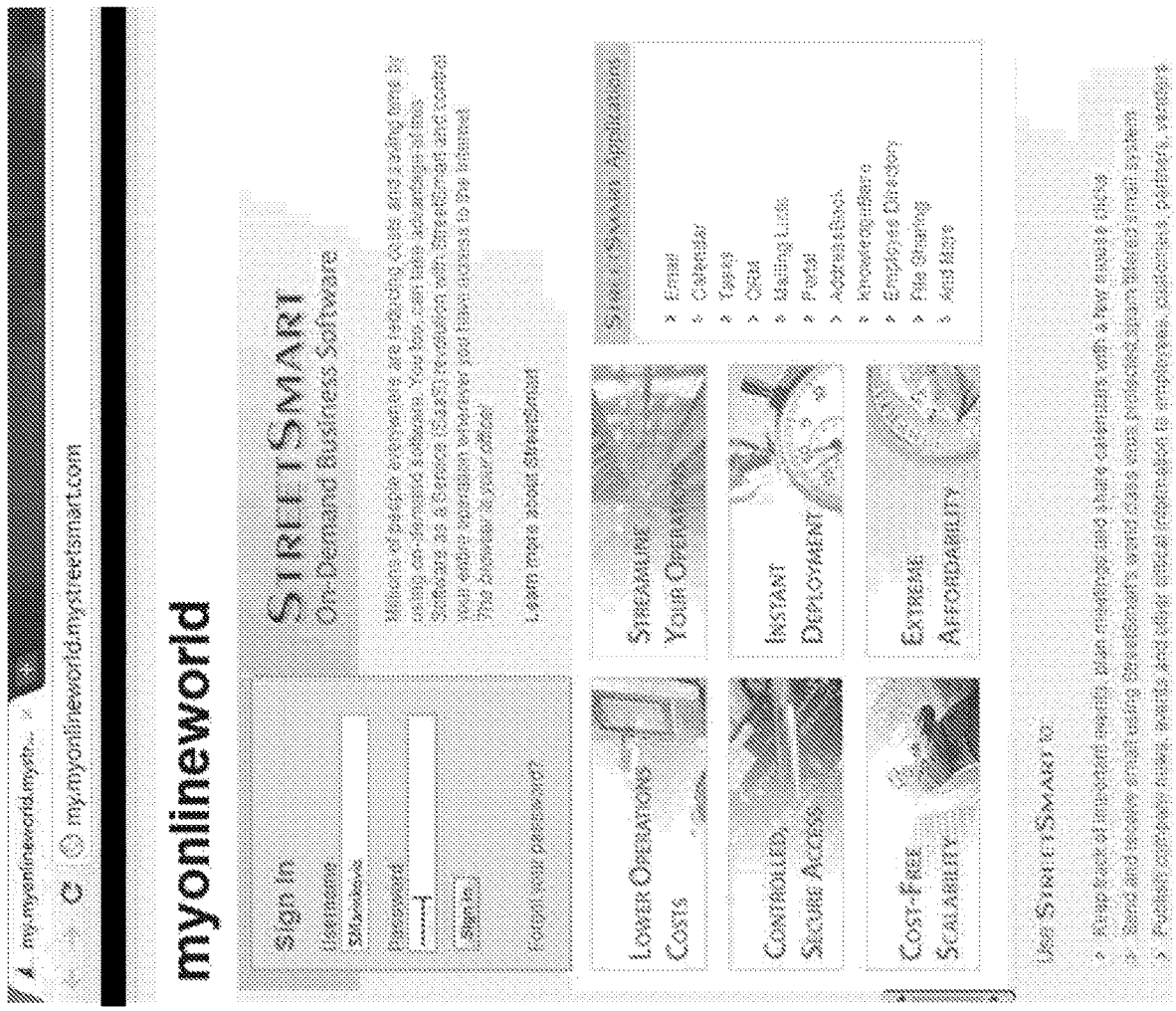

FIGS. 17G-K show screenshots illustrating example interfaces for Site sign up in one embodiment of the CDSA Platform. For example, FIG. 17G shows a sign up web page where a user provides general information, Site address and login information and FIG. 17H shows a confirmation web page. FIG. 17I shows a web page indicating building of the user requested Site and FIG. 17J shows a confirmation web page that may be generated once a Site has been built. The confirmation web page may provide the link of the Site as shown. The user may then click on the click or copy and paste the link on a web browser to load the Site login page as shown in FIG. 17K (e.g., see FIG. 4 for details).

Figure 18:
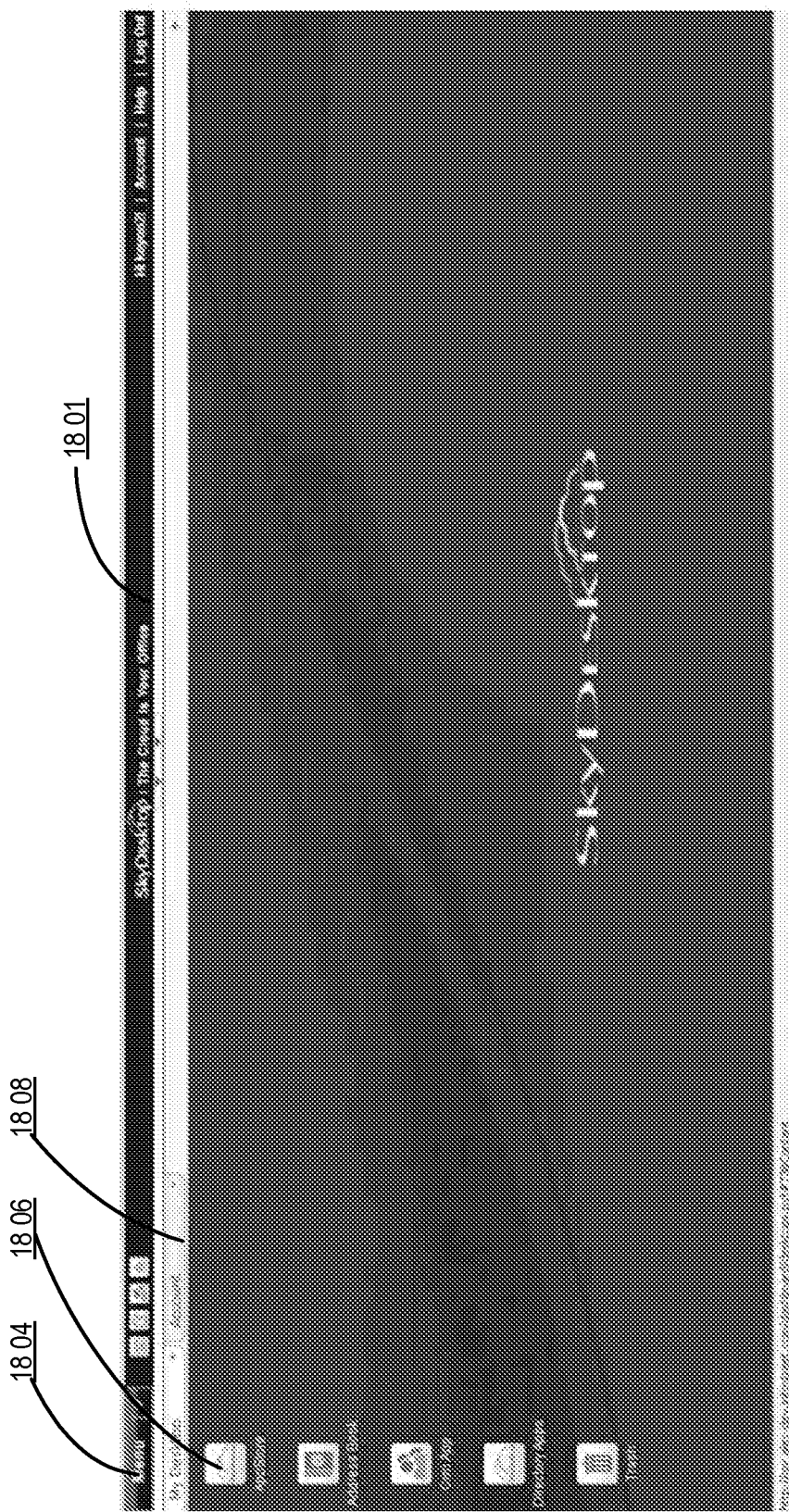
FIG. 18 shows a screenshot illustrating an example cloud-based desktop in one embodiment of the CDSA Platform.

FIG. 18 shows a screenshot illustrating an example cloud-based desktop in one embodiment of the CDSA Platform. In one implementation, by using a web browsing application such as the INTERNET EXPLORER, FIREFOX, SAFARI, etc., and by typing a URL of the Site, a CDSA Platform user may launch the cloud-based desktop log in page. The user may then enter his or her username and password to launch a cloud-based desktop. The cloud-based desktop may have an appearance that is substantially similar to that of a WINDOWS OS, MAC OS X or other operating system based computers. In one implementation, as shown in FIG. 18, the cloud-based desktop 1802 may have a look and feel similar to that of a traditional desktop. The cloud-based desktop 1802 may include a Menu 1804, which may expand further to include options or clusters such as Personal, Company, My Apps, Company Apps, Node Admin (if user is a Node admin), Admin (if user is an admin), Application Store, Manage Tabs, Options, Feedback, Log Out, and/or the like. The cloud-based desktop may also include a plurality of icons. In another implementation, the Personal option/cluster may expand further to include applications such as Portal, Mail, Address Book, Calendar, Files, Tasks, Mailing Lists, Publisher, Account, Trash, and/or the like. Similarly, the Company cluster may comprise the user's company portal/cloud-based desktop, mail, calendar, Webinar, Conference Call and other company related applications. These applications or clusters may also be displayed as icons on the cloud-based desktop 1802. Similar to an actual desktop, the cloud-based desktop icons may be rearranged, for example, by drag and drop action. The icons may also be renamed and deleted, and their properties modified with an action, e.g., a right click. Similarly, by a single action, e.g., a right click on the cloud-based desktop, a user may create a desktop shortcut, place file(s) on the cloud-based desktop from a client device, change Wallpaper, Auto Arrange icons, Arrange icons by Name, Type or Date, and/or the like.

In one embodiment, the cloud-based desktop may include one or more portlets and widgets. These portlets and widgets may provide user interaction with other services. In one implementation, these portlets and widgets may be implemented using AJAX, JavaScript, etc. In another embodiment, the CDSA Platform may be set to launch by default on a default browser installed by an OEM hardware provider through a Single Site Browser (SSB) (e.g., employing Chromium, Prism and browser oriented Operating System including Android/(Gnome) Linux, Chrome OS, Android with pre-installed Chrome browser, auto launching Chrome browser), wherein the cloud-based desktop will be the default desktop operating environment.

Figure 19:
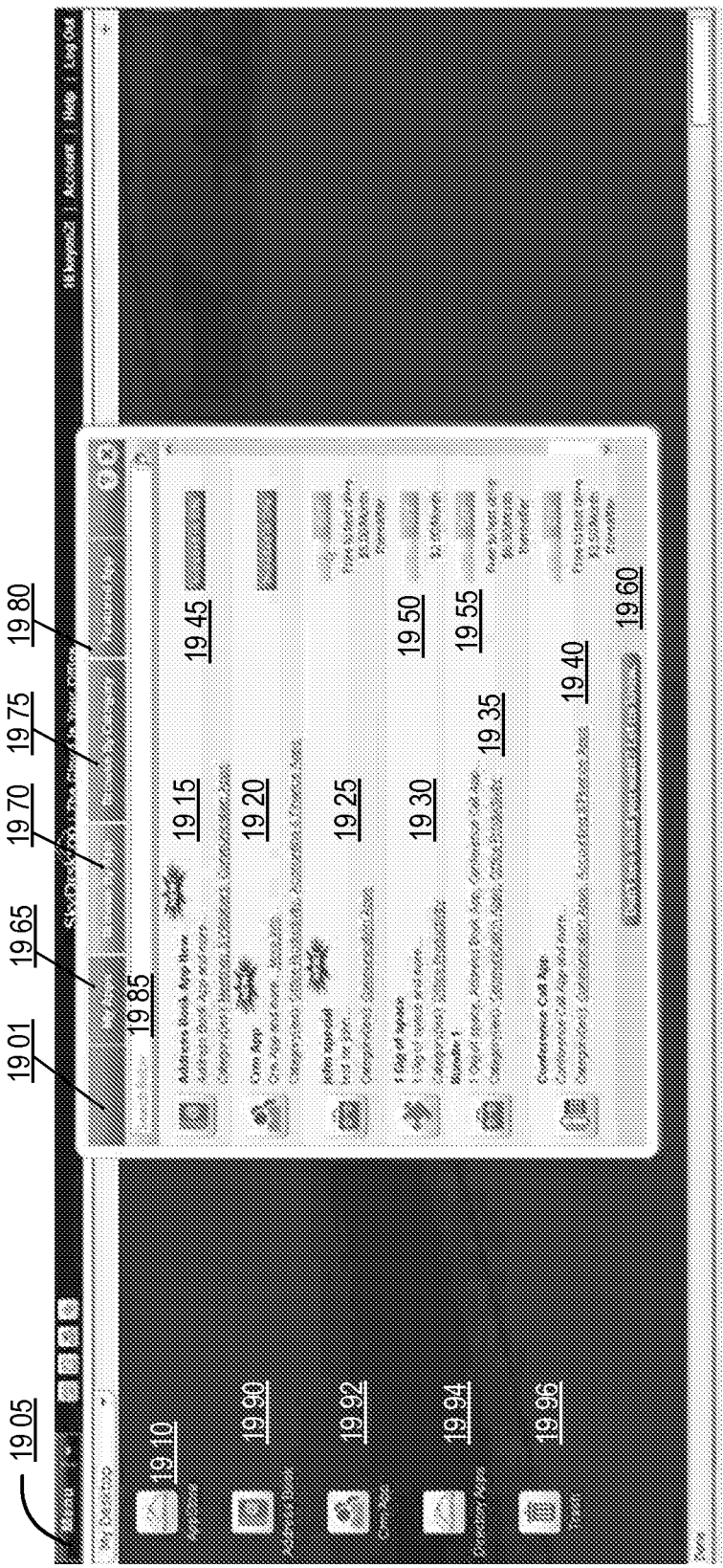
FIG. 19 shows a screenshot illustrating an example cloud-based Subscription App Store in one embodiment of the CDSA Platform.

FIG. 19 shows a screenshot illustrating an example cloud-based Subscription App Store in one embodiment of the CDSA Platform. In one implementation, a user may launch the Subscription App Store 1901 from the Menu 1905, App Store icon 1910 or a URL link. The Subscription App Store 1901 may list all the applications that are available for an end-user. In one implementation, the Subscription App Store window 1901 may include one or more tabs, including but not limited to: My Apps 1965, Browse by App 1970, Browse by Category 1975, Featured App 1980, and/or the like. In one implementation, the Browse by Category tab 1970 may list applications by category (e.g., function, service industry, etc.), as shown in the Subscription App Store 1901 in FIG. 19. In another implementation, the My Apps tab 1965 may list the currently active applications (e.g., applications included in Site and applications purchased). For e.g., the applications Address Book 1990, Crm App 1992, Directory Apps 1994 and Trash 1996 may be currently active apps that would appear under the My Apps tab 1965. In other implementations, applications may be arranged alphabetically, based on ratings, usage history and/or the like.

In one implementation, the Subscription App Store 1901 may include one or more applications that are bundled with the cloud-based desktop service. For example, in the Subscription App Store 1901, the Address Book App New 1915 and the Crm App 1920 are identified as Included in Site 1945. In one implementation, the Included in Site applications may be available to the end-user free of cost. In a further implementation, the Included in Site applications may be pre-purchased by an admin or Node-admin. In another implementation, the Subscription App Store 1901 may include a variety of other applications such as john special 1925, 1 Gig of space 1930, Bundle 1 1935, Conference Call App 1940, and/or the like. One or more of these applications may be configured individually. For example, the 1 Gig of space service 1930 and the Bundle 1 application 1935 are available for purchase by the end-user as indicated by the ON/OFF control elements 1950 and 1955 respectively. In a further implementation, the cost and trial information for the application may also be provided next to the ON/OFF control elements. Engaging the ON/OFF control elements may trigger billing to commence according to Node and/or Site permits based on user/Site stored billing information. A user may also enter keywords or search terms in the field 1985 to search for applications. The Subscription App Store 1901 may auto-suggest applications based on the entered search terms or keywords. In a further implementation, a feedback button (e.g., 1960) may be present in the Subscription App Store 1901 to facilitate end-user requests for applications currently not offered in the Subscription App Store 1901.

In one implementation, next to the applications may be the corresponding "on/off" control elements (e.g., 1950, 1955). In a further implementation, a user may click on the "on" button to place an icon of the application on his or her cloud-based desktop. In an alternate implementation, the user may drag an application to his or her cloud-based desktop to effectively turn on the application. In a further implementation, if there is a price associated with the application, clicking on the on/off button or dragging the application to the desktop may cause the user to be charged the price of the application. In one implementation, the application on the cloud-based desktop may be removed or turned off by clicking on the off button on the Subscription App Store window 1901. In an alternate implementation, the application may be removed or turned off by dragging the application to the cloud-based desktop Trash icon. In a further implementation, before removing or turning off the application, the Subscription App Store 1901 may ask for confirmation to remove via a message on a popup window. In one implementation, the Subscription App Store may keep data related to the removed application for a period of time (for e.g., 180 days), in case the user changes his or her mind and decides to re-add the previously removed application.

Figure 20:
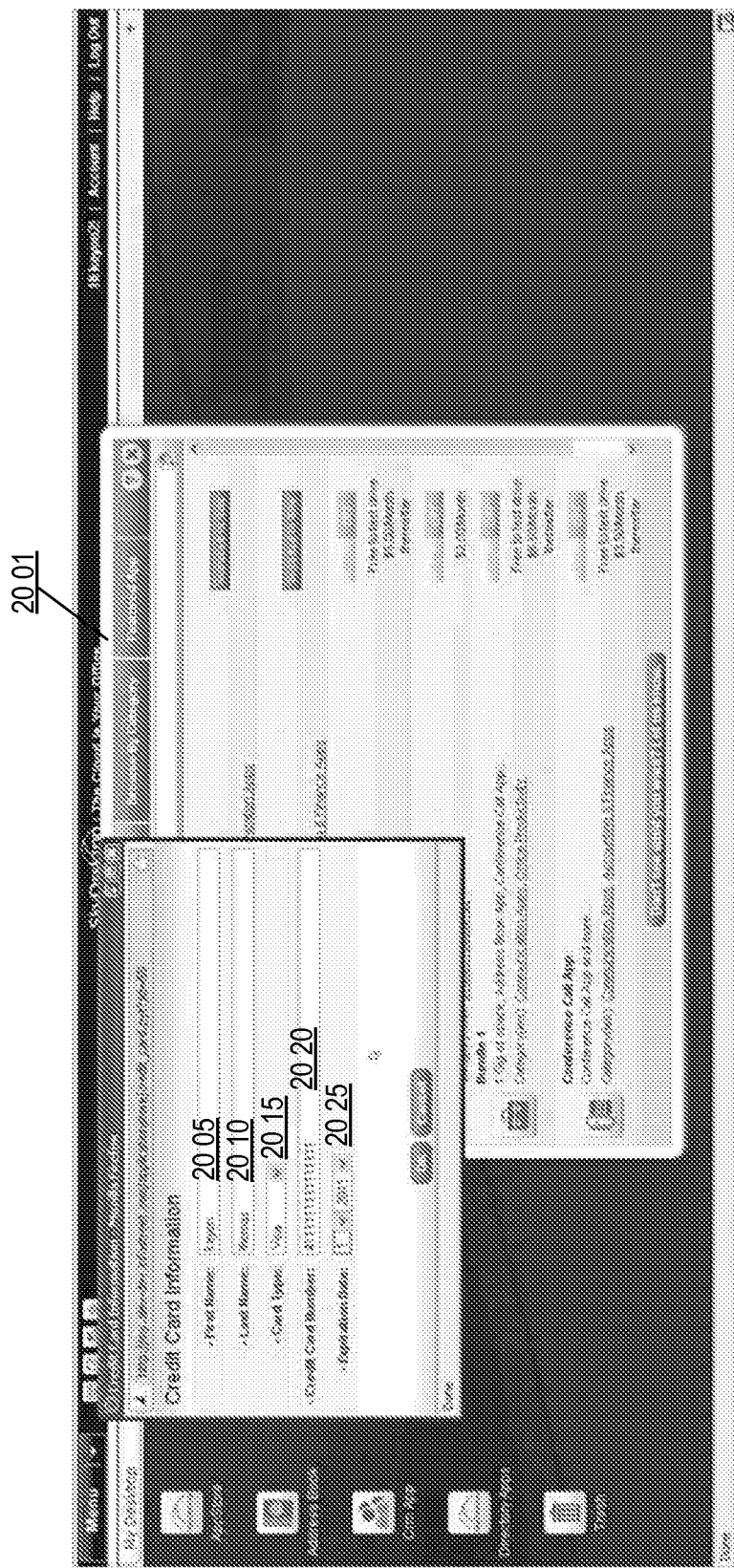
FIG. 20 shows a screenshot illustrating an example subscription App Store app purchase by an end-user in an embodiment of the CDSA Platform.

FIG. 20 shows a screenshot illustrating an example Subscription App Store app purchase by an end-user in an embodiment of the CDSA Platform. In some implementations, an end-user who desires to purchase an application from the Subscription App Store 2001 may simply click on the ON button to initiate a purchase. For example, an end-user may want to purchase the app 1 Gig of Space which may have associated cost of $2.00 per month. If it is the user's first purchase, or no billing record has been created, the CDSA Platform may generate a pop up window to request the user to provide billing information. In one implementation, the billing information may include, for example, first name 1905, last name 2010, card type 2015, credit, debit, prepaid card number or bank account number 2020, expiration date 2025, and/or the like. Upon authorization of the transaction, the purchased application may become an active application and an icon for the purchased application may automatically appear on the user's cloud-based desktop. In a further implementation, the user may set up a recurring payment for one or more applications. In another implementation, the user may set up a notification/ alert for subscription renewals. In another embodiment, a Site/Node admin may supply payment information, which may be used on the Site level by all authorized users.

It should be noted that the cloud-based desktop allows for running multiple applications on a window within a single non-cloud-based desktop having tiled, tabbed, overlapping, etc. windows. Within the cloud-based desktop, each icon can be double-clicked to create a new tab. Clicking on tabs allows one to work on the application presented in that tab. In one example use of a cloud-based desktop, the user can select an option to remember the tabs from the previous login. This will automatically open such tabs at login. A history of the previous X number of tabs can be found in the "closed tabs" section of the "New Tab (+) popup window. Each tab can be activated, closed, made permanent, or made non-permanent as applicable. Also launching an application may spawn a new web browser window.tab acting as a second virtual extended desktop screen view supporting multiple workspaces (e.g., see FIG. 23a).

Figure 21:
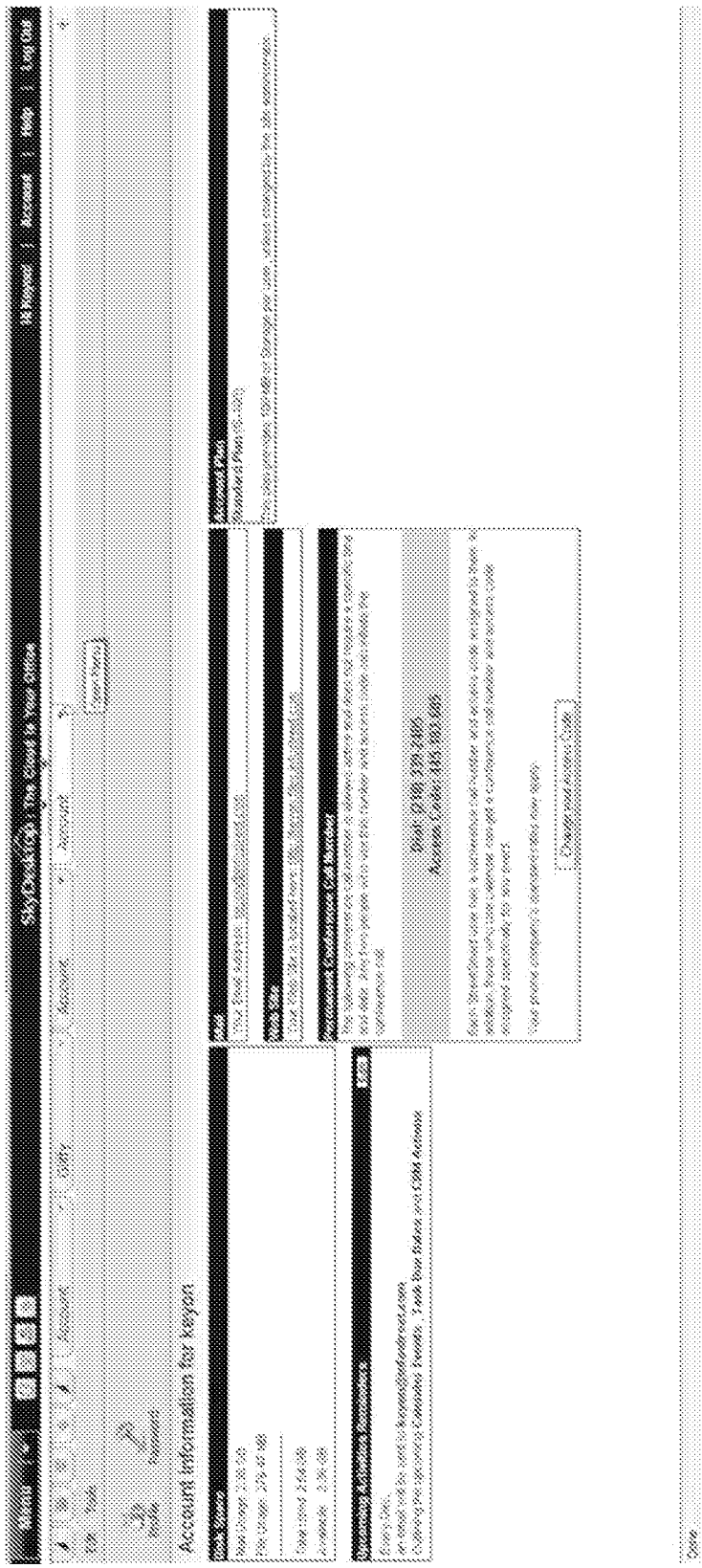
FIG. 21 shows a screenshot illustrating an example end-user portal in an embodiment of the CDSA Platform.

FIG. 21 shows a screenshot illustrating an example end-user portal in an embodiment of the CDSA Platform. The screen provides Site information and may be personalized or customized by the end-user.

Figure 22:
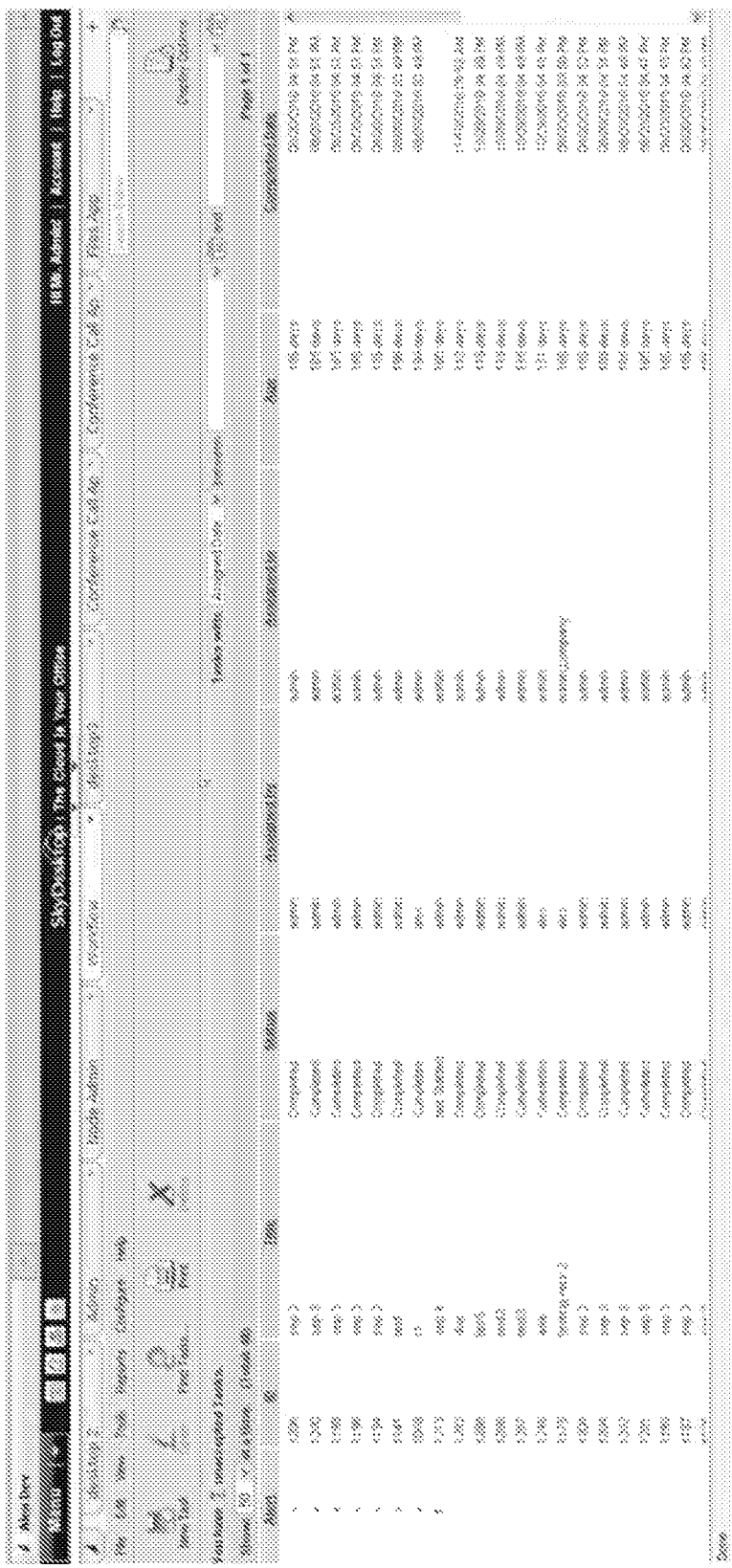
FIG. 22 shows a screenshot illustrating an example workflow application in an embodiment of the CDSA Platform.

FIG. 22 shows a screenshot illustrating an example workflow application in an embodiment of the CDSA Platform. A user (e.g., admin or end-user) may use this application to create and assign work tasks and notifications and manage projects. In one embodiment, when the CDSA Platform user may open up an application, for example Workflow application, by double clicking or through the menu or the Subscription App Store, a corresponding window of the application may appear on the cloud-based desktop. In one implementation, a tab for the open application may be displayed for the CDSA Platform user. When multiple applications are simultaneously open, as shown in FIG. 22 (e.g., Conference Call App, Workflow, Files App, etc.), each open application may be associated with a corresponding tab. The user may then select a desired tab to switch between open applications.

In one implementation, client-side scripting, e.g., JQuery, may be used to facilitate the movement of the tabs. In addition to JQuery, other client-side scripting (e.g., Ajax, JavaScript and Python libraries) may also be used in the front end to create the cloud-based desktop and Subscription App Store on the client-side.

Figure 23A:
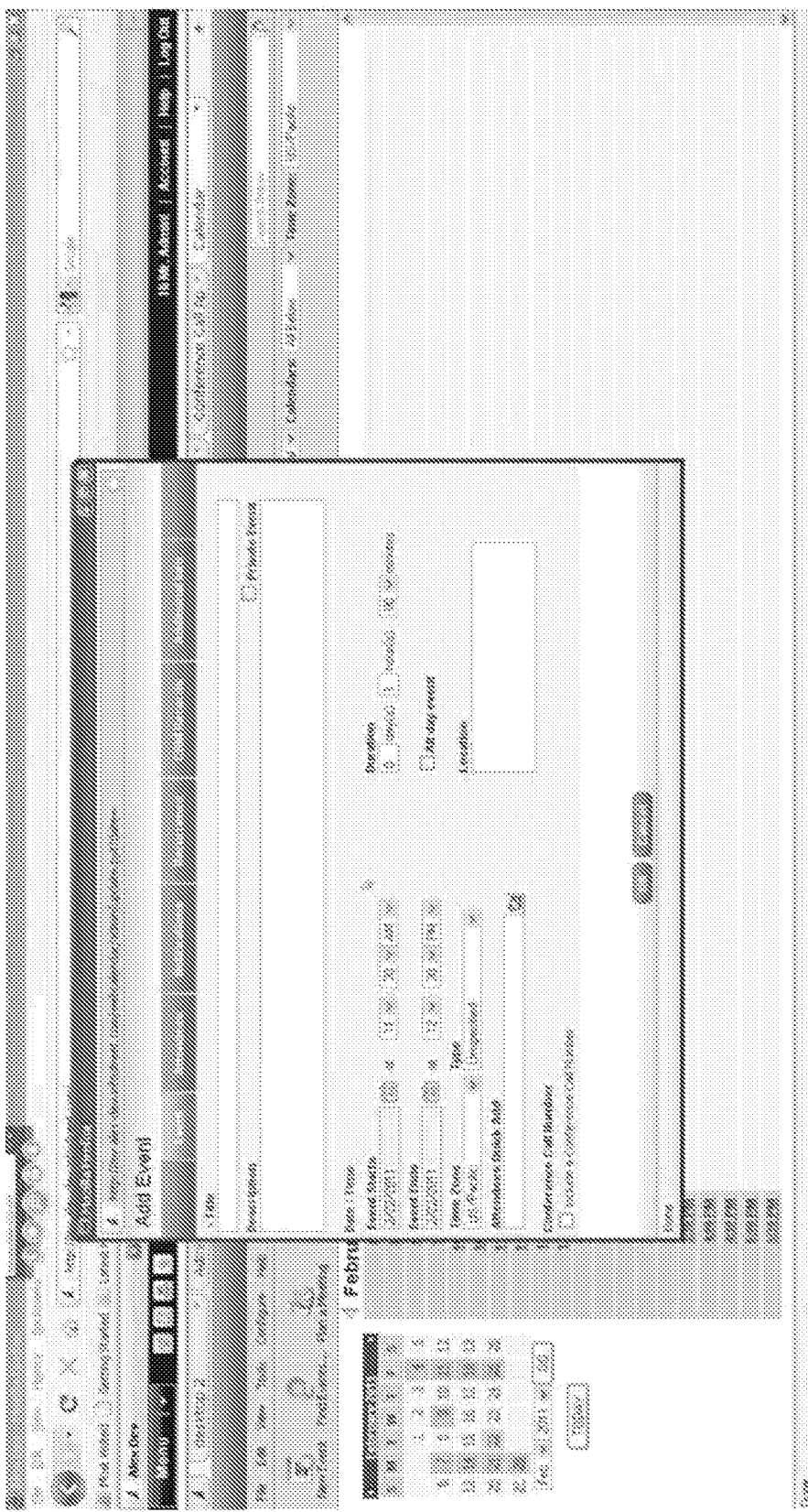
FIG. 23a-b show screenshots illustrating example calendar application and contact import in an embodiment of the CDSA Platform.
Figure 23B:
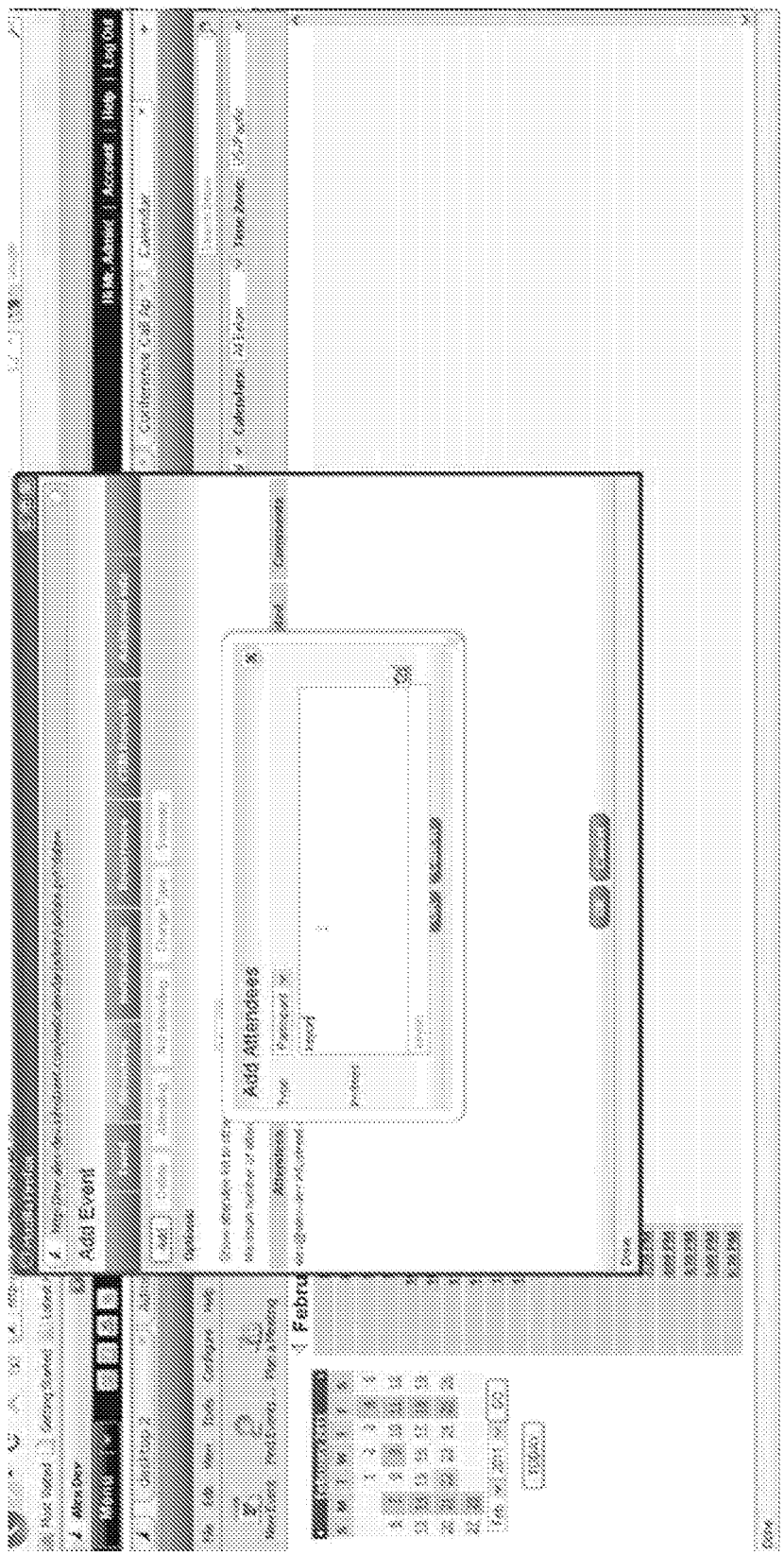

FIG. 23a-b show screenshots illustrating example calendar application and contact import in an embodiment of the CDSA Platform. As shown in FIG. 23a, a user can easily add or schedule events, invite attendee, generate notifications, and/or the like using the cloud-based calendar application. As shown in FIG. 23b, the CDSA Platform may act as a cloud service aggregator, aggregating information from various sources into one versatile cloud-based desktop service. For example, users may easily import contacts from OUTLOOK, GMAIL, YAHOO or other third-party services into the cloud-based address book, or from similar services' calendar, email, and tasks into their respective cloud based calendar, email and tasks, or other applicable programs. As a result, the CDSA Platform is a centralized repository of information, application and services accessible on demand with a browser and Internet.

CDSA Platform Controller

Figure 24:
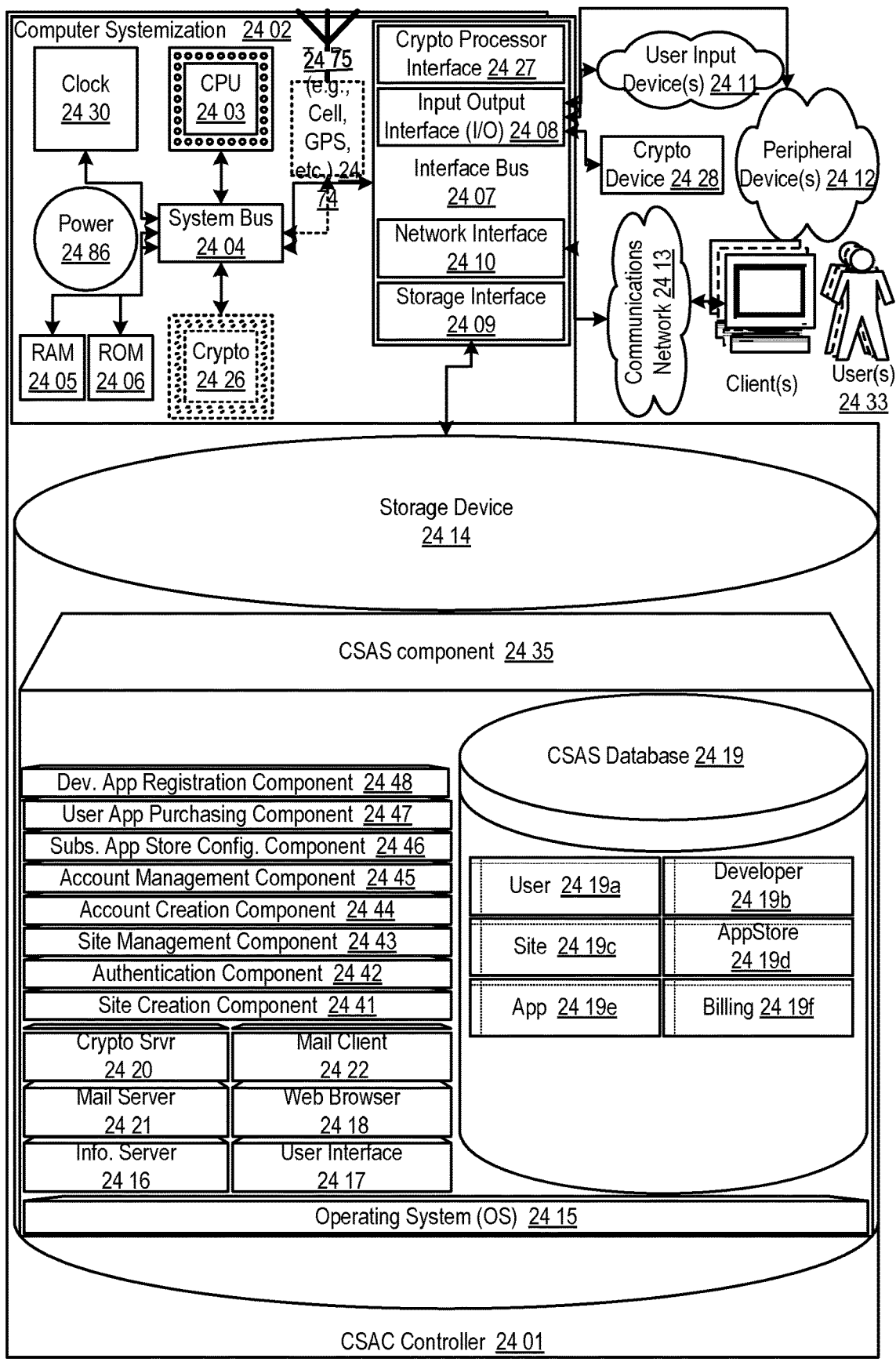
FIG. 24 shows a block diagram illustrating embodiments of a CDSA Platform controller.

FIG. 24 shows a block diagram illustrating embodiments of a CDSA Platform controller. In this embodiment, the CDSA Platform controller 2401 may serve to aggregate, process, store, search, serve, identify, instruct, generate, match, and/or facilitate interactions with a computer through cloud-based technologies, and/or other related data.

Typically, users, which may be people and/or other systems, may engage information technology systems (e.g., computers) to facilitate information processing. In turn, computers employ processors to process information; such processors 2403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CDSA Platform controller 2401 may be connected to and/or communicate with entities such as, but not limited to: one or more users from user input devices 2411; peripheral devices 2412; an optional cryptographic processor device 2428; and/or a communications network 2413.

Networks are commonly thought to comprise the interconnection and interoperation of clients, servers, and intermediary Nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "Node." Networks are generally thought to facilitate the transfer of information from source points to destinations. A Node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CDSA Platform controller 2401 may be based on computer systems that may comprise, but are not limited to, components such as: a computer systemization 2402 connected to memory 2429.

Computer Systemization

A computer systemization 2402 may comprise a clock 2430, central processing unit ("CPU(s)" and/or "processor(s)" (these terms are used interchangeable throughout the disclosure unless noted to the contrary)) 2403, a memory 2429 (e.g., a read only memory (ROM) 2406, a random access memory (RAM) 2405, etc.), and/or an interface bus 2407, and most frequently, although not necessarily, are all interconnected and/or communicating through a system bus 2404 on one or more (mother)board(s) 2402 having conductive and/or otherwise transportive circuit pathways through which instructions (e.g., binary encoded signals) may travel to effectuate communications, operations, storage, etc. The computer systemization may be connected to a power source 2486; e.g., optionally the power source may be internal. Optionally, a cryptographic processor 2426 and/or transceivers (e.g., ICs) 2474 may be connected to the system bus. In another embodiment, the cryptographic processor and/or transceivers may be connected as either internal and/or external peripheral devices 2412 via the interface bus I/O. In turn, the transceivers may be connected to antenna(s) 2475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing CDSA Platform controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CDSA Platform controller and beyond through various interfaces. Should processing requirements dictate a greater amount speed and/or capacity, distributed processors (e.g., Distributed CDSA Platform), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the CDSA Platform may be achieved by implementing a microcontroller such as CAST's R8051XC2 microcontroller; Intel's MCS 51 (i.e., 8051 microcontroller); and/or the like. Also, to implement certain features of the CDSA Platform, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CDSA Platform component collection (distributed or otherwise) and/or features may be implemented via the microprocessor and/or via embedded components; e.g., via ASIC, coprocessor, DSP, FPGA, and/or the like. Alternately, some implementations of the CDSA Platform may be implemented with embedded components that are configured and used to achieve a variety of features or signal processing.

Depending on the particular implementation, the embedded components may include software solutions, hardware solutions, and/or some combination of both hardware/software solutions. For example, CDSA Platform features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CDSA Platform features. A hierarchy of programmable interconnects allow logic blocks to be interconnected as needed by the CDSA Platform system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CDSA Platform may be developed on regular FPGAs and then migrated into a fixed version that more resembles ASIC implementations. Alternate or coordinating implementations may migrate CDSA Platform controller features to a final ASIC instead of or in addition to FPGAs. Depending on the implementation all of the aforementioned embedded components and microprocessors may be considered the "CPU" and/or "processor" for the CDSA Platform.

Power Source

The power source 2486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2486 is connected to at least one of the interconnected subsequent components of the CDSA Platform thereby providing an electric current to all subsequent components. In one example, the power source 2486 is connected to the system bus component 2404. In an alternative embodiment, an outside power source 2486 is provided through a connection across the I/O 2408 interface. For example, a USB and/or IEEE 1394 connection carries both data and power across the connection and is therefore a suitable source of power.

Interface Adapters

Interface bus(ses) 2407 may accept, connect, and/or communicate to a number of interface adapters, conventionally although not necessarily in the form of adapter cards, such as but not limited to: input output interfaces (I/O) 2408, storage interfaces 2409, network interfaces 2410, and/or the like. Optionally, cryptographic processor interfaces 2427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2409 may accept, communicate, and/or connect to a number of storage devices such as, but not limited to: storage devices 2414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2410 may accept, communicate, and/or connect to a communications network 2413. Through a communications network 2413, the CDSA Platform controller is accessible through remote clients 2433b (e.g., computers with web browsers) by users 2433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CDSA Platform), architectures may similarly be employed to pool, load balance, and/or otherwise increase the communicative bandwidth required by the CDSA Platform controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2410 may be used to engage with various communications network types 2413. For example, multiple network interfaces may be employed to allow for the communication over broadcast, multicast, and/or unicast networks.

Input Output interfaces (I/O) 2408 may accept, communicate, and/or connect to user input devices 2411, peripheral devices 2412, cryptographic processor devices 2428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2411 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2412 may be connected and/or communicate to I/O and/or other facilities of the like such as network interfaces, storage interfaces, directly to the interface bus, system bus, the CPU, and/or the like. Peripheral devices may be external, internal and/or part of the CDSA Platform controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CDSA Platform controller may be embodied as an embedded, dedicated, and/or monitor-less (i.e., headless) device, wherein access would be provided over a network interface connection.

Cryptographic units such as, but not limited to, microcontrollers, processors 2426, interfaces 2427, and/or devices 2428 may be attached, and/or communicate with the CDSA Platform controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2429. However, memory is a fungible technology and resource, thus, any number of memory embodiments may be employed in lieu of or in concert with one another. It is to be understood that the CDSA Platform controller and/or a computer systemization may employ various forms of memory 2429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2429 will include ROM 2406, RAM 2405, and a storage device 2414. A storage device 2414 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2429 may contain a collection of program and/or database components and/or data such as, but not limited to: operating system component(s) 2415 (operating system); information server component(s) 2416 (information server); user interface component(s) 2417 (user interface); Web browser component(s) 2418 (Web browser); database(s) 2419; mail server component(s) 2421; mail client component(s) 2422; cryptographic server component(s) 2420 (cryptographic server); the CDSA Platform component(s) 2435; and/or the like (i.e., collectively a component collection). These components may be stored and accessed from the storage devices and/or from storage devices accessible through an interface bus. Although non-conventional program components such as those in the component collection, typically, are stored in a local storage device 2414, they may also be loaded and/or stored in memory such as: peripheral devices, RAM, remote storage facilities through a communications network, ROM, various forms of memory, and/or the like.

Operating System

The operating system component 2415 is an executable program component facilitating the operation of the CDSA Platform controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CDSA Platform controller to communicate with other entities through a communications network 2413. Various communication protocols may be used by the CDSA Platform controller as a subcarrier transport mechanism for interaction, such as, but not limited to: multicast, TCP/IP, UDP, unicast, and/or the like.

Information Server

An information server component 2416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CDSA Platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CDSA Platform database 2419, operating systems, other program components, user interfaces, Web browsers, and/or the like.

Access to the CDSA Platform database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CDSA Platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CDSA Platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CDSA Platform enabled Nodes. The combined application may be nugatory on systems employing standard Web browsers.

Mail Server

A mail server component 2421 is a stored program component that is executed by a CPU 2403. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CDSA Platform.

Access to the CDSA Platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2422 is a stored program component that is executed by a CPU 2403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2420 is a stored program component that is executed by a CPU 2403, cryptographic processor 2426, cryptographic processor interface 2427, cryptographic processor device 2428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CDSA Platform may encrypt all incoming and/or outgoing communications and may serve as Node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CDSA Platform component to engage in secure transactions if so desired. The cryptographic component facilitates the secure accessing of resources on the CDSA Platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CDSA Platform Database

The CDSA Platform database component 2419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CDSA Platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CDSA Platform database is implemented as a data-structure, the use of the CDSA Platform database 2419 may be integrated into another component such as the CDSA Platform component 2435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2419 includes several tables 2419a-f. A Usertable 2419a includes fields such as, but not limited to: User ID, username, password, firstname, lastname, phone number, email, billing ID, Site ID, restrictions, account plan and/or the like. The User table may support and/or track multiple entity accounts on the CDSA Platform. A Developer table 2419b includes fields such as, but not limited to: developer ID, username, password, firstname, lastname, phone number, email, payment information, application ID, contract ID and/or the like. A Site table 2419c includes fields such as, but not limited to: Site ID, Site address, domain registration information, domain renewal date, billing ID, Node admin ID, admin ID, number of users, spending limit, restrictions, and/or the like. An Subscription App Store table 2419d includes fields such as, but not limited to: application ID, Site ID, account ID, billing ID, category, application name, company, powered by, description, search keywords/tags, type, test drive/trial, re-test drive/retrial, link to more information, cost per month, cost per year, retail/offer price per month, retail/offer price per year, plan, purchase model, number of active apps, rating and/or the like. An App table 2419e includes fields such as, but not limited to: application ID, app link, app_link_key, download_link, data_file link, format, icon link and/or the like. A Billing table 2419f includes fields such as, but not limited to: account ID, Site ID, developer ID, billing address, card type, card number, billing plan, and/or the like.

In one embodiment, the CDSA Platform database may interact with other database systems. For example, employing a distributed database system, queries and data access by search CDSA Platform component may treat the combination of the CDSA Platform database, an integrated data security layer database as a single database entity.

In one embodiment, user programs may contain various user interface primitives, which may serve to update the CDSA Platform. Also, various accounts may require custom database tables depending upon the environments and the types of clients the CDSA Platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2419a-f The CDSA Platform may be configured to keep track of various settings, inputs, and parameters via database controllers.

The CDSA Platform database may communicate to and/or with other components in a component collection, including itself, and/or facilities of the like. Most frequently, the CDSA Platform database communicates with the CDSA Platform component, other program components, and/or the like. The database may contain, retain, and provide information regarding other Nodes and data.

The CDSA Platforms

The CDSA Platform component 2435 is a stored program component that is executed by a CPU. In one embodiment, the CDSA Platform component incorporates any and/or all combinations of the aspects of the CDSA Platform that was discussed in the previous figures. As such, the CDSA Platform affects accessing, obtaining and the provision of information, services, transactions, and/or the like across various communications networks.

In one embodiment, the CDSA Platform transforms inputs (e.g., service sign up request 430, site creation request 450, etc.) via CDSA Platform components (e.g., Site Creation Component 2441, Authentication Component 2442, Site Management Component 2443, Account Creation Component 2444, Account Management Component 2445, Subscription App Store Configuration Component 2446, User Application Purchasing Component 2447, etc.) into outputs (e.g., service sign up message 435, verification key/ID message 445, Site creation request message 455, new site display 465, etc.). In another embodiment, the CDSA Platform also transforms inputs (e.g., app registration request 1405, app deployment parameters 191425, etc.) via CDSA Platform components (e.g., Developer App Registration Component 2448, etc.) into outputs (e.g., app registration request message 1410, app deployment parameters request message 1420, app deployment parameters message 1430, Subscription App Store registration confirmation message 1450, etc.).

The CDSA Platform component enabling access of information between Nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CDSA Platform server employs a cryptographic server to encrypt and decrypt communications. The CDSA Platform component may communicate to and/or with other components in a component collection, including itself, and/or facilities of the like. Most frequently, the CDSA Platform component communicates with the CDSA Platform database, operating systems, other program components, and/or the like. The CDSA Platform may contain, communicate, generate, obtain, and/or provide program component, system, user, and/or data communications, requests, and/or responses.

Distributed CDSA Platforms

The structure and/or operation of any of the CDSA Platform Node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single Node, and/or across numerous Nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CDSA Platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CDSA Platform controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen ($sock);
$client = socket_accept ($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission)
```

-continued

```
VALUES ($data)"); // add data to UserTable table in a CLIENT database
mysql_close ("CLIENT_DB.SQL"); // close connection to database
?>
```

Also, the following resources may be used to provide example embodiments regarding SOAP parser implementation:

http://www.xav.com/perl/Site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments include:

1. A cloud-based desktop representation generation system, comprising:
a memory;
a processor disposed in communication with said memory, and configured to issue a plurality of processing instructions stored in the memory, wherein the processor issues instructions to:
receive identifying information input, along with a web site address;
in response to the identifying information input:
create a new web site at the web site address, the new website comprising a first desktop representation on a web browser at the web site address; and
present a plurality of application icons on said first desktop representation;
receive an indication of an action on one of the plurality of application icons; and
in response to the indication:
present a second desktop representation on the web browser at the web site address.

2. The system of claim 1, wherein the instructions to create the new web site further comprises instructions to connect the web site to a domain.

3. The system of claim 2, wherein the instructions to connect the website to the domain further comprise instructions to:
create a database entry associating the domain to the site; and
update at least mail and server configurations.

4. The system of claim 1, wherein the action includes (i) a single click; (ii) a double click; (iii) a right click; (iv) a drag and drop; and (v) selection from a menu.

5. The system of claim 1, wherein the second desktop representation is an application interface instantiated by the action.

6. The system of claim 5, wherein the first desktop representation and the second desktop representation are tabbed interfaces, movable from one location to another on the web browser.

7. The system of claim 5, wherein the application interface is a subscription application store interface.

8. The system of claim 7, wherein the subscription application store interface comprises a plurality of pre-purchased or for-purchase applications.

9. The system of claim 1, wherein the processor issues further instructions to:
receive a selection of an account service plan for the web site; and
receive a selection of a billing plan for the web site.

10. The system of claim 9, wherein the processor issues further instructions to:
receive an indication to create one or more user accounts for the web site;
in response to the received indication,
create the one or more user accounts;
for each user account, create a user web page, said user web page inheriting the account service plan and the billing plan specified for the web site, and including a user desktop representation.

11. The system of claim 10, wherein the processor issues further instructions to:
receive a request to purchase an application for one or more users associated with the one or more user accounts;
receive billing information for the purchase request;
in response to the received purchase request and the billing information, instantiate the application in the user desktop representation of the one or more users associated with the one or more user accounts.

12. The system of claim 10, wherein the user desktop representation further comprises a subscription application store customized in accordance with the account service plan or the billing plan associated with the web site.

13. A cloud-based desktop representation generation medium storing processor-issuable instructions to:
receive identifying information input, along with a web site address;
in response to the identifying information input:
create a new web site at the web site address, the new website comprising a first desktop representation on a web browser at the web site address; and
present a plurality of application icons on said first desktop representation;
receive an indication of an action on one of the plurality of application icons; and
in response to the indication:
present a second desktop representation on the web browser at the web site address.

14. The medium of claim 13, wherein the instructions to create the new web site further comprises instructions to connect the web site to a domain.

15. The medium of claim 14, wherein the instructions to connect the website to the domain further comprise instructions to:
create a database entry associating the domain to the site; and
update at least mail and server configurations.

16. The medium of claim 13, wherein the action includes (i) a single click; (ii) a double click; (iii) a right click; (iv) a drag and drop; and (v) selection from a menu.

17. The medium of claim 13, wherein the second desktop representation is an application interface instantiated by the action.

18. The medium of claim 17, wherein the first desktop representation and the second desktop representation are tabbed interfaces, movable from one location to another on the web browser.

19. The medium of claim 17, wherein the application interface is a subscription application store interface.

20. The medium of claim 19, wherein the subscription application store interface comprises a plurality of pre-purchased or for-purchase applications.

21. The medium of claim 13, wherein the processor-issuable instructions further comprise instructions to:
receive a selection of an account service plan for the web site; and
receive a selection of a billing plan for the web site.

22. The medium of claim 21, wherein the processor-issuable instructions further comprise instructions to:
receive an indication to create one or more user accounts for the web site;
in response to the received indication,
create the one or more user accounts;
for each user account, create a user web page, said user web page inheriting the account service plan and the billing plan specified for the web site, and including a user desktop representation.

23. The medium of claim 22, wherein the processor-issuable instructions further comprise instructions to:
receive a request to purchase an application for one or more users associated with the one or more user accounts;
receive billing information for the purchase request;
in response to the received purchase request and the billing information, instantiate the application in the user desktop representation of the one or more users associated with the one or more user accounts.

24. The medium of claim 22, wherein the user desktop representation further comprises a subscription application store customized in accordance with the account service plan or the billing plan associated with the web site.

25. A processor-implemented cloud-based subscription service instantiation method, comprising:
obtaining user identifying information;
obtaining billing information;
providing a user with a choice of services;
obtaining a user selection of a service and an indication to initiate or terminate said service, wherein said indication includes a singular user interaction; and
initiating or terminating said service and billing for said service in response to the obtained user selection.

26. The method of claim 25, wherein the billing information for the billing of the initiated or terminated service is user billing information.

27. The method of claim 25, wherein the billing of the initiated or terminated service is site billing information.

28. The method of claim 25, further comprising:
obtaining the billing information for a site associated with the user or the user based on the user selected service.

29. The method of claim 25, wherein initiating the service further comprises instantiating a first application in a desktop representation on a web browser.

30. The method of claim 29, further comprising:
receiving a user selection of a second service and an indication to initiate said second service; and
instantiating a second application in the desktop representation on the web browser.

31. A cloud-based subscription service instantiation system, comprising:
a memory;
a processor disposed in communication with said memory, and configured to issue a plurality of processing instructions stored in the memory, wherein the processor issues instructions to:

obtain user identifying information;
obtain billing information;
provide a user with a choice of services;
obtain a user selection of a service and an indication to initiate or terminate said service, wherein said indication includes a singular user interaction; and
initiate or terminating said service and billing for said service in response to the obtained user selection.

32. The system of claim 31, wherein the service is an application.

33. The system of claim 35, wherein said singular user interaction is a single click service.

34. The system of claim 31, wherein the choice of services for the user is determined by one or more owners of the user, the owners having application provisioning rights.

35. The system of claim 31, wherein the billing information for the billing of the initiated or terminated service is user billing information.

36. The system of claim 31, wherein the billing of the initiated or terminated service is site billing information.

37. The system of claim 31, wherein the processor issues further instructions to:
obtain the billing information for a site associated with the user or the user based on the user selected service.

38. The system of claim 31, wherein initiating the service further comprises instantiating a first application in a desktop representation on a web browser.

39. The system of claim 38, wherein the processor issues further instructions to:
receive a user selection of a second service and an indication to initiate said second service; and
instantiate a second application in the desktop representation on the web browser.

40. A cloud-based subscription service medium storing processor-issuable instructions to:
obtain user identifying information;
obtain billing information;
provide a user with a choice of services;
obtain a user selection of a service and an indication to initiate or terminate said service, wherein said indication includes a singular user interaction; and
initiate or terminating said service and billing for said service in response to the obtained user selection.

41. The medium of claim 40, wherein the service is an application.

42. The medium of claim 41, wherein said singular user interaction is a single click service.

43. The medium of claim 40, wherein the choice of services for the user is determined by one or more owners of the user, the owners having application provisioning rights.

44. The medium of claim 40, wherein the billing information for the billing of the initiated or terminated service is user billing information.

45. The medium of claim 40, wherein the billing of the initiated or terminated service is site billing information.

46. The medium of claim 40, wherein the processor-issuable instructions further comprise instructions to: obtain the billing information for a site associated with the user or the user based on the user selected service.

47. The medium of claim 40, wherein initiating the service further comprises instantiating a first application in a desktop representation on a web browser.

48. The medium of claim 47, wherein the processor-issuable instructions further comprise instructions to:
receive a user selection of a second service and an indication to initiate said second service; and
instantiate a second application in the desktop representation on the web browser.

49. A cloud-based subscription service instantiation apparatus, comprising:
a memory;
a processor disposed in communication with said memory, and configured to issue a plurality of processing instructions stored in the memory, wherein the processor issues instructions to:
obtain user identifying information;
obtain billing information;
provide a user with a choice of services;
obtain a user selection of a service and an indication to initiate or terminate said service, wherein said indication includes a singular user interaction; and
initiate or terminating said service and billing for said service in response to the obtained user selection.

50. A processor-implemented service registration method, comprising:
receiving a service deployment request;
receiving a plurality of service deployment parameters;
creating a service record for the service deployment request;
associating the service record with at least some of the service deployment parameters; and
deploying the service for user access via a subscription service store.

51. A subscription application purchasing mechanism, comprising:
a desktop user interface launched on a web browsing application; and
a user-level application store accessible via the desktop user interface, the user-level application store providing a plurality of applications for use with the desktop user interface upon activation of a user control element.

52. The subscription application purchasing mechanism of claim 51, further comprising:
a node-level interface, which receives one or more released applications and approves one or more received applications for use in a site-level application store; and
a site-level interface, which receives the one or more approved applications and authorizes one or more approved applications for use in the user-level application store.

In order to address various issues and advance the art, the entirety of this application for A CLOUD-BASED DESKTOP AND SUBSCRIPTION APPLICATION PLATFORM APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for s specific portion of the innovations or that further undescribed alternate embodiments may be available for portion is not to be considered a disclaimer of those alternate embodiments. It will be appreciated that many of those undescribed embodiments incorporate the same principles of the innovations and others are equivalent.

Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CDSA Platform individual and/or enterprise user, database configuration and/or relational model, data type, data transmission and/or network framework, syntax structure, and/or the like, various embodiments of the CDSA Platform, may be implemented that enable a great deal of flexibility and customization. For example, aspects of the CDSA Platform may be adapted for aggregation and integration of cloud-based information. While various embodiments and discussions of the CDSA Platform have been directed to cloud-based subscription application provision, however, it is to be understood that the embodiments described herein may be readily configured and/or customized for a wide variety of other applications and/or implementations.

What is claimed is:

1. A processor-implemented application service user interface apparatus, comprising:
  a memory;
  a component collection in the memory;
  a processor disposed in communication with the memory, and configured to issue a plurality of processing instructions, from the component collection stored in the memory, to:
    obtain user identifying information;
    obtain, via a processor, billing information using the user identifying information;
    provide a user with a choice of application services within a unified application services store user display interface,
    wherein the application services are any of: an application and a service,
    wherein the application services include those from disparate third parties,
    wherein the application services include at least one pointer to a loadable set of executable instructions for application services access, and
    wherein the unified application services store user display interface is configured to obtain a user indication to initiate or terminate application services with a singular user interaction;
  obtain, via the processor, and the unified application services store user display interface, a user selection of application services, and an indication to initiate or terminate said application services, wherein said indication includes a singular user interaction;
  verify, via the processor, permission to initiate or terminate the user-selected application service based on the billing information and the user identifying information; and
  initiate or terminate said application service and billing for said application service in response to the obtained user selection.

2. The apparatus of claim 1, wherein the billing information for the billing of the initiated or terminated service is user billing information.

3. The apparatus of claim 1, further comprising:
  obtain the billing information for the user or a site associated with the user based on the user selected service.

4. The apparatus of claim 1, wherein initiating the service further comprises launching the application service in a desktop representation user interface upon verifying the user is still authorized to use the application service.

5. The apparatus of claim 1, further comprising:
  receive a user selection of a second service and an indication to initiate said second service; and
  instantiate a second application.

6. The apparatus of claim 1, wherein the application services provided are any of:
  those that the user is authorized to view, and those to a group to which the user is a member and is authorized to view.

7. The apparatus of claim 1, wherein the processor is further configured to issue a plurality of processing instructions, from the component collection stored in the memory, to instantiate the application service as an application service icon on a desktop user interface in a web browser.

8. A processor-implemented application service user interface processor-readable, non-transient medium, comprising processor-executable instructions configured to:
  obtain user identifying information;
  obtain, via a processor, billing information using the user identifying information;
  provide a user with a choice of application services within a unified application services store user display interface,
  wherein the application services are any of: an application and a service,
  wherein the application services include those from disparate third parties,
  wherein the application services include at least one pointer to a loadable set of executable instructions for application services access, and
  wherein the unified application services store user display interface is configured to obtain a user indication to initiate or terminate application services with a singular user interaction;

obtain, via the processor, and the unified application services store user display interface, a user selection of application services, and an indication to initiate or terminate said application services, wherein said indication includes a singular user interaction;

verify, via the processor, permission to initiate or terminate the user-selected application service based on the billing information and the user identifying information; and initiate or terminate said application service and billing for said application service in response to the obtained user selection.

9. The medium of claim 8, wherein the billing information for the billing of the initiated or terminated service is user billing information.

10. The medium of claim 8, further comprising:
obtain the billing information for the user or a site associated with the user based on the user selected service.

11. The medium of claim 8, wherein initiating the service further comprises launching the application service in a desktop representation user interface upon verifying the user is still authorized to use the application service.

12. The medium of claim 8, further comprising:
receive a user selection of a second service and an indication to initiate said second service; and
instantiate a second application.

13. The medium of claim 8, wherein the application services provided are any of:
those that the user is authorized to view, and those to a group to which the user is a member and is authorized to view.

14. The medium of claim 8, wherein the processor is further configured to issue a plurality of processing instructions, from the component collection stored in the memory, to instantiate the application service as an application service icon on a desktop user interface in a web browser.

15. A processor-implemented application service user interface processor-implemented system, comprising:
means to process processor-executable instructions;
means to issue processor-issuable instructions from a processor-executable component collection via the means to process processor-executable instructions, the processor-issuable instructions configured to:
obtain user identifying information;
obtain, via a processor, billing information using the user identifying information;
provide a user with a choice of application services within a unified application services store user display interface,
wherein the application services are any of: an application and a service,
wherein the application services include those from disparate third parties,
wherein the application services include at least one pointer to a loadable set of executable instructions for application services access, and
wherein the unified application services store user display interface is configured to obtain a user indication to initiate or terminate application services with a singular user interaction;
obtain, via the processor, and the unified application services store user display interface, a user selection of application services, and an indication to initiate or terminate said application services, wherein said indication includes a singular user interaction;

verify, via the processor, permission to initiate or terminate the user-selected application service based on the billing information and the user identifying information; and initiate or terminate said application service and billing for said application service in response to the obtained user selection.

16. The system of claim 15, wherein the billing information for the billing of the initiated or terminated service is user billing information.

17. The system of claim 15, further comprising:
obtain the billing information for the user or a site associated with the user based on the user selected service.

18. The system of claim 15, wherein initiating the service further comprises launching the application service in a desktop representation user interface upon verifying the user is still authorized to use the application service.

19. The system of claim 15, further comprising:
receive a user selection of a second service and an indication to initiate said second service; and
instantiate a second application.

20. The system of claim 15, wherein the application services provided are any of: those that the user is authorized to view, and those to a group to which the user is a member and is authorized to view.

21. The system of claim 15, wherein the processor is further configured to issue a plurality of processing instructions, from the component collection stored in the memory, to instantiate the application service as an application service icon on a desktop user interface in a web browser.

22. A processor-implemented application service user interface processor-implemented process, comprising executing processor-executable instructions to:
obtain user identifying information;
obtain, via a processor, billing information using the user identifying information;
provide a user with a choice of application services within a unified application services store user display interface,
wherein the application services are any of: an application and a service,
wherein the application services include those from disparate third parties,
wherein the application services include at least one pointer to a loadable set of executable instructions for application services access, and
wherein the unified application services store user display interface is configured to obtain a user indication to initiate or terminate application services with a singular user interaction;
obtain, via the processor, and the unified application services store user display interface, a user selection of application services, and an indication to initiate or terminate said application services, wherein said indication includes a singular user interaction;
verify, via the processor, permission to initiate or terminate the user-selected application service based on the billing information and the user identifying information; and
initiate or terminate said application service and billing for said application service in response to the obtained user selection.

23. The process of claim 22, wherein the billing information for the billing of the initiated or terminated service is user billing information.

24. The process of claim 22, further comprising:
obtain the billing information for the user or a site associated with the user based on the user selected service.

25. The process of claim 22, wherein initiating the service further comprises launching the application service in a desktop representation user interface upon verifying the user is still authorized to use the application service.

26. The process of claim 22, further comprising:
receive a user selection of a second service and an indication to initiate said second service; and
instantiate a second application.

27. The process of claim 22, wherein the application services provided are any of: those that the user is authorized to view, and those to a group to which the user is a member and is authorized to view.

28. The process of claim 22, wherein the processor is further configured to issue a plurality of processing instructions, from the component collection stored in the memory, to instantiate the application service as an application service icon on a desktop user interface in a web browser.

* * * * *